(12) United States Patent
Bramlet et al.

(10) Patent No.: US 12,211,397 B2
(45) Date of Patent: *Jan. 28, 2025

(54) UPDATING A LESSON PACKAGE

(71) Applicant: Enduvo, Inc., Peoria, IL (US)

(72) Inventors: Matthew Bramlet, Peoria, IL (US); Justin Douglas Drawz, Chicago, IL (US); Steven J. Garrou, Wilmette, IL (US); Joseph Thomas Tieu, Tulsa, OK (US); Joon Young Kim, Broomfield, CO (US); Gary W. Grube, Barrington Hills, IL (US)

(73) Assignee: Enduvo, Inc., Peoria, IL (US)

( * ) Notice: Subject to any disclaimer, the term of this patent is extended or adjusted under 35 U.S.C. 154(b) by 846 days.

This patent is subject to a terminal disclaimer.

(21) Appl. No.: 17/395,610

(22) Filed: Aug. 6, 2021

(65) Prior Publication Data

US 2022/0051583 A1 Feb. 17, 2022

Related U.S. Application Data

(60) Provisional application No. 63/064,742, filed on Aug. 12, 2020.

(51) Int. Cl.
  *G09B 7/04* (2006.01)
  *G09B 5/06* (2006.01)
(52) U.S. Cl.
  CPC .............. *G09B 7/04* (2013.01); *G09B 5/06* (2013.01)
(58) Field of Classification Search
  CPC .................................. G09B 7/04; G09B 5/06
  See application file for complete search history.

(56) References Cited

U.S. PATENT DOCUMENTS

| | | | |
|---|---|---|---|
| 6,288,753 B1 | 9/2001 | Denicola | |
| 7,733,366 B2 | 6/2010 | Beavers | |
| 8,666,298 B2* | 3/2014 | Liang | G06Q 50/20 434/323 |
| 8,682,241 B2 | 3/2014 | Huerta | |
| 9,179,100 B2 | 11/2015 | Guo | |
| 2010/0041007 A1* | 2/2010 | Wang | G09B 7/00 434/322 |
| 2010/0129783 A1* | 5/2010 | Liang | G09B 7/04 434/322 |
| 2011/0123972 A1 | 5/2011 | Friedman | |
| 2012/0251992 A1 | 10/2012 | Huerta | |
| 2013/0314421 A1 | 11/2013 | Kim | |
| 2015/0206448 A1 | 7/2015 | Loudermilk | |
| 2018/0151083 A1* | 5/2018 | Yoo | G09B 5/08 |
| 2018/0232567 A1 | 8/2018 | Dolsma | |

* cited by examiner

*Primary Examiner* — Eddy Saint-Vil
(74) *Attorney, Agent, or Firm* — Gary W. Grube

(57) ABSTRACT

A method for execution by a computing entity for creating a learning tool regarding a topic includes issuing a representation of a first set of physicality assessment assets of a first learning object to a second computing entity. The method further includes obtaining a first assessment response in response to the representation of the first set of physicality assessment assets. The method further includes determining an undesired performance aspect of the first assessment response. The method further includes updating at least one of the first learning object and a second learning object based on the undesired performance aspect to facilitate improved performance of a subsequent assessment response.

15 Claims, 47 Drawing Sheets

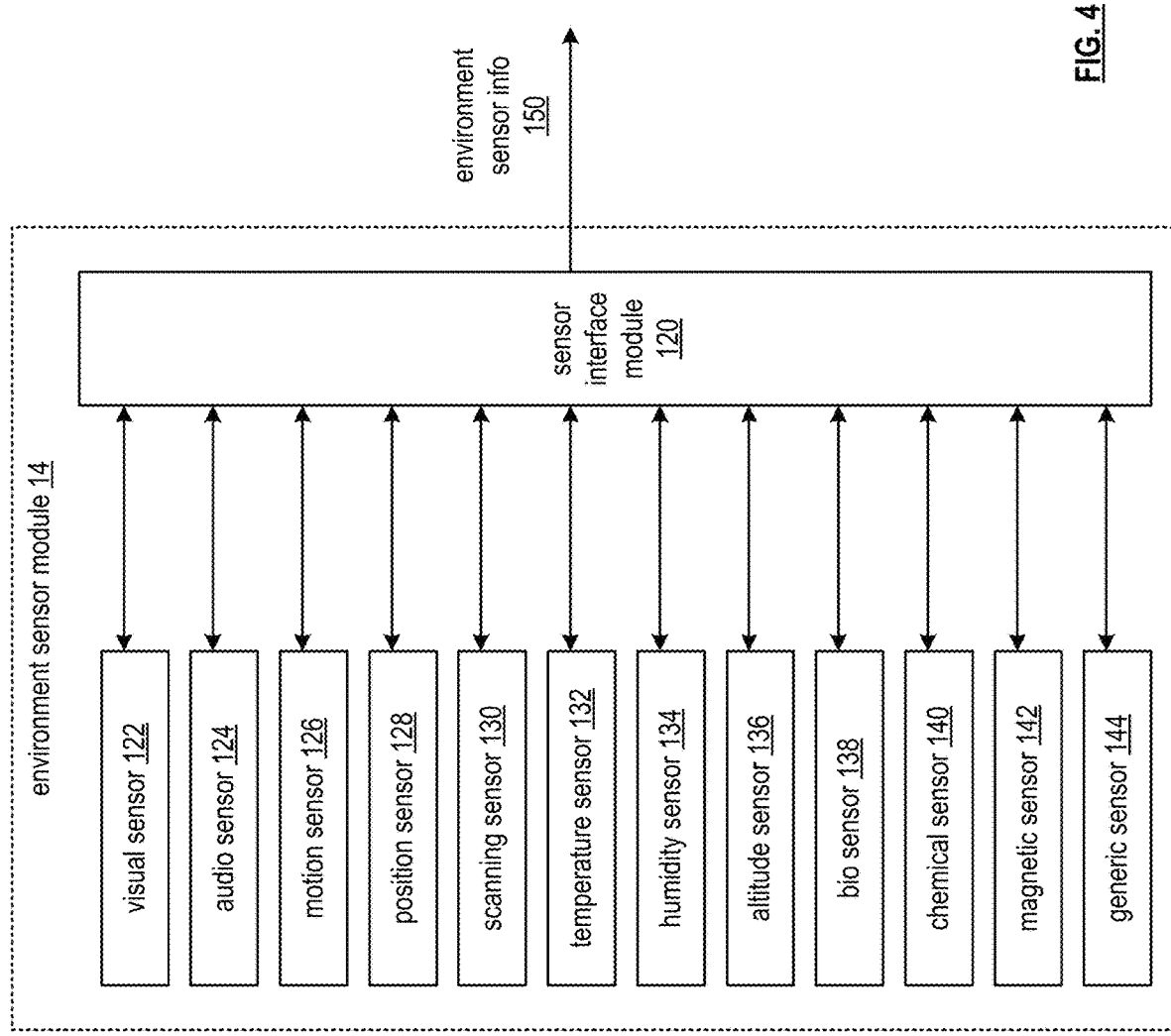

step 4 – update a learning object based on the undesired performance aspect

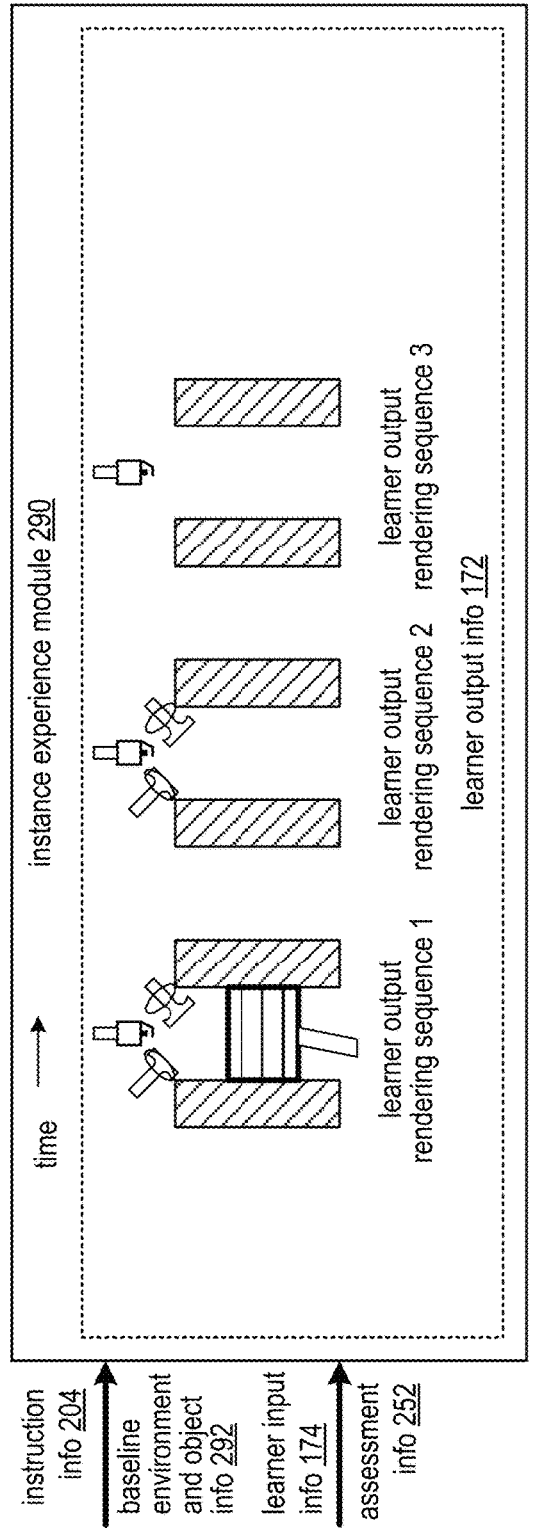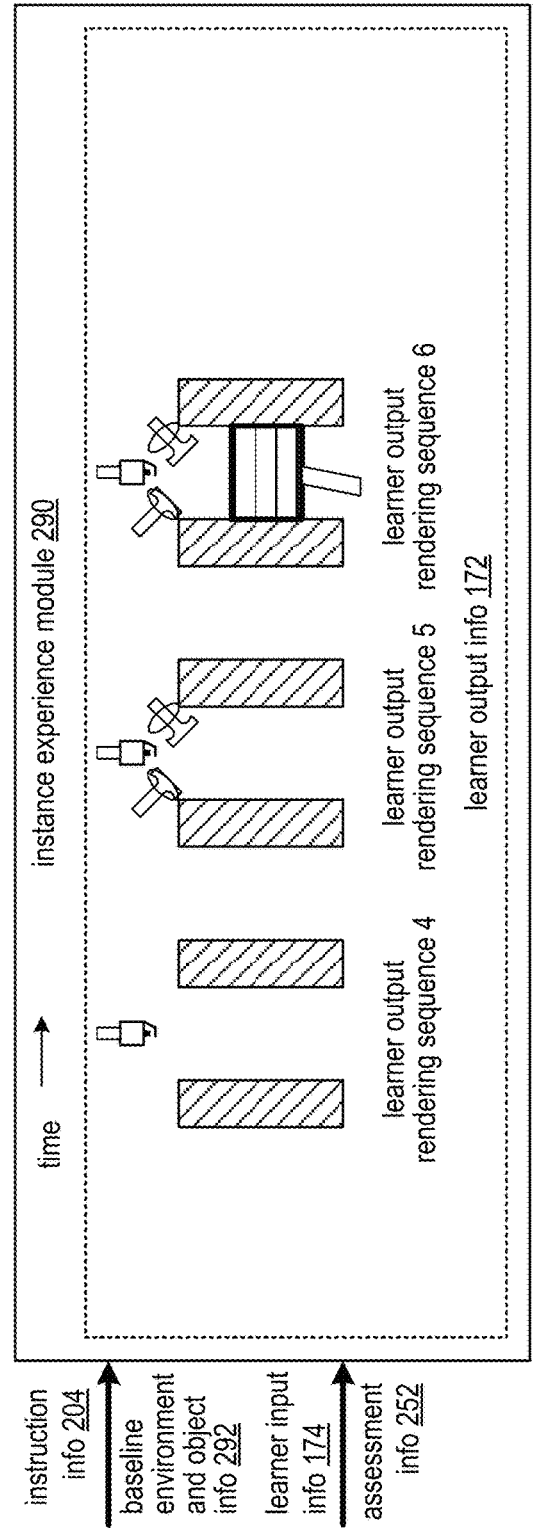

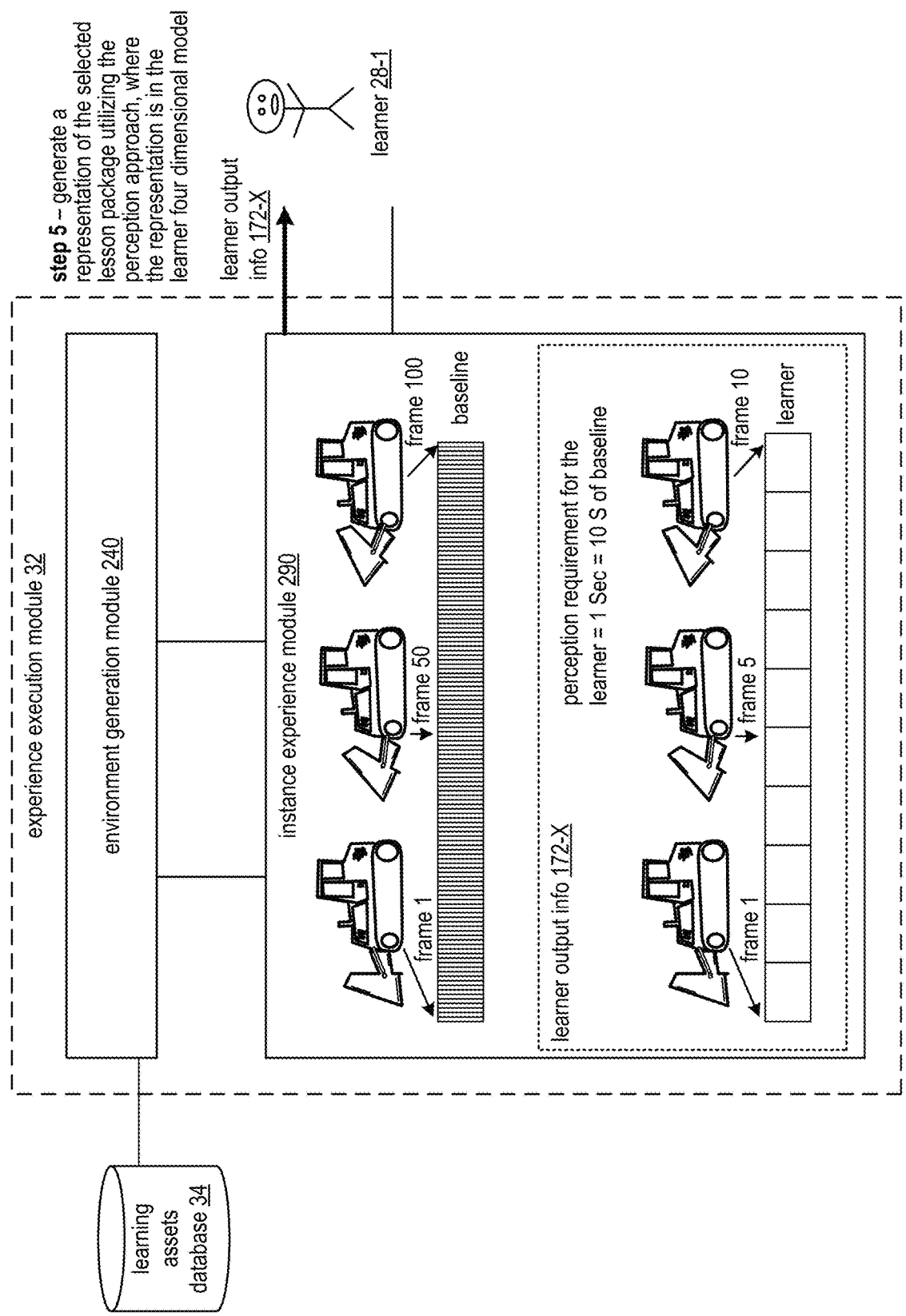

UPDATING A LESSON PACKAGE

CROSS-REFERENCE TO RELATED APPLICATIONS

The present U.S. Utility Patent Application claims priority pursuant to 35 U.S.C. § 119(e) to U.S. Provisional Application No. 63/064,742, entitled "UPDATING A LESSON PACKAGE", filed Aug. 12, 2020, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer systems and more particularly to computer systems providing educational, training, and entertainment content.

Description of Related Art

Computer systems communicate data, process data, and/or store data. Such computer systems include computing devices that range from wireless smart phones, laptops, tablets, personal computers (PC), work stations, personal three-dimensional (3-D) content viewers, and video game devices, to data centers where data servers store and provide access to digital content. Some digital content is utilized to facilitate education, training, and entertainment. Examples of visual content includes electronic books, reference materials, training manuals, classroom coursework, lecture notes, research papers, images, video clips, sensor data, reports, etc.

A variety of educational systems utilize educational tools and techniques. For example, an educator delivers educational content to students via an education tool of a recorded lecture that has built-in feedback prompts (e.g., questions, verification of viewing, etc.). The educator assess a degree of understanding of the educational content and/or overall competence level of a student from responses to the feedback prompts.

BRIEF DESCRIPTION OF THE SEVERAL VIEWS OF THE DRAWING(S)

FIG. 4 is a schematic block diagram of an embodiment of an environment sensor module of a computing system in accordance with the present invention;

Figure 10A:
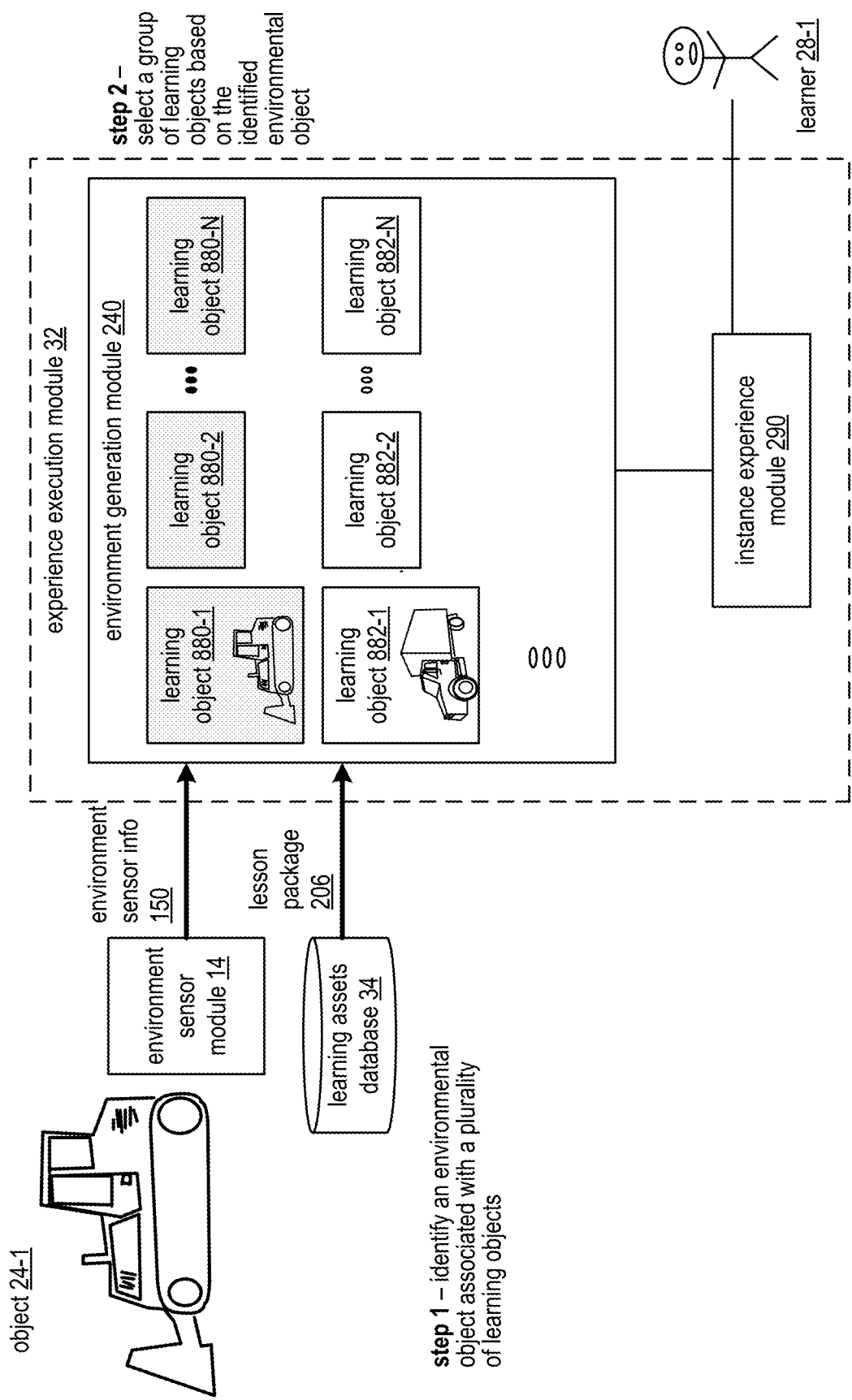
Figure 10B:
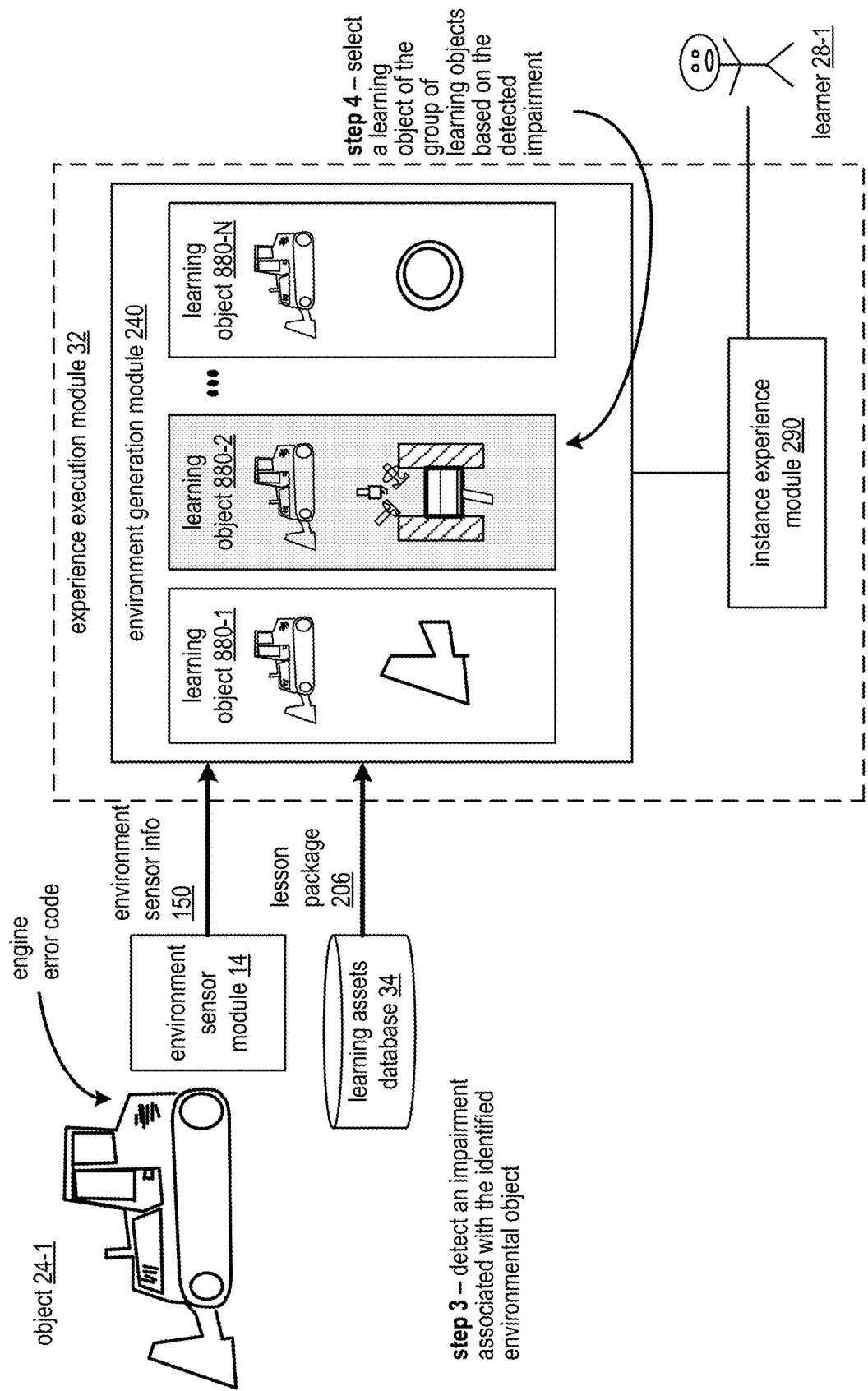
Figure 10C:
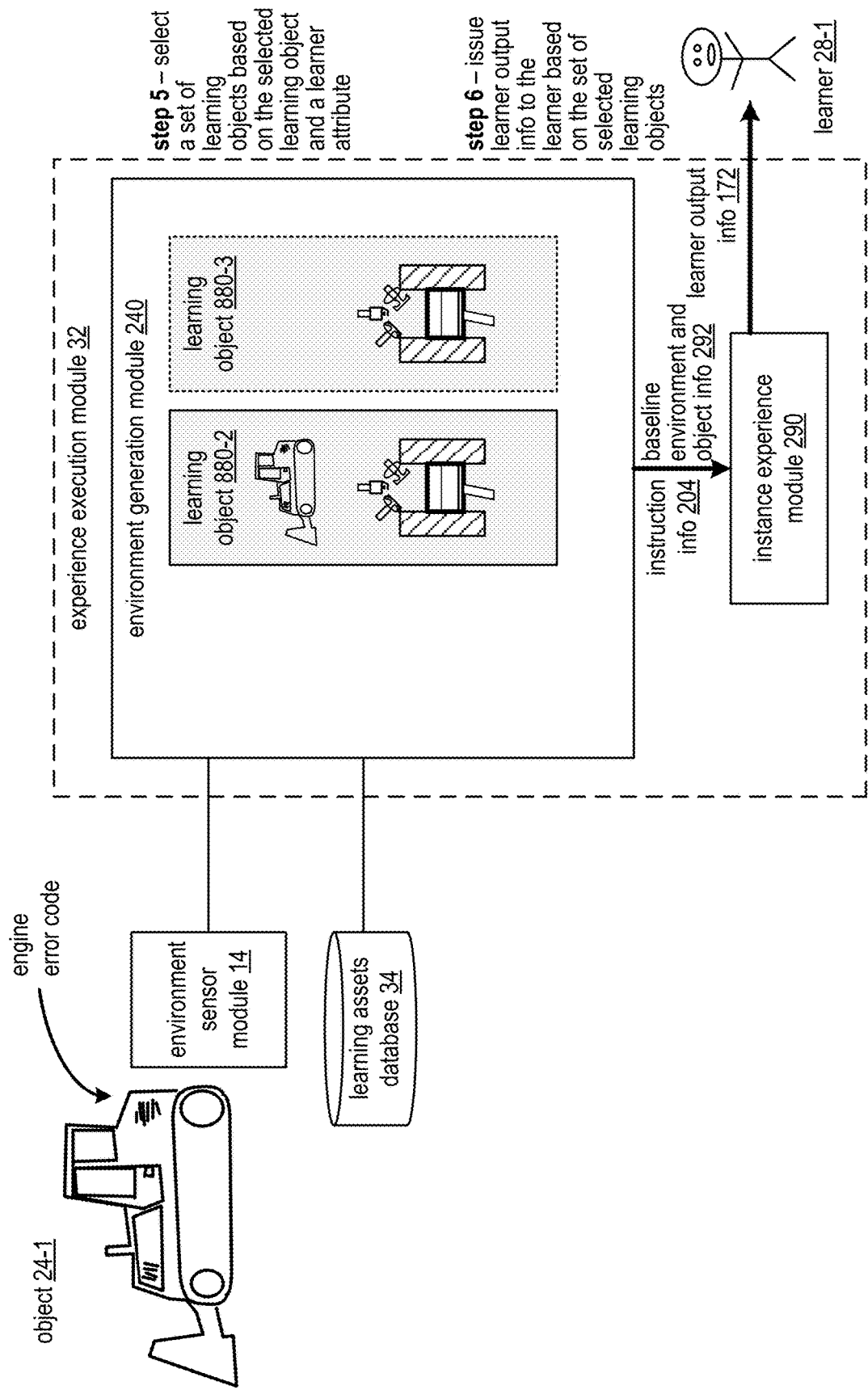
Figure 12A:
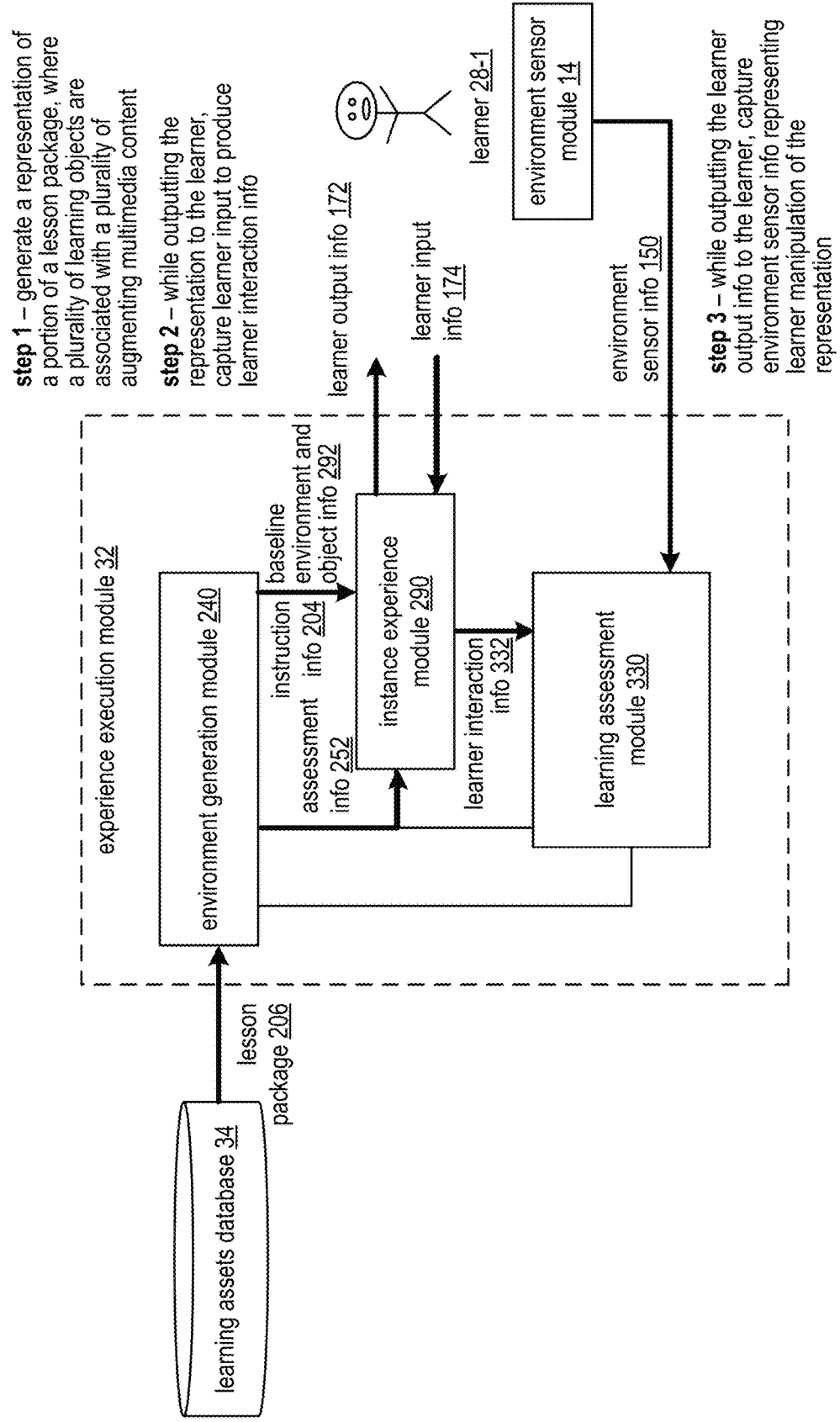
Figure 12B:
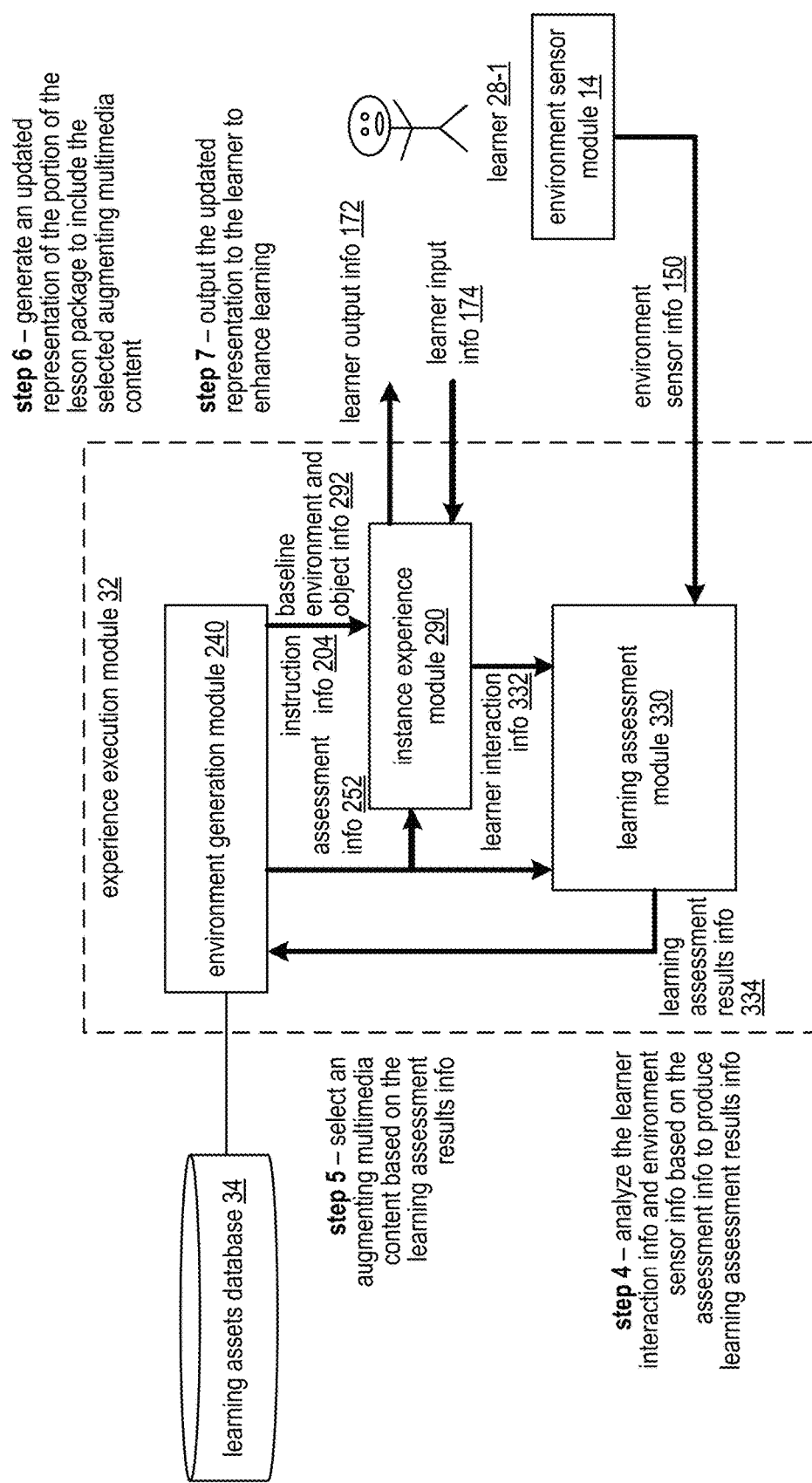
Figure 12C:
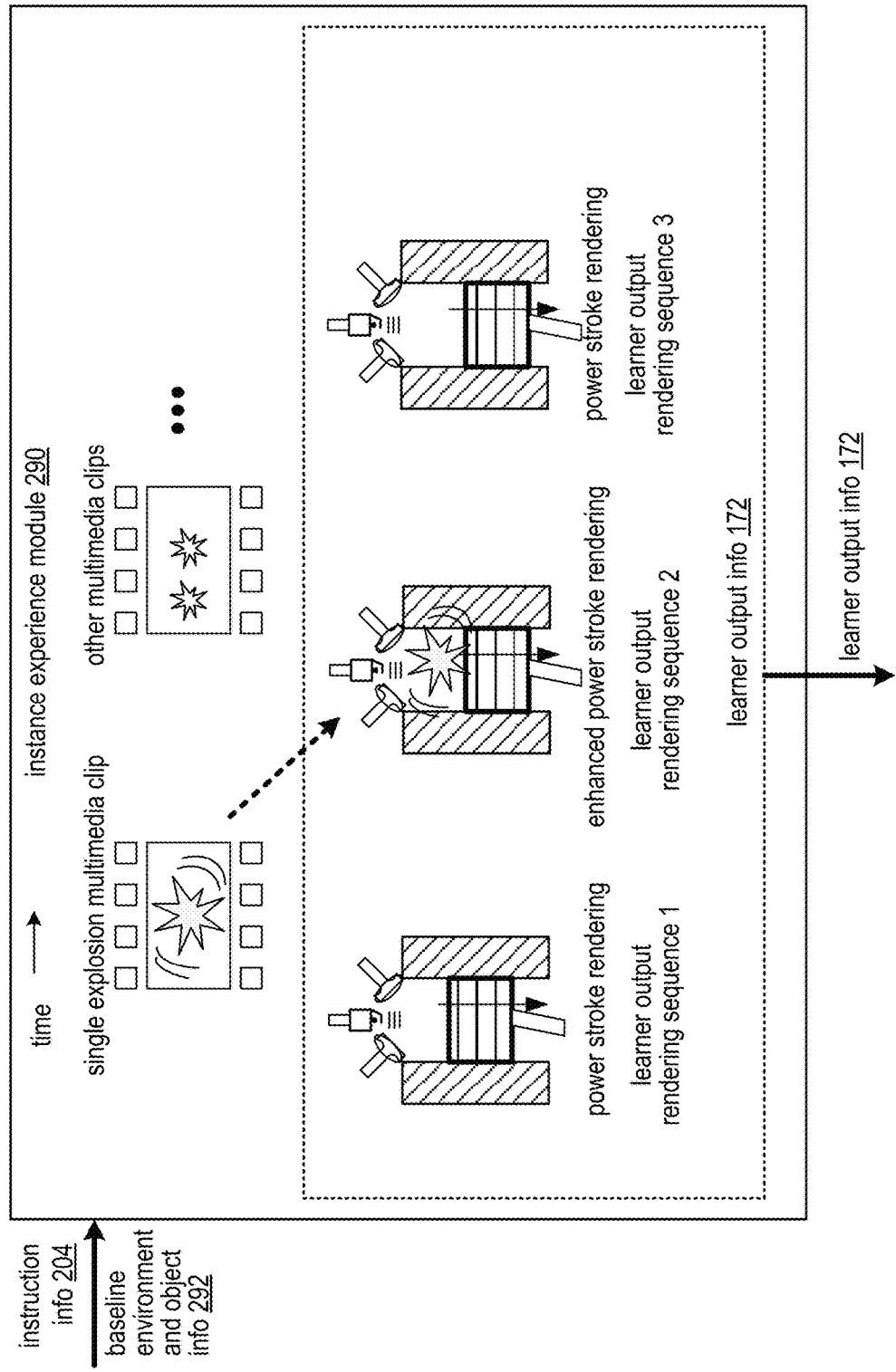
Figure 13A:
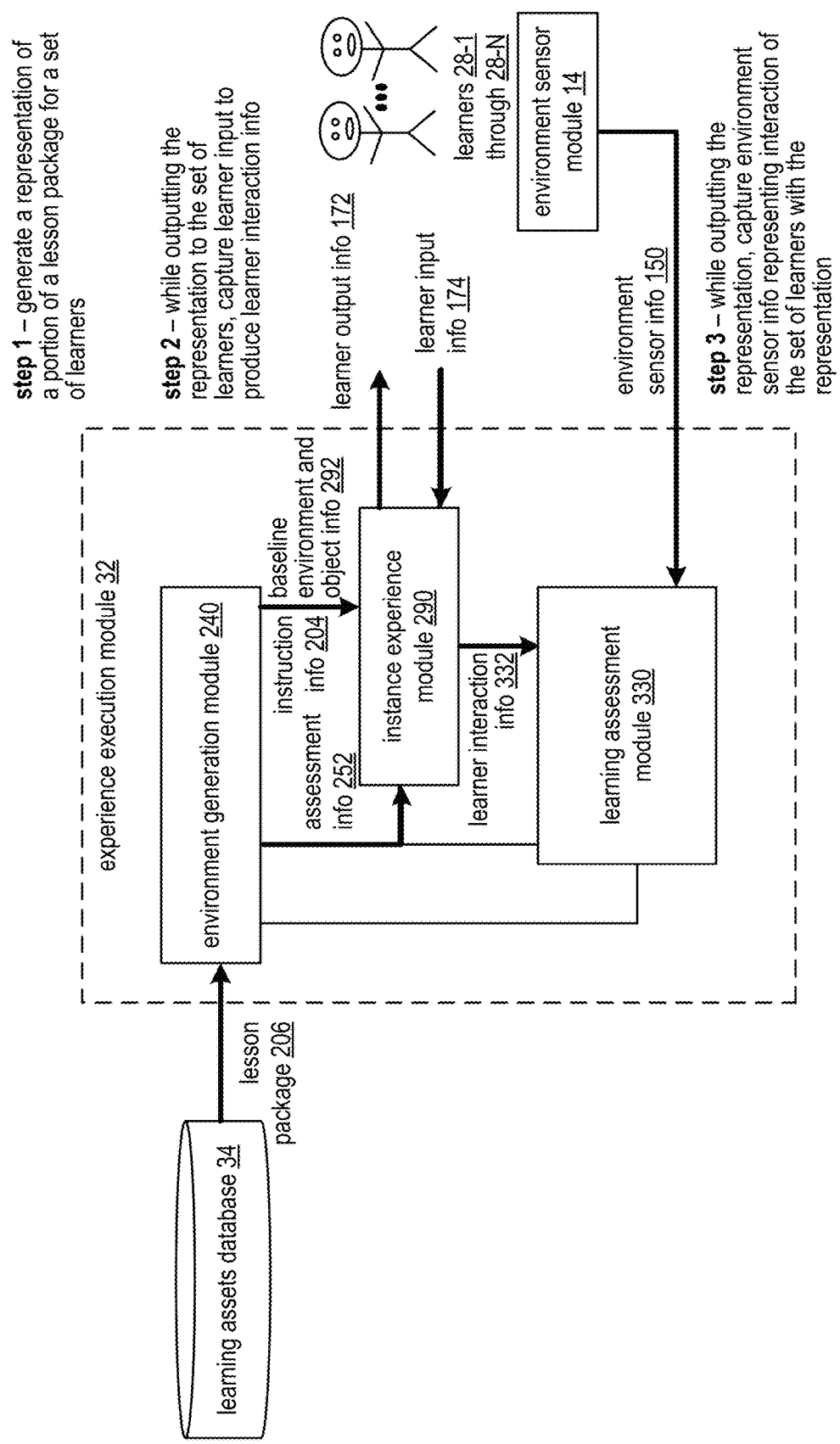
Figure 13B:
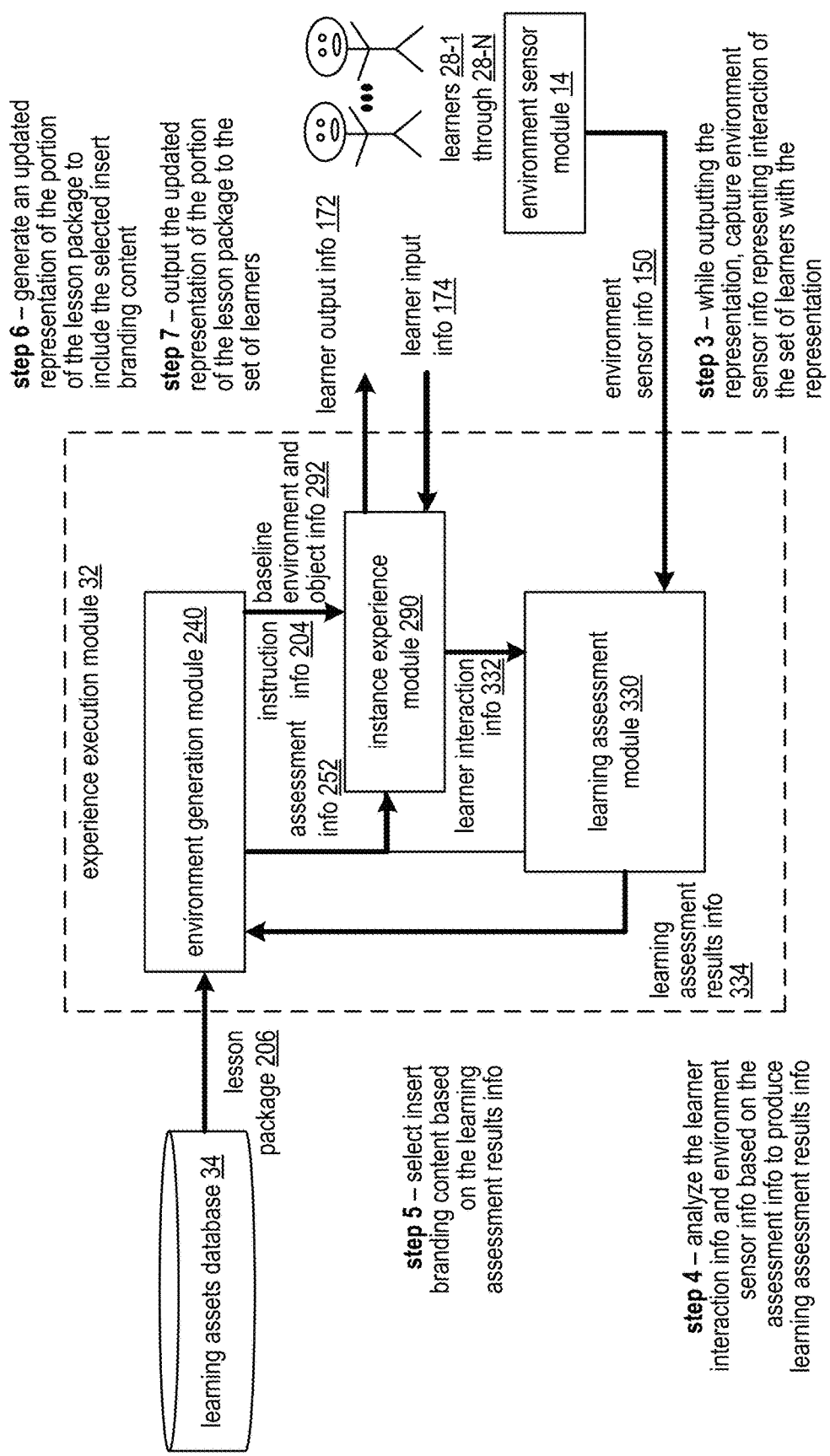
Figure 13C:
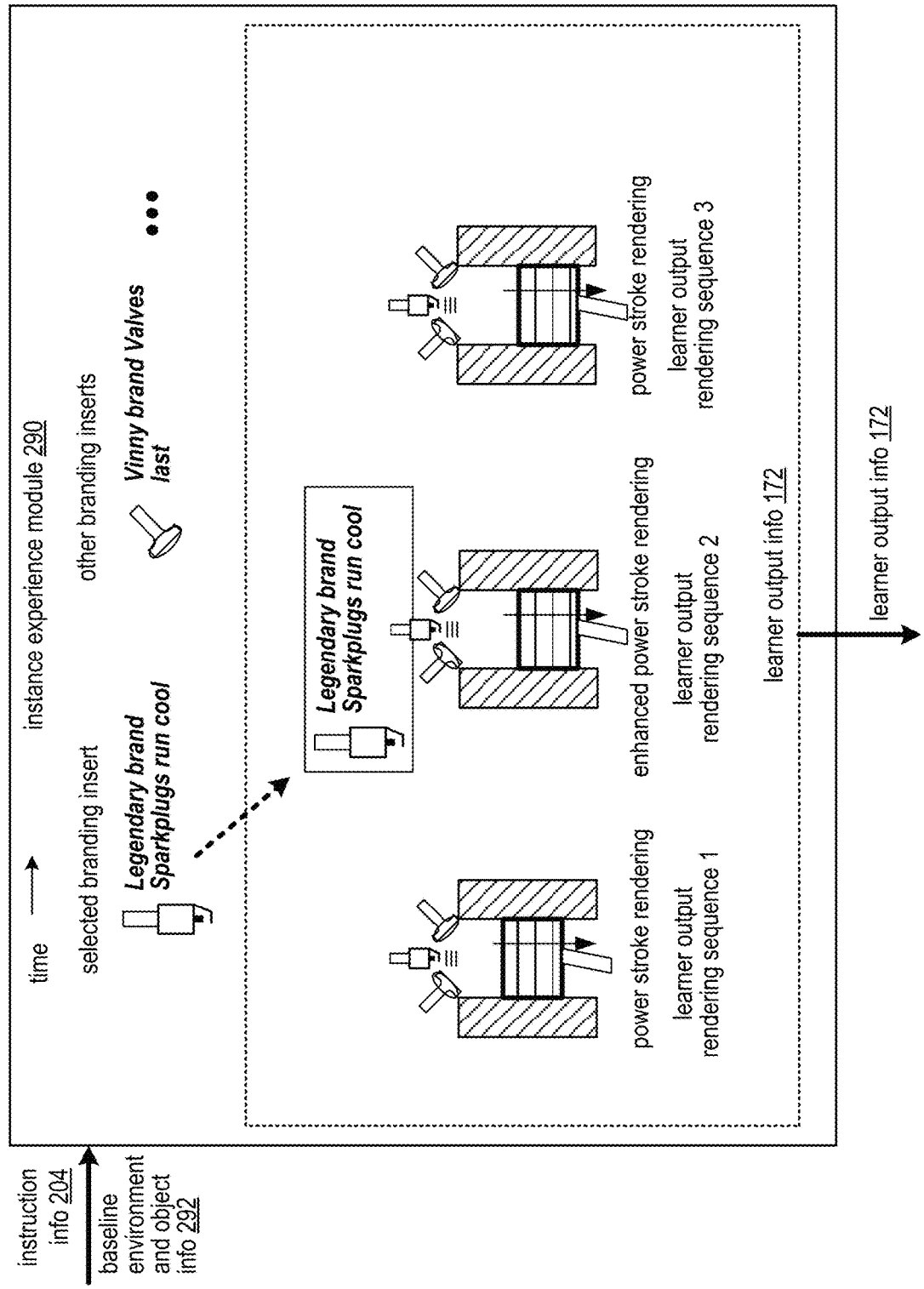
Figure 14A:
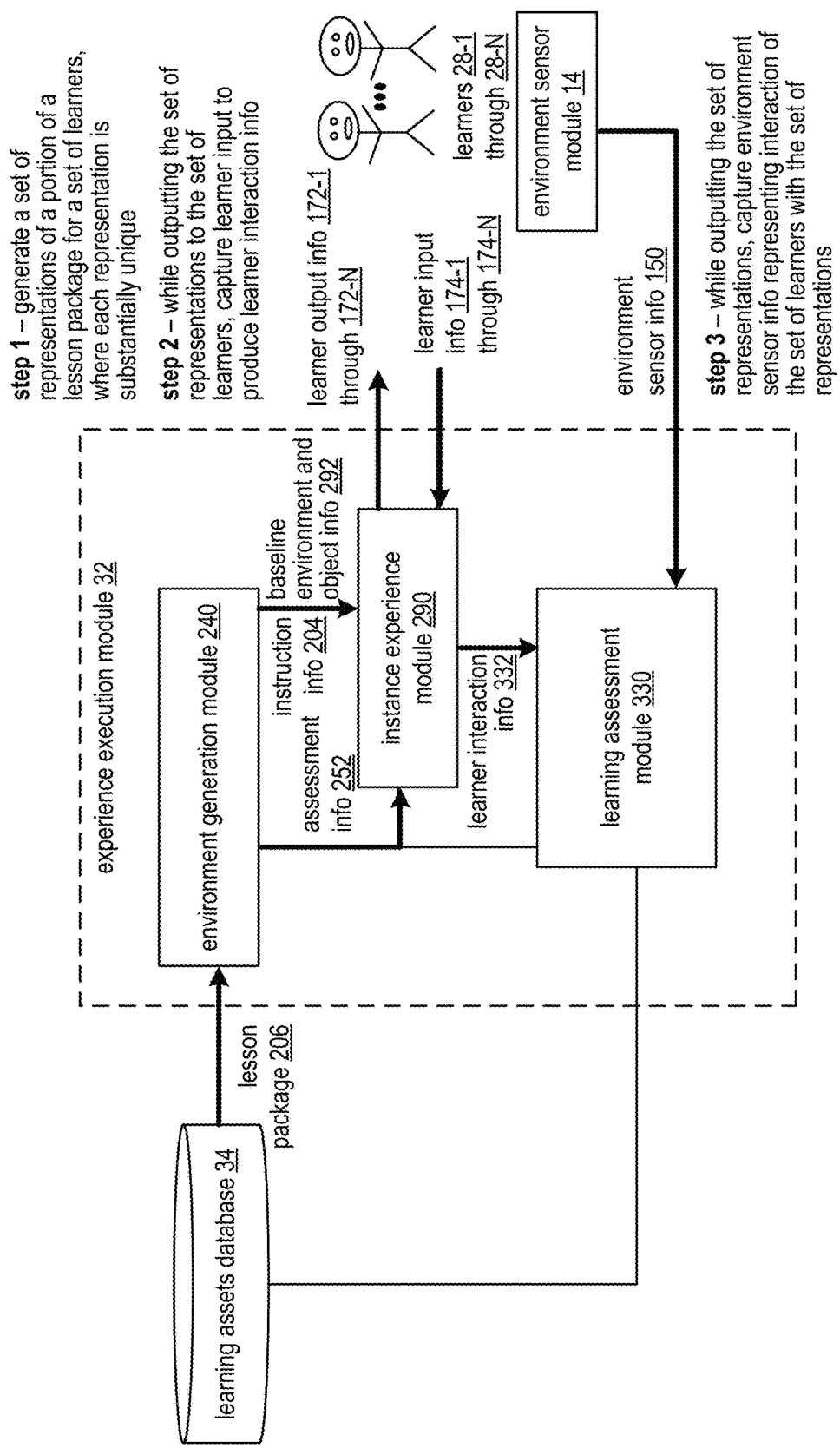
Figure 14B:
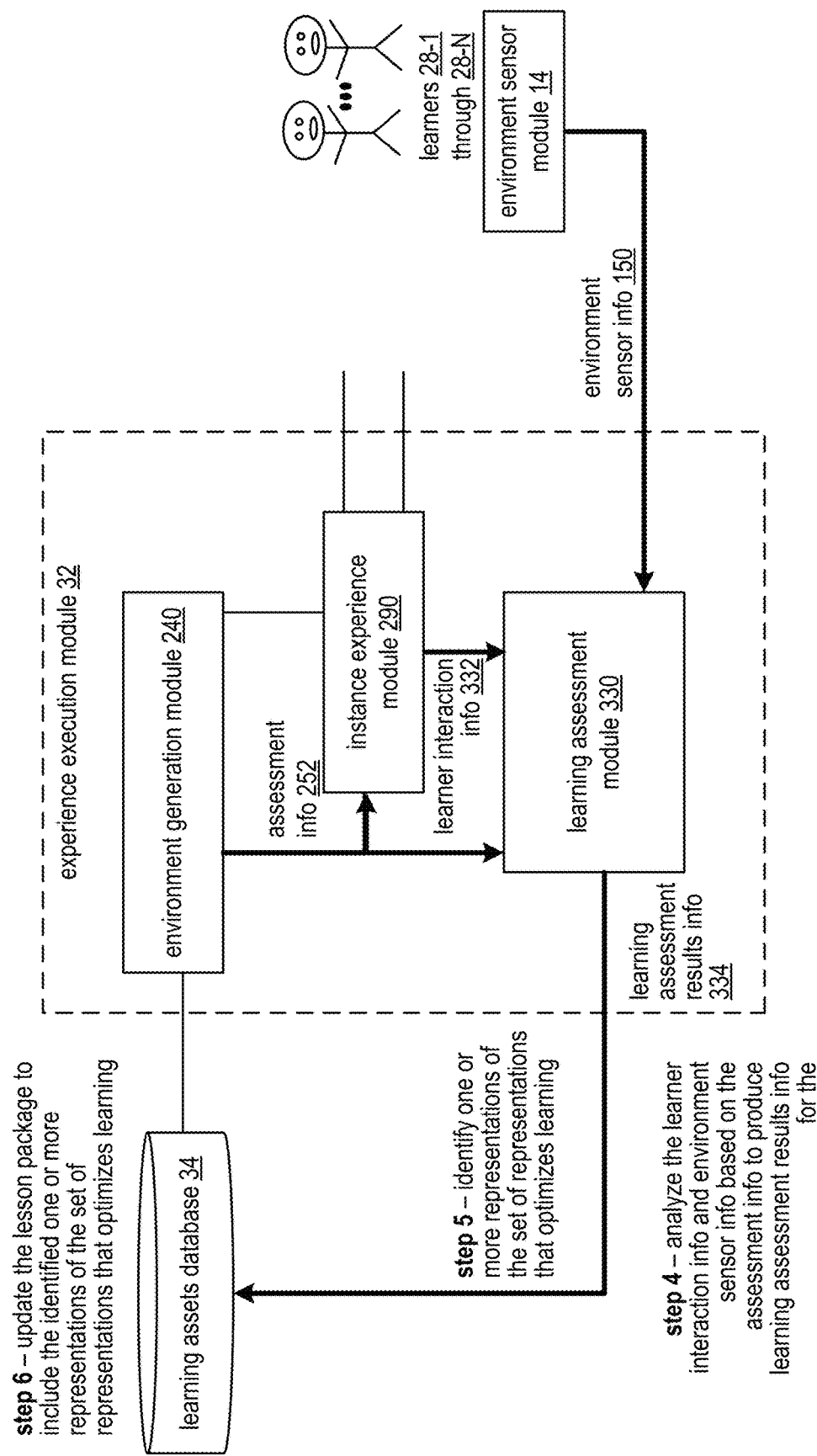
Figure 15A:
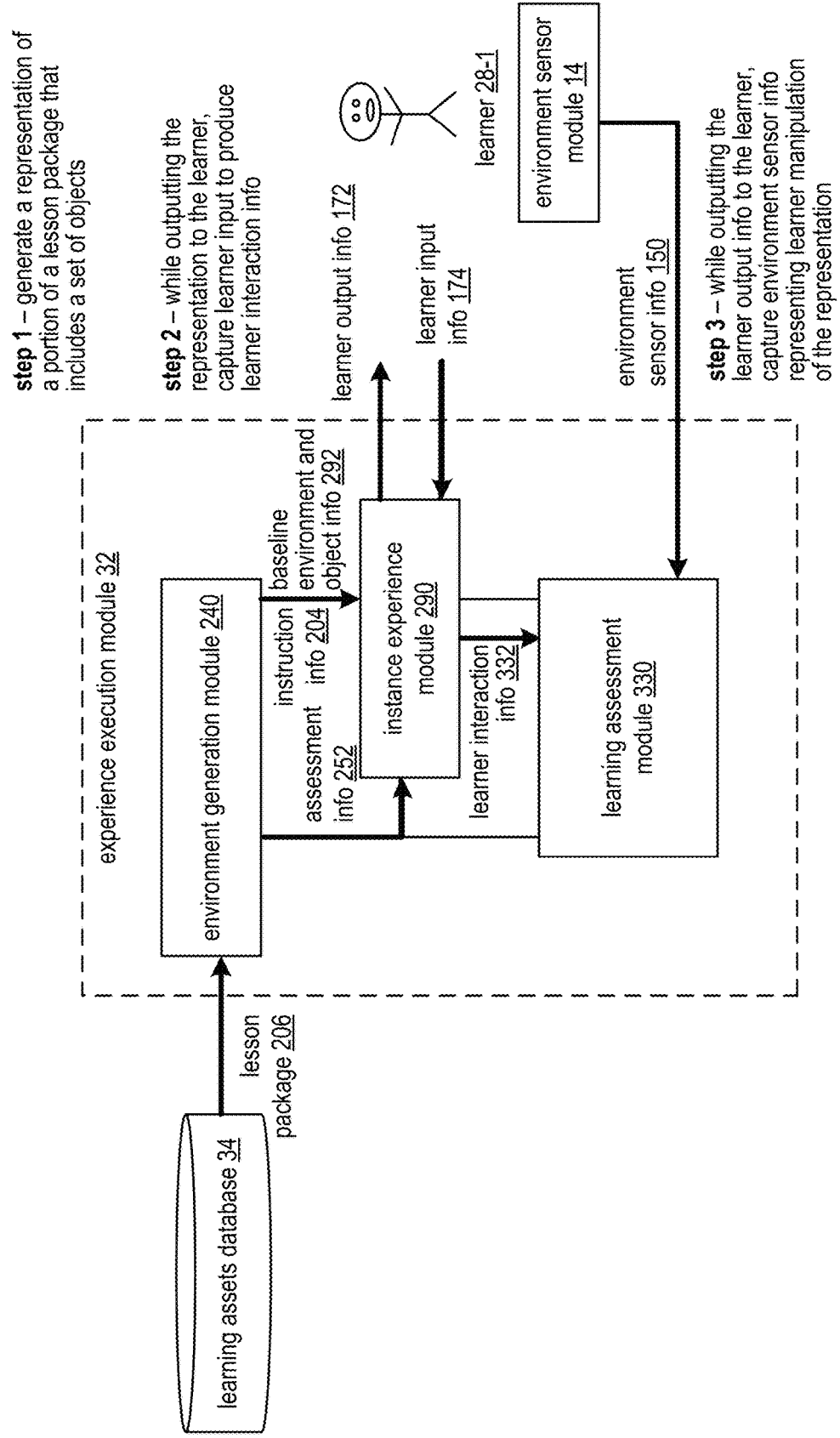
Figure 15B:
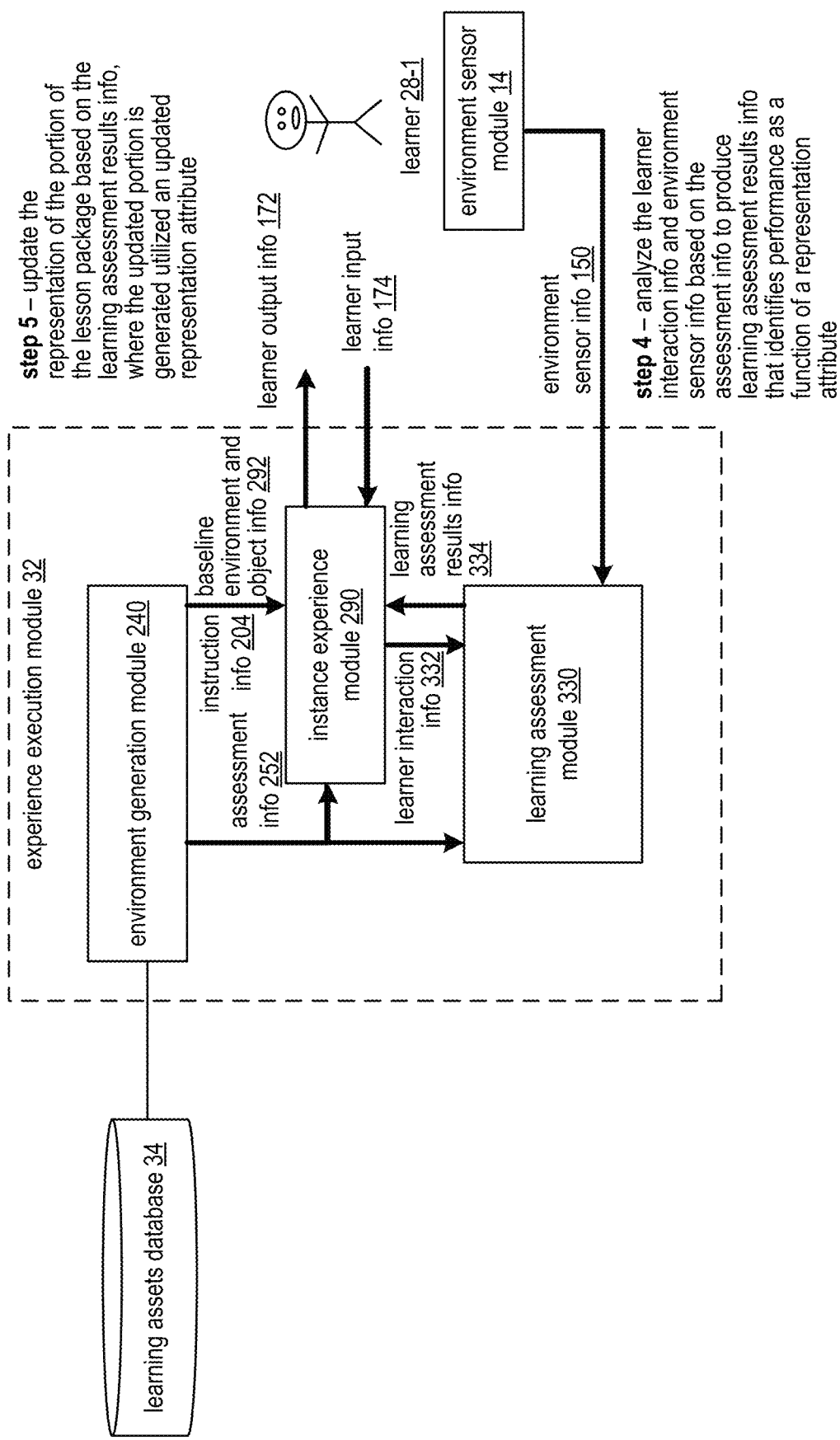
Figure 15C:
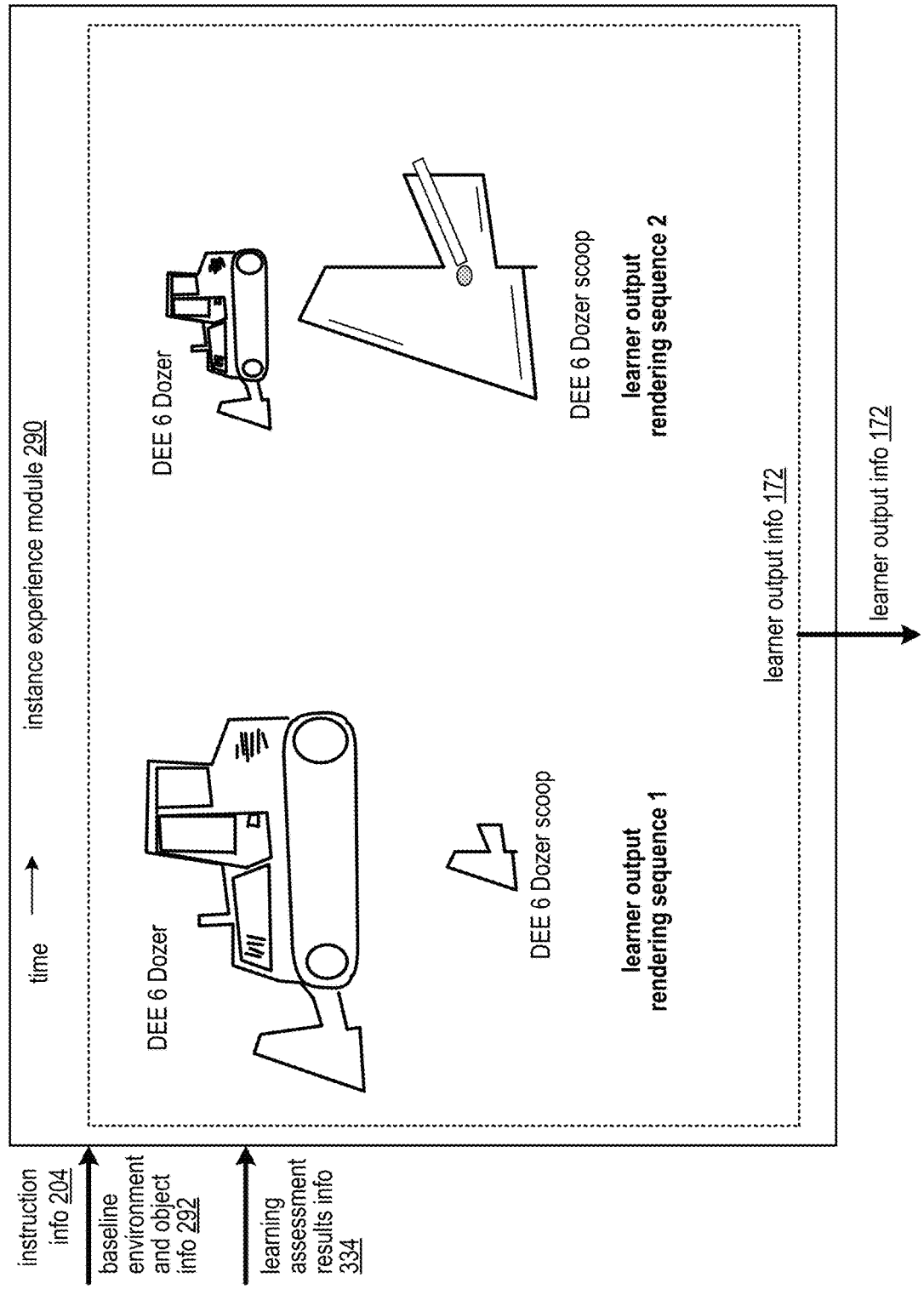
Figure 16A:
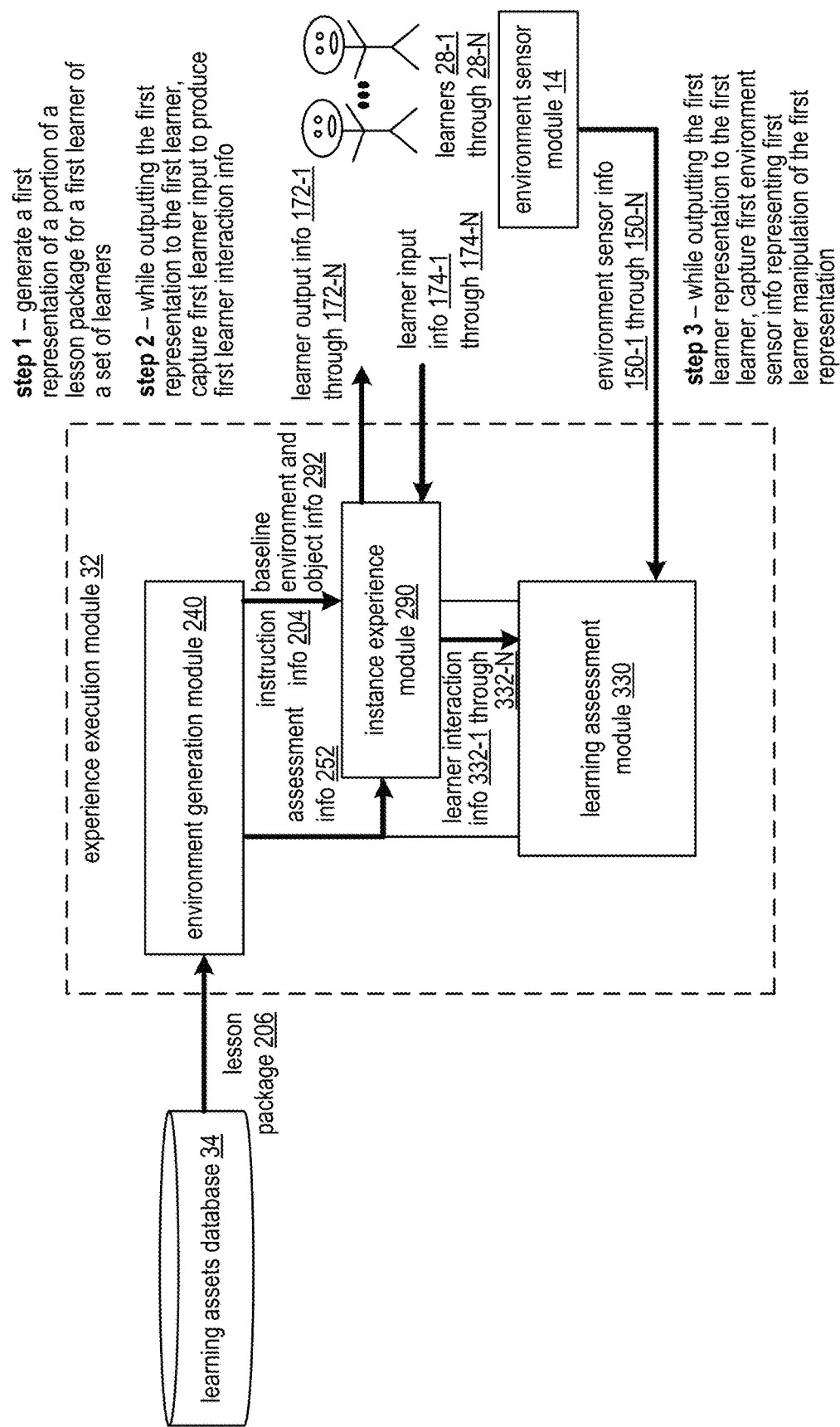
Figure 16B:
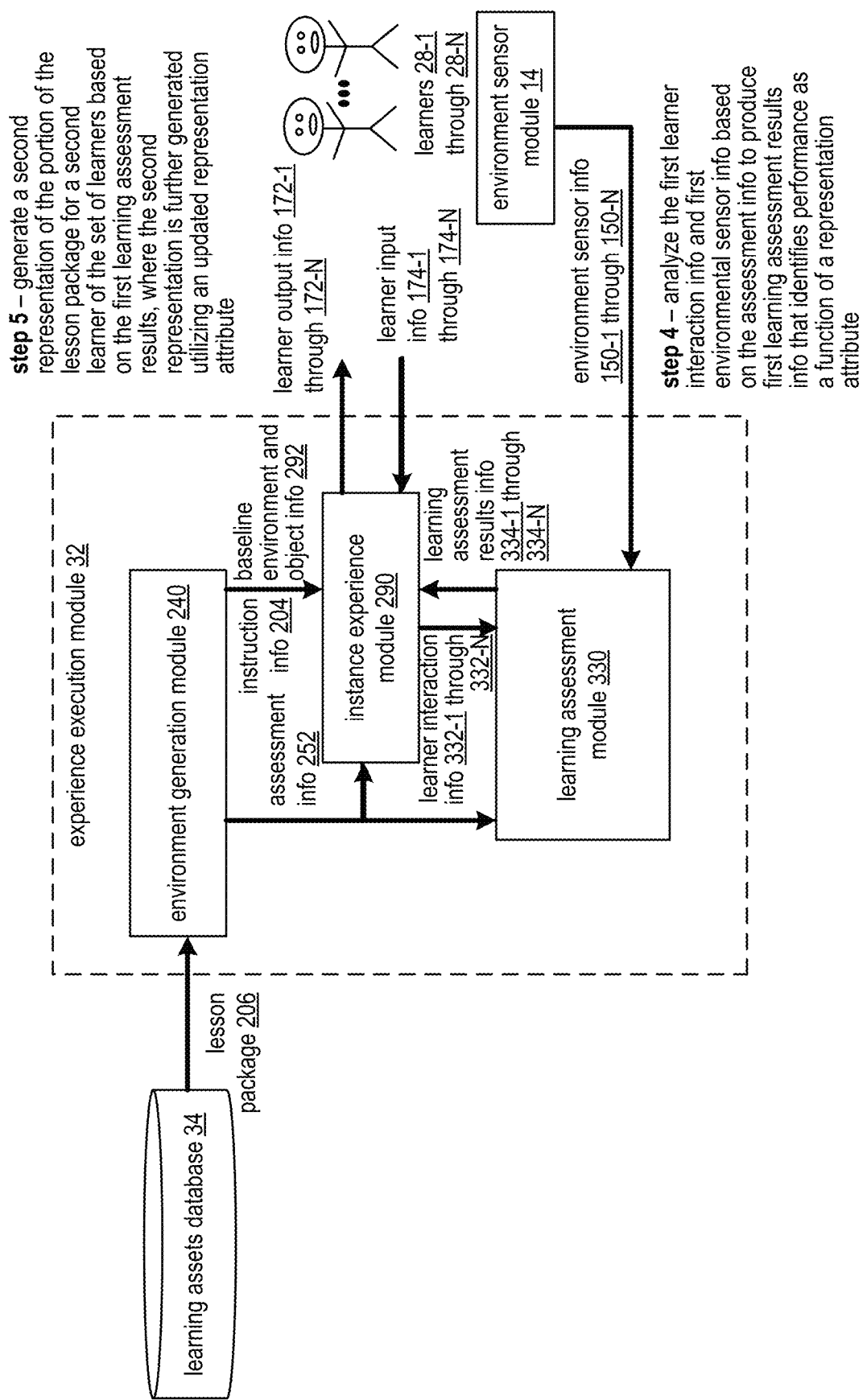
Figure 16C:
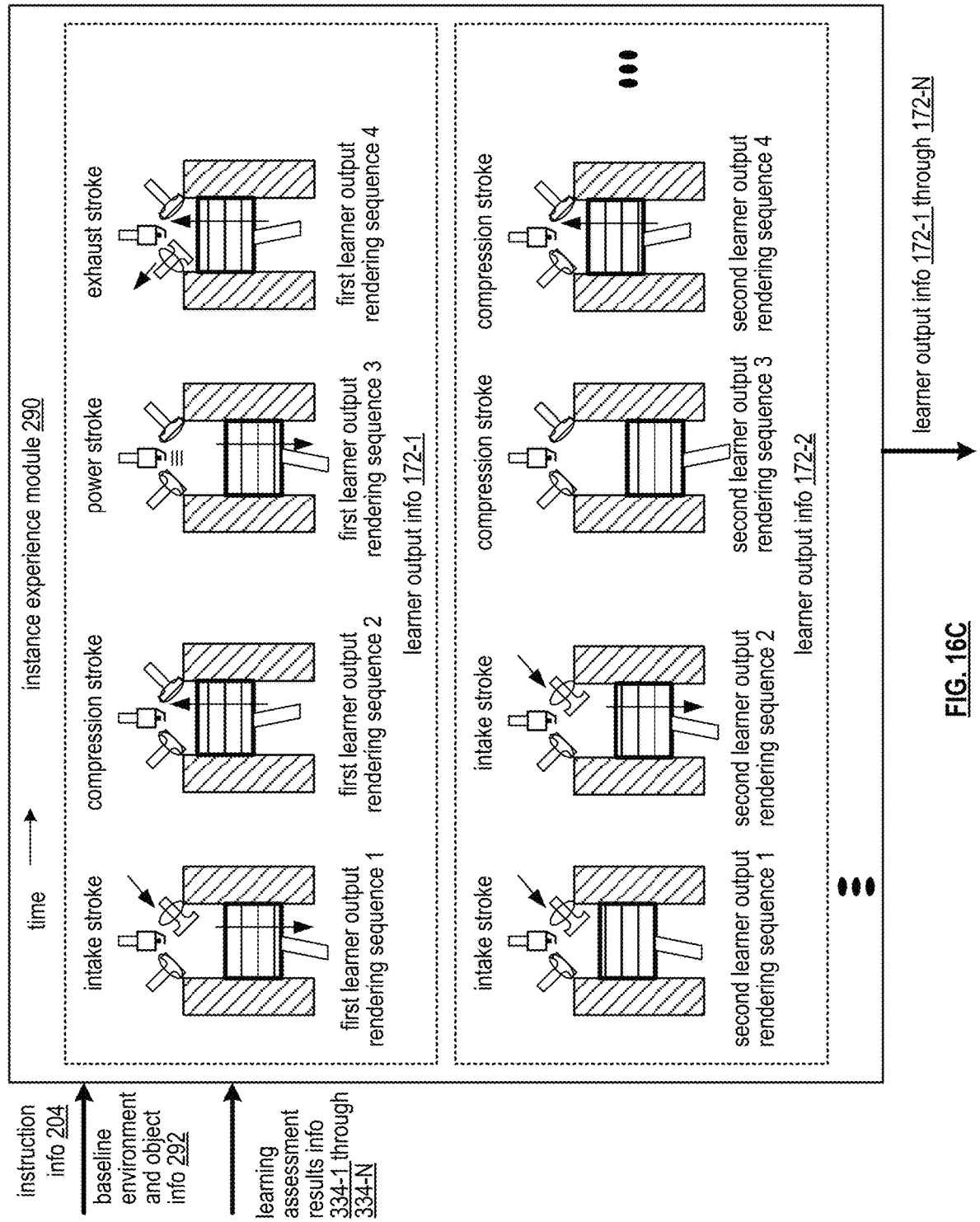
Figure 17A:
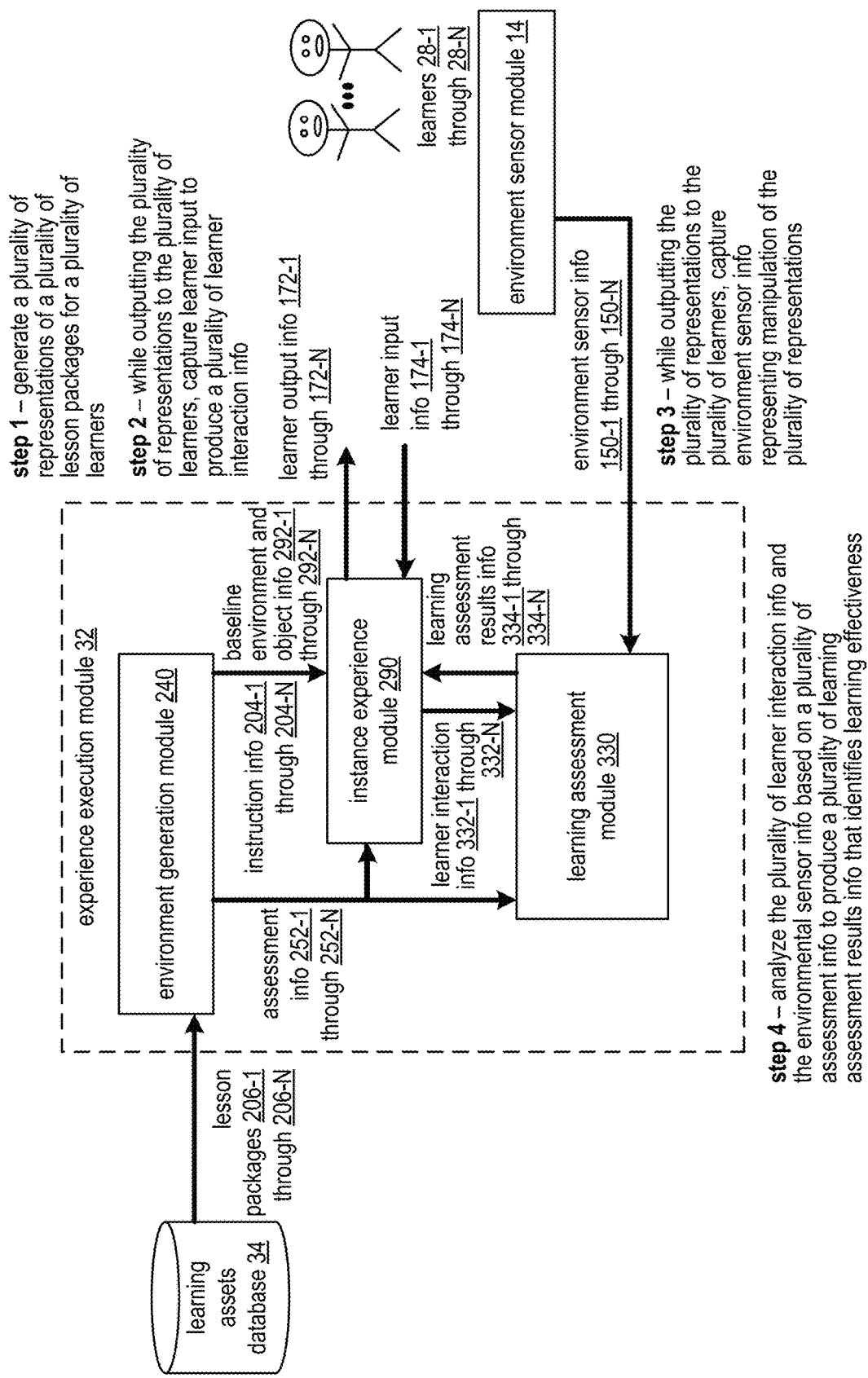
Figure 17B:
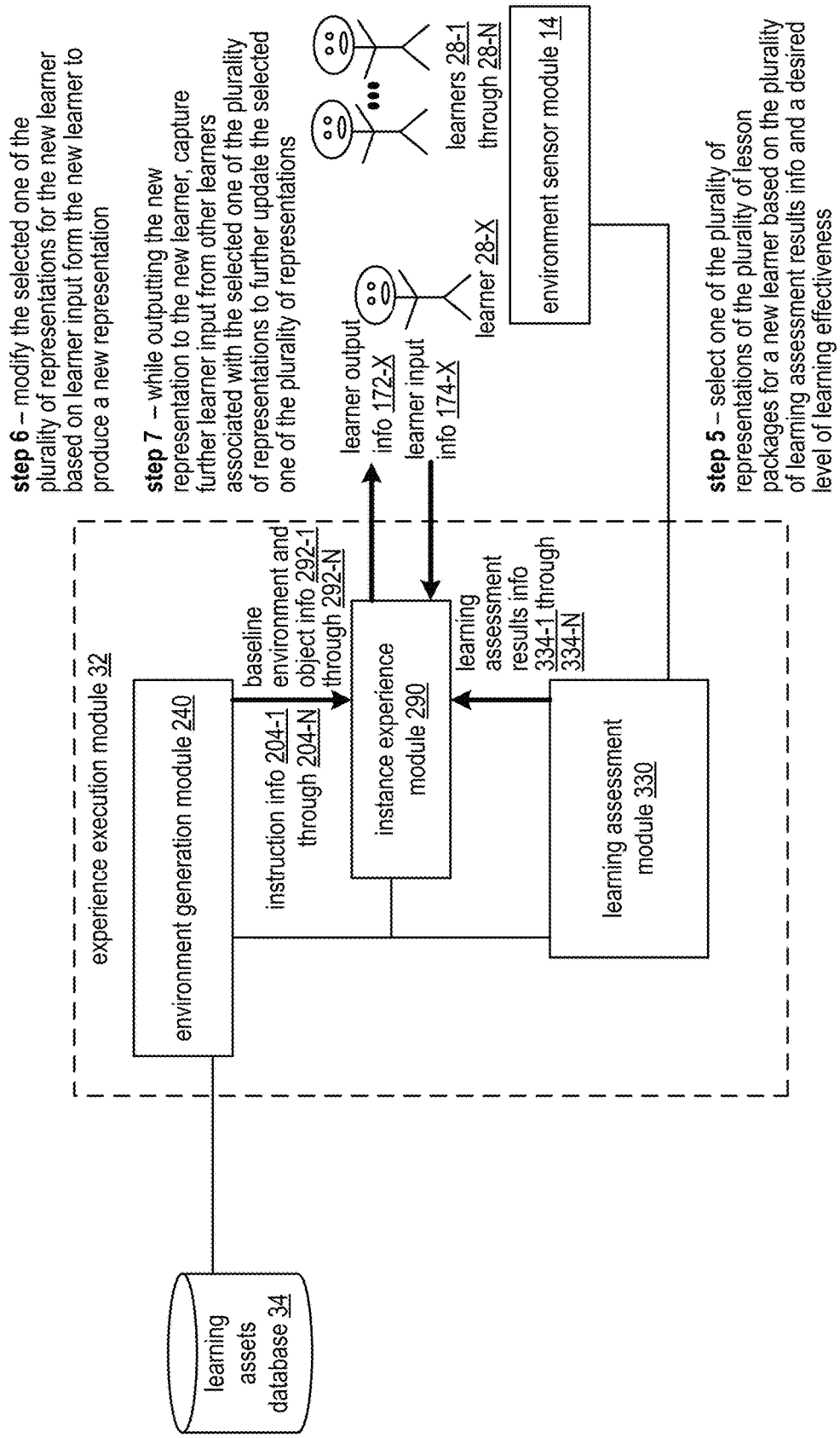
Figure 17C:
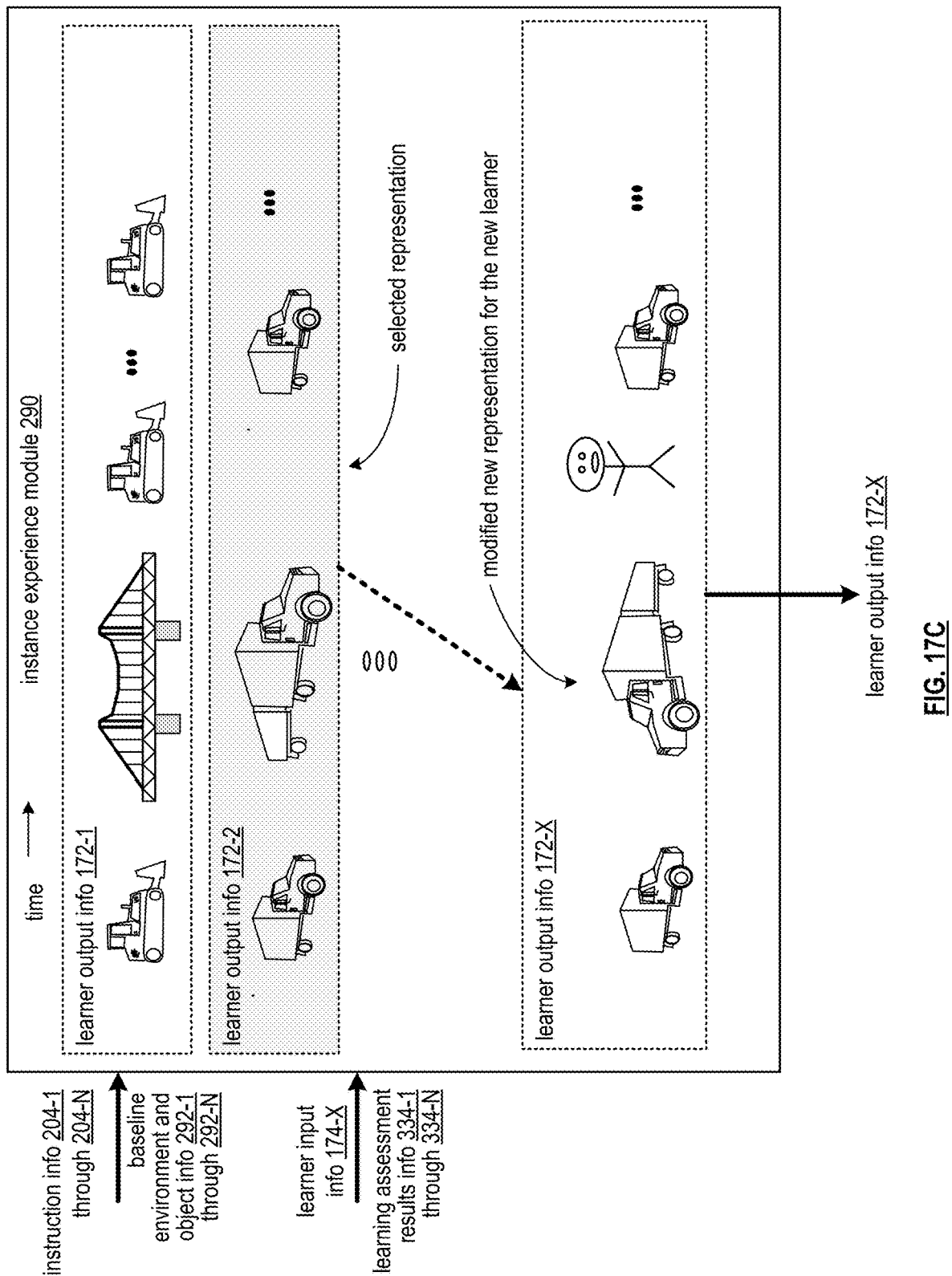
Figure 18A:
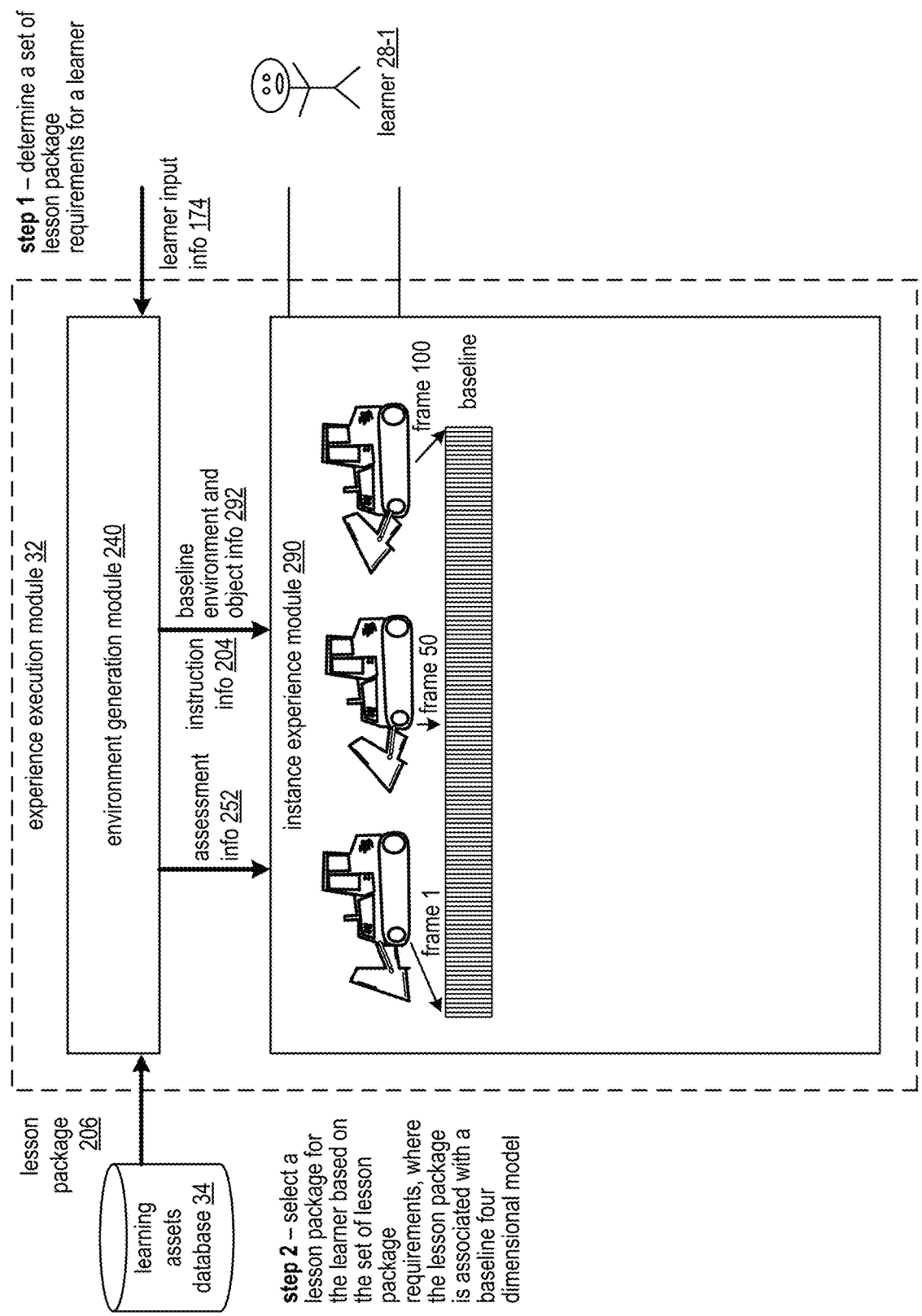
Figure 18B:
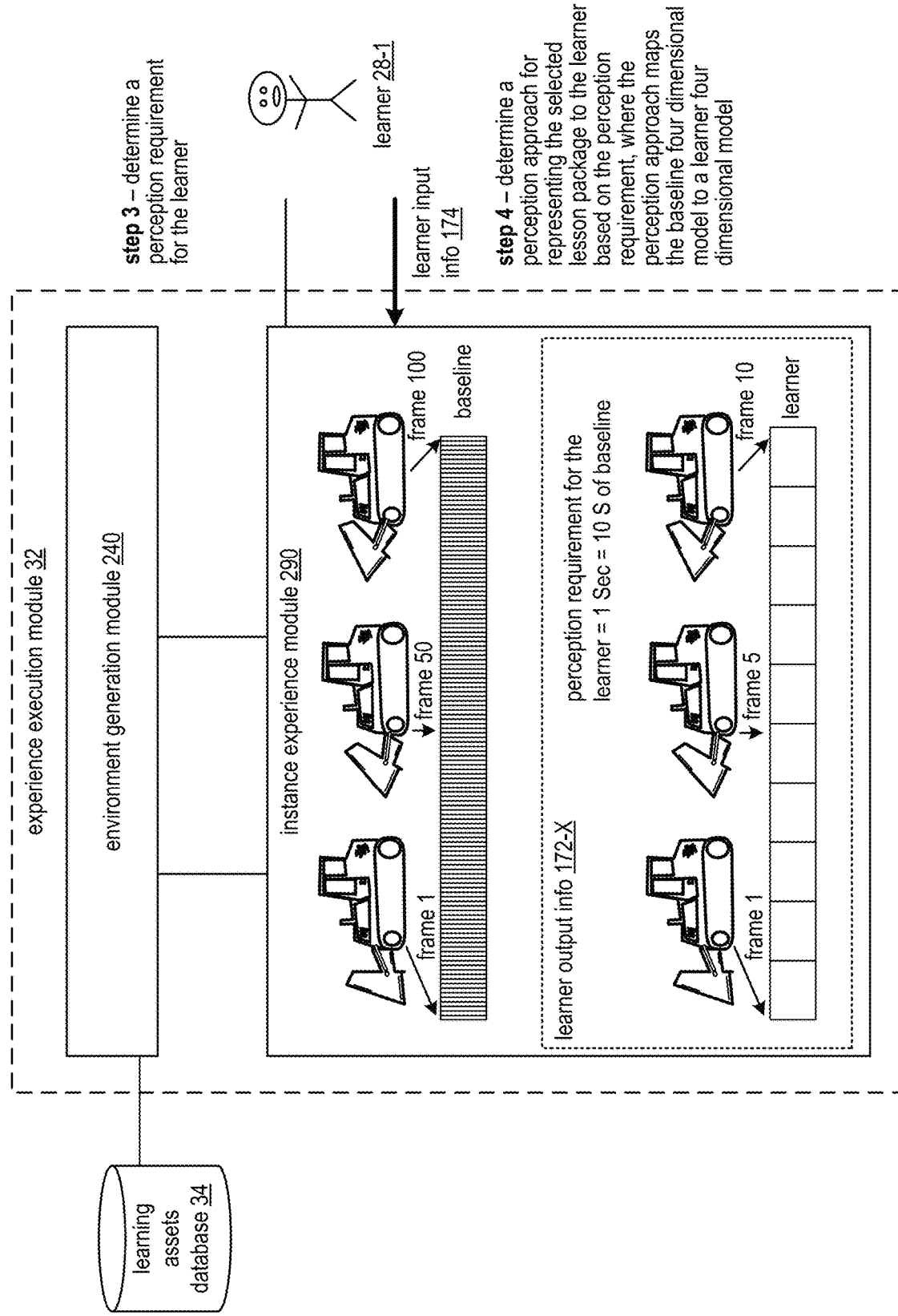

FIGS. 8E, 8F, 8G, 8H, 8J, and 8K are schematic block diagrams of another embodiment of a computing system illustrating another example of creating a learning experience in accordance with the present invention;

FIGS. 9A, 9B, 9C, and 9D are schematic block diagrams of an embodiment of a computing system illustrating an example of updating a lesson package in accordance with the present invention;

FIGS. 10A, 10B, and 10C are schematic block diagrams of an embodiment of a computing system illustrating an example of selecting a lesson package in accordance with the present invention;

FIGS. 11A, 11B, 11C, and 11D are schematic block diagrams of an embodiment of a computing system illustrating an example of utilizing a lesson package in accordance with the present invention;

FIGS. 12A, 12B, and 12C are schematic block diagrams of an embodiment of a computing system illustrating an example of modifying a lesson package in accordance with the present invention;

FIGS. 13A, 13B, and 13C are schematic block diagrams of an embodiment of a computing system illustrating an example of modifying a lesson package in accordance with the present invention;

FIGS. 14A and 14B are schematic block diagrams of an embodiment of a computing system illustrating an example of modifying a lesson package in accordance with the present invention;

FIGS. 15A, 15B, and 15C are schematic block diagrams of an embodiment of a computing system illustrating an example of modifying a lesson package in accordance with the present invention;

FIGS. 16A, 16B, and 16C are schematic block diagrams of an embodiment of a computing system illustrating an example of modifying a lesson package in accordance with the present invention;

FIGS. 17A, 17B, and 17C are schematic block diagrams of an embodiment of a computing system illustrating an example of selecting a lesson package in accordance with the present invention; and FIGS. 18A, 18B, and 18C are schematic block diagrams of an embodiment of a computing system illustrating an example of representing a lesson package in accordance with the present invention.

DETAILED DESCRIPTION OF THE INVENTION

Figure 1:
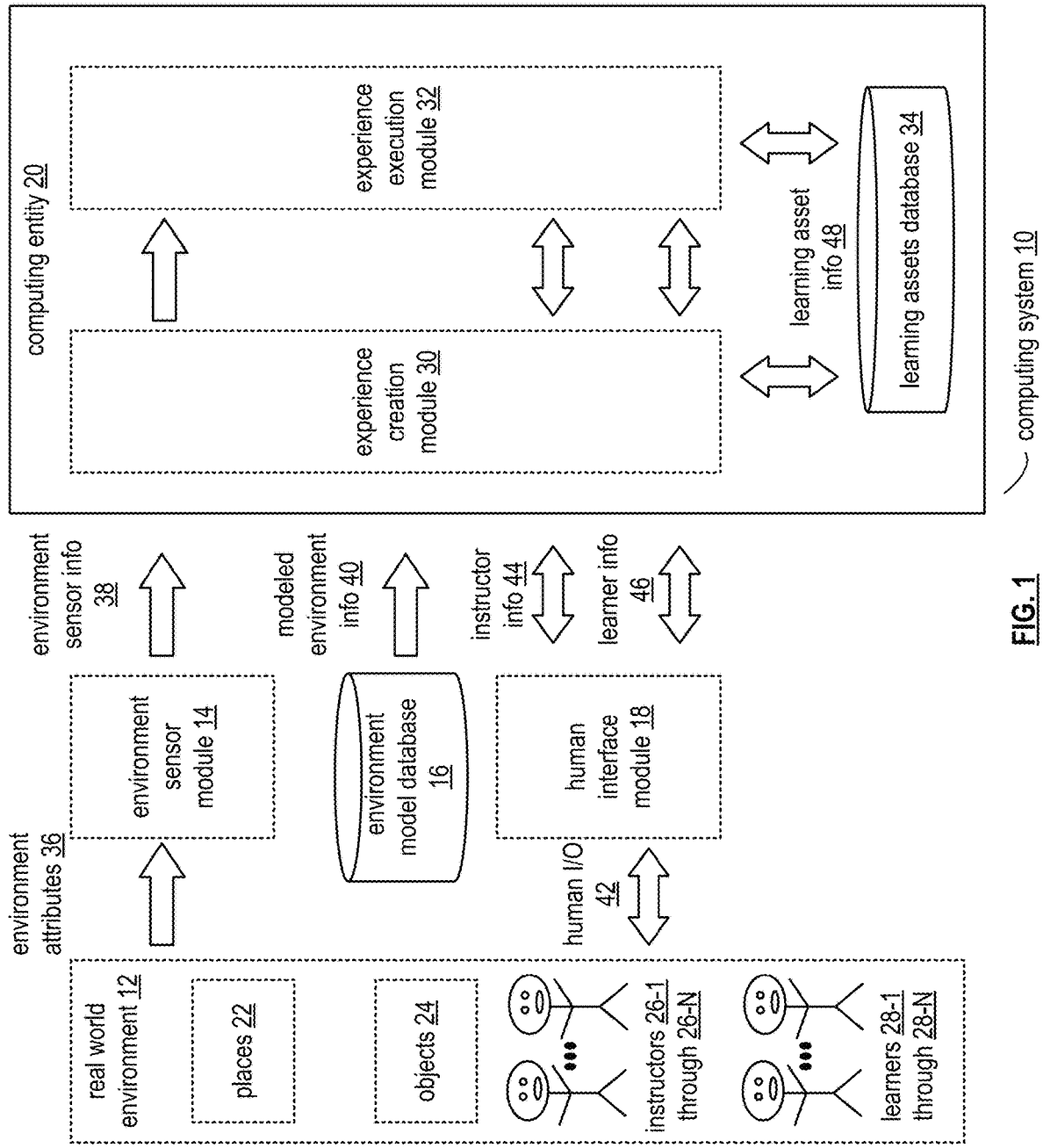
FIG. 1 is a schematic block diagram of an embodiment of a computing system in accordance with the present invention.

FIG. 1 is a schematic block diagram of an embodiment of a computing system 10 that includes a real world environment 12, an environment sensor module 14, and environment model database 16, a human interface module 18, and a computing entity 20. The real-world environment 12 includes places 22, objects 24, instructors 26-1 through 26-N, and learners 28-1 through 28-N. The computing entity 20 includes an experience creation module 30, an experience execution module 32, and a learning assets database 34.

The places 22 includes any area. Examples of places 22 includes a room, an outdoor space, a neighborhood, a city, etc. The objects 24 includes things within the places. Examples of objects 24 includes people, equipment, furniture, personal items, tools, and representations of information (i.e., video recordings, audio recordings, captured text, etc.). The instructors includes any entity (e.g., human or human proxy) imparting knowledge. The learners includes entities trying to gain knowledge and may temporarily serve as an instructor.

In an example of operation of the computing system 10, the experience creation module 30 receives environment sensor information 38 from the environment sensor module 14 based on environment attributes 36 from the real world environment 12. The environment sensor information 38 includes time-based information (e.g., static snapshot, continuous streaming) from environment attributes 36 including XYZ position information, place information, and object information (i.e., background, foreground, instructor, learner, etc.). The XYZ position information includes portrayal in a world space industry standard format (e.g., with reference to an absolute position).

The environment attributes 36 includes detectable measures of the real-world environment 12 to facilitate generation of a multi-dimensional (e.g., including time) representation of the real-world environment 12 in a virtual reality and/or augmented reality environment. For example, the environment sensor module 14 produces environment sensor information 38 associated with a medical examination room and a subject human patient (e.g., an MRI). The environment sensor module 14 is discussed in greater detail with reference to FIG. 4.

Having received the environment sensor information 38, the experience creation module 30 accesses the environment model database 16 to recover modeled environment information 40. The modeled environment information 40 includes a synthetic representation of numerous environments (e.g., model places and objects). For example, the modeled environment information 40 includes a 3-D representation of a typical human circulatory system. The models include those that are associated with certain licensing requirements (e.g., copyrights, etc.).

Having received the modeled environment information 40, the experience creation module 30 receives instructor information 44 from the human interface module 18, where the human interface module 18 receives human input/output (I/O) 42 from instructor 26-1. The instructor information 44 includes a representation of an essence of communication with a participant instructor. The human I/O 42 includes detectable fundamental forms of communication with humans or human proxies. The human interface module 18 is discussed in greater detail with reference to FIG. 3.

Having received the instructor information 44, the experience creation module 30 interprets the instructor information 44 to identify aspects of a learning experience. A learning experience includes numerous aspects of an encounter between one or more learners and an imparting of knowledge within a representation of a learning environment that includes a place, multiple objects, and one or more instructors. The learning experience further includes an instruction portion (e.g., acts to impart knowledge) and an assessment portion (e.g., further acts and/or receiving of learner input) to determine a level of comprehension of the knowledge by the one or more learners. The learning experience still further includes scoring of the level of comprehension and tallying multiple learning experiences to facilitate higher-level competency accreditations (e.g., certificates, degrees, licenses, training credits, experiences completed successfully, etc.).

As an example of the interpreting of the instructor information 44, the experience creation module 30 identifies a set of concepts that the instructor desires to impart upon a learner and a set of comprehension verifying questions and associated correct answers. The experience creation module 30 further identifies step-by-step instructor annotations associated with the various objects within the environment of the learning experience for the instruction portion and the assessment portion. For example, the experience creation module 30 identifies positions held by the instructor 26-1 as the instructor narrates a set of concepts associated with the subject patient circulatory system. As a further example, the experience creation module 30 identifies circulatory system questions and correct answers posed by the instructor associated with the narrative.

Having interpreted the instructor information 44, the experience creation module 30 renders the environment sensor information 38, the modeled environment information 40, and the instructor information 44 to produce learning assets information 48 for storage in the learning assets database 34. The learning assets information 48 includes all things associated with the learning experience to facilitate subsequent recreation. Examples includes the environment, places, objects, instructors, learners, assets, recorded instruction information, learning evaluation information, etc.

Execution of a learning experience for the one or more learners includes a variety of approaches. A first approach includes the experience execution module 32 recovering the learning assets information 48 from the learning assets database 34, rendering the learning experience as learner information 46, and outputting the learner information 46 via the human interface module 18 as further human I/O 42 to one or more of the learners 28-1 through 28-N. The learner information 46 includes information to be sent to the one or more learners and information received from the one or more learners. For example, the experience execution module 32 outputs learner information 46 associated with the instruction portion for the learner 28-1 and collects learner information 46 from the learner 28-1 that includes submitted assessment answers in response to assessment questions of the assessment portion communicated as further learner information 46 for the learner 28-1.

A second approach includes the experience execution module 32 rendering the learner information 46 as a combination of live streaming of environment sensor information 38 from the real-world environment 12 along with an augmented reality overlay based on recovered learning asset information 48. For example, a real world subject human patient in a medical examination room is live streamed as the environment sensor information 38 in combination with a prerecorded instruction portion from the instructor 26-1.

Figure 2A:
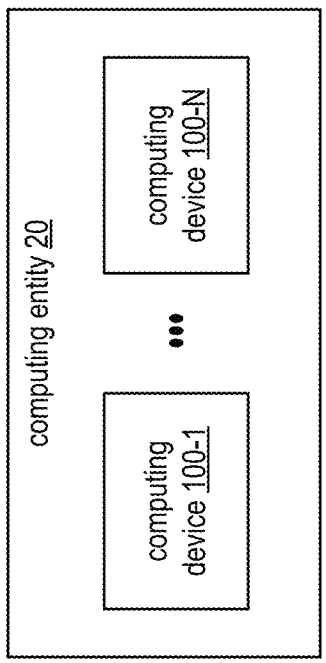
FIG. 2A is a schematic block diagram of an embodiment of a computing entity of a computing system in accordance with the present invention.

FIG. 2A is a schematic block diagram of an embodiment of the computing entity 20 of the computing system 10. The computing entity 20 includes one or more computing devices 100-1 through 100-N. A computing device is any electronic device that communicates data, processes data, represents data (e.g., user interface) and/or stores data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices includes a personal computer, a computer server, a cable set-top box, a fixed display device, an appliance, and industrial controller, a video game counsel, a home entertainment controller, a critical infrastructure controller, and/or any type of home, office or cloud computing equipment that includes a computing core.

Figure 2B:
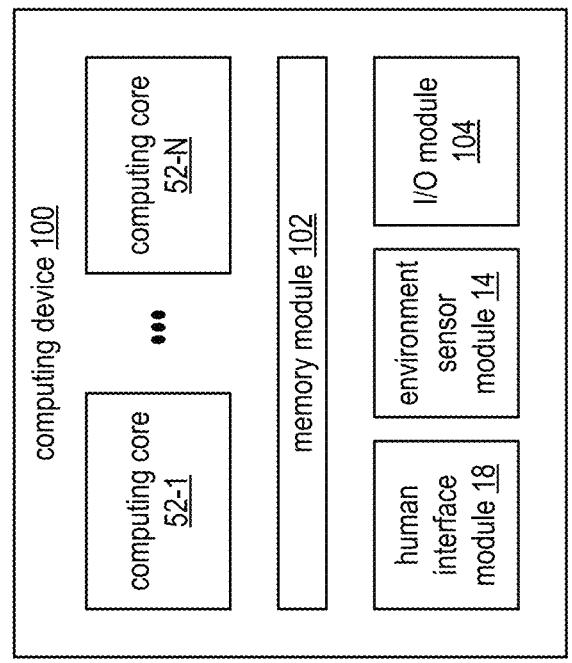
FIG. 2B is a schematic block diagram of an embodiment of a computing device of a computing system in accordance with the present invention.

FIG. 2B is a schematic block diagram of an embodiment of a computing device 100 of the computing system 10 that includes one or more computing cores 52-1 through 52-N, a memory module 102, the human interface module 18, the environment sensor module 14, and an I/O module 104. In alternative embodiments, the human interface module 18, the environment sensor module 14, the I/O module 104, and the memory module 102 may be standalone (e.g., external to the computing device). An embodiment of the computing device 100 will be discussed in greater detail with reference to FIG. 3.

Figure 3:
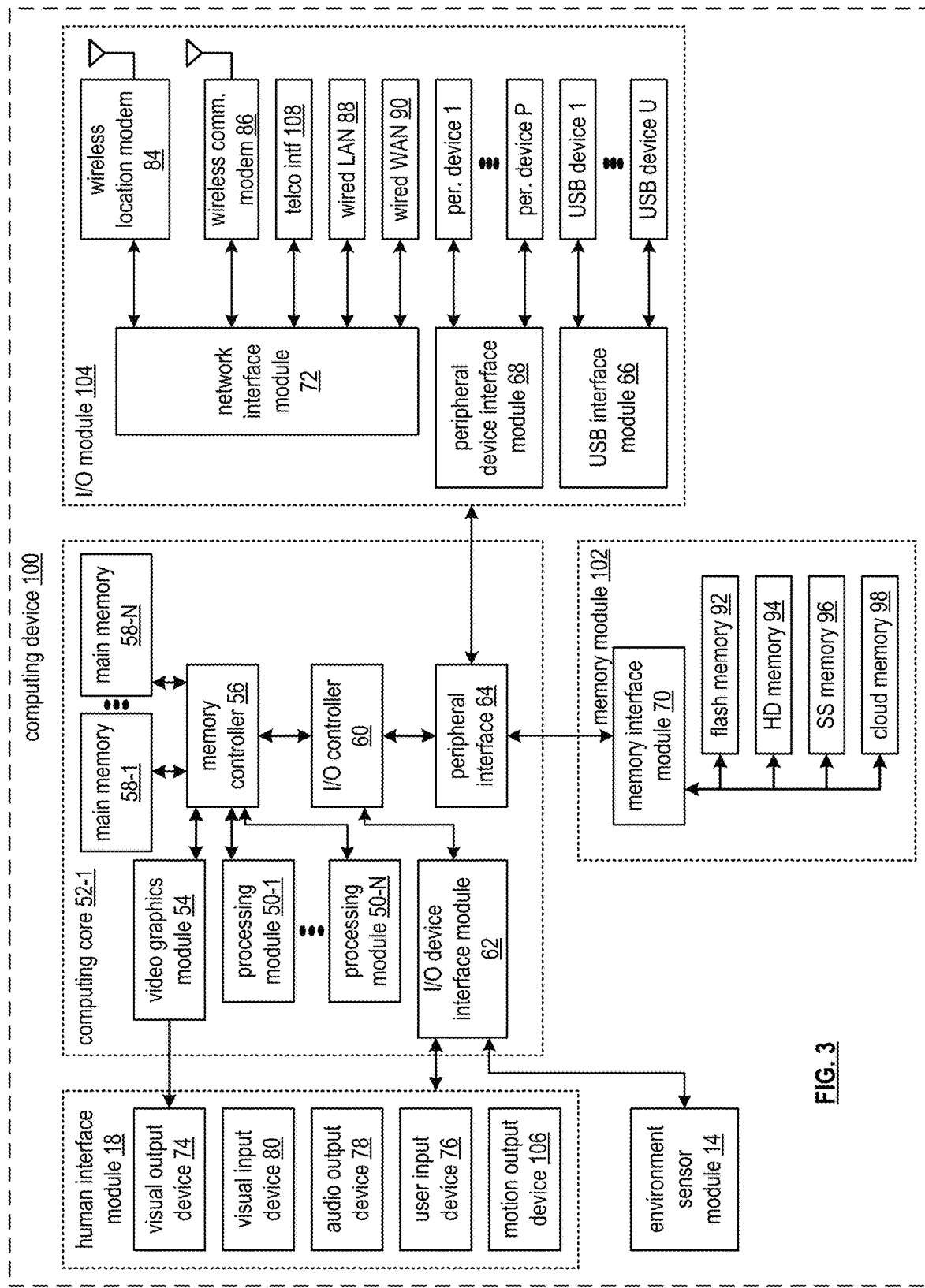
FIG. 3 is a schematic block diagram of another embodiment of a computing device of a computing system in accordance with the present invention.

FIG. 3 is a schematic block diagram of another embodiment of the computing device 100 of the computing system 10 that includes the human interface module 18, the environment sensor module 14, the computing core 52-1, the memory module 102, and the I/O module 104. The human interface module 18 includes one or more visual output devices 74 (e.g., video graphics display, 3-D viewer, touch-screen, LED, etc.), one or more visual input devices 80 (e.g., a still image camera, a video camera, a 3-D video camera, photocell, etc.), and one or more audio output devices 78 (e.g., speaker(s), headphone jack, a motor, etc.). The human interface module 18 further includes one or more user input devices 76 (e.g., keypad, keyboard, touchscreen, voice to text, a push button, a microphone, a card reader, a door position switch, a biometric input device, etc.) and one or more motion output devices 106 (e.g., servos, motors, lifts, pumps, actuators, anything to get real-world objects to move).

The computing core 52-1 includes a video graphics module 54, one or more processing modules 50-1 through 50-N, a memory controller 56, one or more main memories 58-1 through 58-N (e.g., RAM), one or more input/output (I/O) device interface modules 62, an input/output (I/O) controller 60, and a peripheral interface 64. A processing module is as defined at the end of the detailed description.

The memory module 102 includes a memory interface module 70 and one or more memory devices, including flash memory devices 92, hard drive (HD) memory 94, solid state (SS) memory 96, and cloud memory 98. The cloud memory 98 includes an on-line storage system and an on-line backup system.

The I/O module 104 includes a network interface module 72, a peripheral device interface module 68, and a universal serial bus (USB) interface module 66. Each of the I/O device interface module 62, the peripheral interface 64, the memory interface module 70, the network interface module 72, the peripheral device interface module 68, and the USB interface modules 66 includes a combination of hardware (e.g., connectors, wiring, etc.) and operational instructions stored on memory (e.g., driver software) that are executed by one or more of the processing modules 50-1 through 50-N and/or a processing circuit within the particular module.

The I/O module 104 further includes one or more wireless location modems 84 (e.g., global positioning satellite (GPS), Wi-Fi, angle of arrival, time difference of arrival, signal strength, dedicated wireless location, etc.) and one or more wireless communication modems 86 (e.g., a cellular network transceiver, a wireless data network transceiver, a Wi-Fi transceiver, a Bluetooth transceiver, a 315 MHz transceiver, a zig bee transceiver, a 60 GHz transceiver, etc.). The I/O module 104 further includes a telco interface 108 (e.g., to interface to a public switched telephone network), a wired local area network (LAN) 88 (e.g., optical, electrical), and a wired wide area network (WAN) 90 (e.g., optical, electrical). The I/O module 104 further includes one or more peripheral devices (e.g., peripheral devices 1-P) and one or more universal serial bus (USB) devices (USB devices 1-U). In other embodiments, the computing device 100 may include more or less devices and modules than shown in this example embodiment.

FIG. 4 is a schematic block diagram of an embodiment of the environment sensor module 14 of the computing system 10 that includes a sensor interface module 120 to output environment sensor information 150 based on information communicated with a set of sensors. The set of sensors includes a visual sensor 122 (e.g., to the camera, 3-D camera, 360° view camera, a camera array, an optical spectrometer, etc.) and an audio sensor 124 (e.g., a microphone, a microphone array). The set of sensors further includes a motion sensor 126 (e.g., a solid-state Gyro, a vibration detector, a laser motion detector) and a position sensor 128 (e.g., a Hall effect sensor, an image detector, a GPS receiver, a radar system).

The set of sensors further includes a scanning sensor 130 (e.g., CAT scan, Mill, x-ray, ultrasound, radio scatter, particle detector, laser measure, further radar) and a temperature sensor 132 (e.g., thermometer, thermal coupler). The set of sensors further includes a humidity sensor 134 (resistance based, capacitance based) and an altitude sensor 136 (e.g., pressure based, GPS-based, laser-based).

The set of sensors further includes a biosensor 138 (e.g., enzyme, immuno, microbial) and a chemical sensor 140 (e.g., mass spectrometer, gas, polymer). The set of sensors further includes a magnetic sensor 142 (e.g., Hall effect, piezo electric, coil, magnetic tunnel junction) and any generic sensor 144 (e.g., including a hybrid combination of two or more of the other sensors).

Figure 5A:
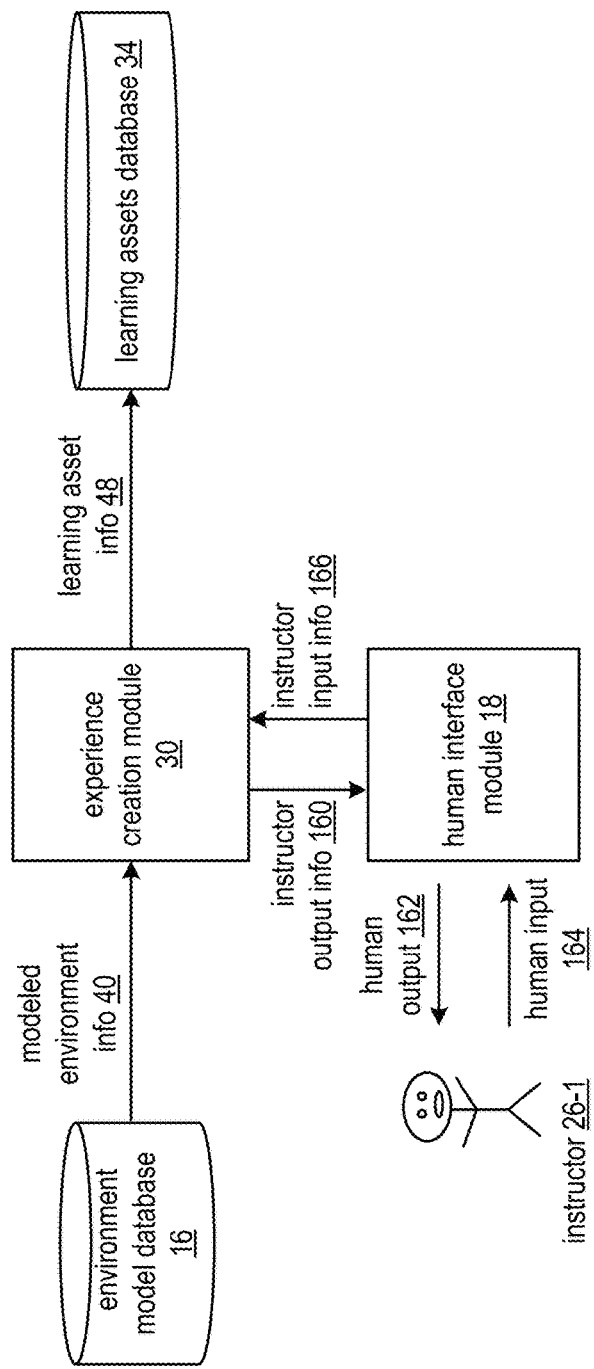
FIG. 5A is a schematic block diagram of another embodiment of a computing system in accordance with the present invention.

FIG. 5A is a schematic block diagram of another embodiment of a computing system that includes the environment model database 16, the human interface module 18, the instructor 26-1, the experience creation module 30, and the learning assets database 34 of FIG. 1. In an example of operation, the experience creation module 30 obtains modeled environment information 40 from the environment model database 16 and renders a representation of an environment and objects of the modeled environment information 40 to output as instructor output information 160. The human interface module 18 transforms the instructor output information 160 into human output 162 for presentation to the instructor 26-1. For example, the human output 162 includes a 3-D visualization and stereo audio output.

In response to the human output 162, the human interface module 18 receives human input 164 from the instructor 26-1. For example, the human input 164 includes pointer movement information and human speech associated with a lesson. The human interface module 18 transforms the human input 164 into instructor input information 166. The instructor input information 166 includes one or more of representations of instructor interactions with objects within the environment and explicit evaluation information (e.g., questions to test for comprehension level, and correct answers to the questions).

Having received the instructor input information 166, the experience creation module 30 renders a representation of the instructor input information 166 within the environment utilizing the objects of the modeled environment information 40 to produce learning asset information 48 for storage in the learnings assets database 34. Subsequent access of the learning assets information 48 facilitates a learning experience.

Figure 5B:
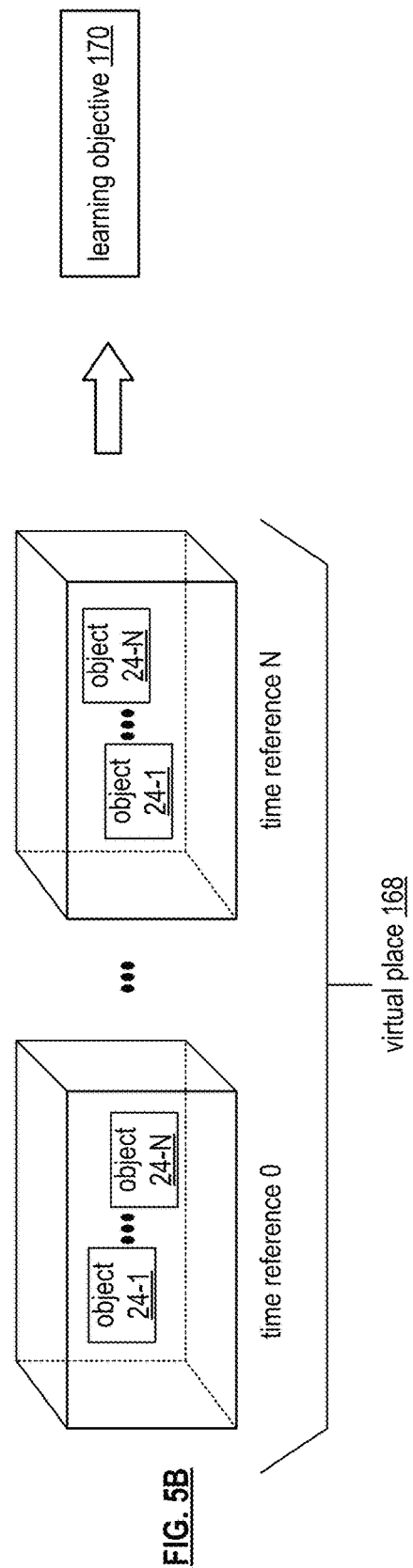
FIG. 5B is a schematic block diagram of an embodiment of a representation of a learning experience in accordance with the present invention.

FIG. 5B is a schematic block diagram of an embodiment of a representation of a learning experience that includes a virtual place 168 and a resulting learning objective 170. A learning objective represents a portion of an overall learning experience, where the learning objective is associated with at least one major concept of knowledge to be imparted to a learner. The major concept may include several sub-concepts. The makeup of the learning objective is discussed in greater detail with reference to FIG. 6.

The virtual place 168 includes a representation of an environment (e.g., a place) over a series of time intervals (e.g., time 0-N). The environment includes a plurality of objects 24-1 through 24-N. At each time reference, the positions of the objects can change in accordance with the learning experience. For example, the instructor 26-1 of FIG. 5A interacts with the objects to convey a concept. The sum of the positions of the environment and objects within the virtual place 168 is wrapped into the learning objective 170 for storage and subsequent utilization when executing the learning experience.

Figure 6:
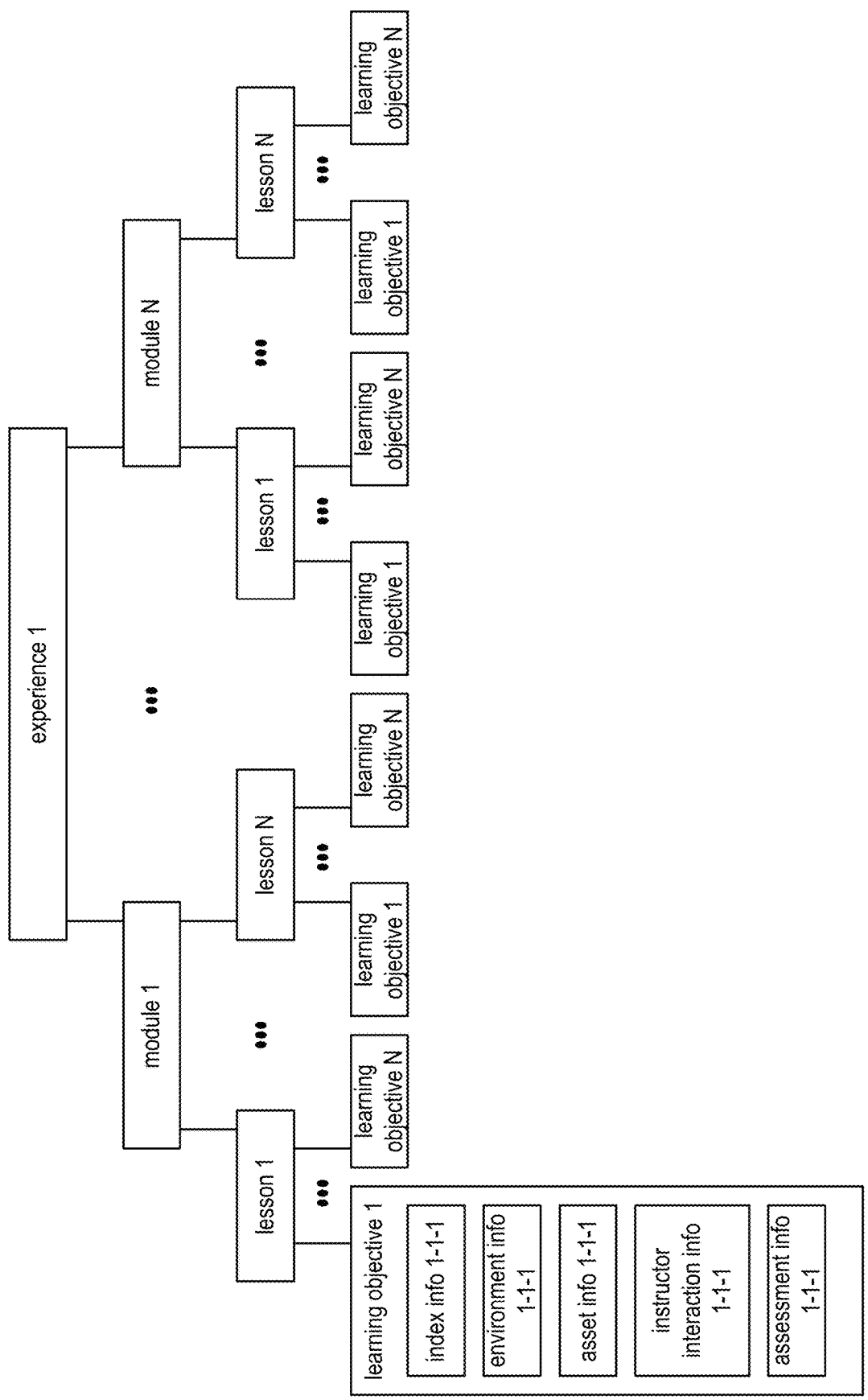
FIG. 6 is a schematic block diagram of another embodiment of a representation of a learning experience in accordance with the present invention.

FIG. 6 is a schematic block diagram of another embodiment of a representation of a learning experience that includes a plurality of modules 1-N. Each module includes a set of lessons 1-N. Each lesson includes a plurality of learning objectives 1-N. The learning experience typically is played from left to right where learning objectives are sequentially executed in lesson 1 of module 1 followed by learning objectives of lesson 2 of module 1 etc.

As learners access the learning experience during execution, the ordering may be accessed in different ways to suit the needs of the unique learner based on one or more of preferences, experience, previously demonstrated comprehension levels, etc. For example, a particular learner may skip over lesson 1 of module 1 and go right to lesson 2 of module 1 when having previously demonstrated competency of the concepts associated with lesson 1.

Each learning objective includes indexing information, environment information, asset information, instructor interaction information, and assessment information. The index information includes one or more of categorization information, topics list, instructor identification, author identification, identification of copyrighted materials, keywords, concept titles, prerequisites for access, and links to related learning objectives.

The environment information includes one or more of structure information, environment model information, background information, identifiers of places, and categories of environments. The asset information includes one or more of object identifiers, object information (e.g., modeling information), asset ownership information, asset type descriptors (e.g., 2-D, 3-D). Examples include models of physical objects, stored media such as videos, scans, images, digital representations of text, digital audio, and graphics.

The instructor interaction information includes representations of instructor annotations, actions, motions, gestures, expressions, eye movement information, facial expression information, speech, and speech inflections. The content associated with the instructor interaction information includes overview information, speaker notes, actions associated with assessment information, (e.g., pointing to questions, revealing answers to the questions, motioning related to posing questions) and conditional learning objective execution ordering information (e.g., if the learner does this then take this path, otherwise take another path).

The assessment information includes a summary of desired knowledge to impart, specific questions for a learner, correct answers to the specific questions, multiple-choice question sets, and scoring information associated with writing answers. The assessment information further includes historical interactions by other learners with the learning objective (e.g., where did previous learners look most often within the environment of the learning objective, etc.), historical responses to previous comprehension evaluations, and actions to facilitate when a learner responds with a correct or incorrect answer (e.g., motion stimulus to activate upon an incorrect answer to increase a human stress level).

Figure 7A:
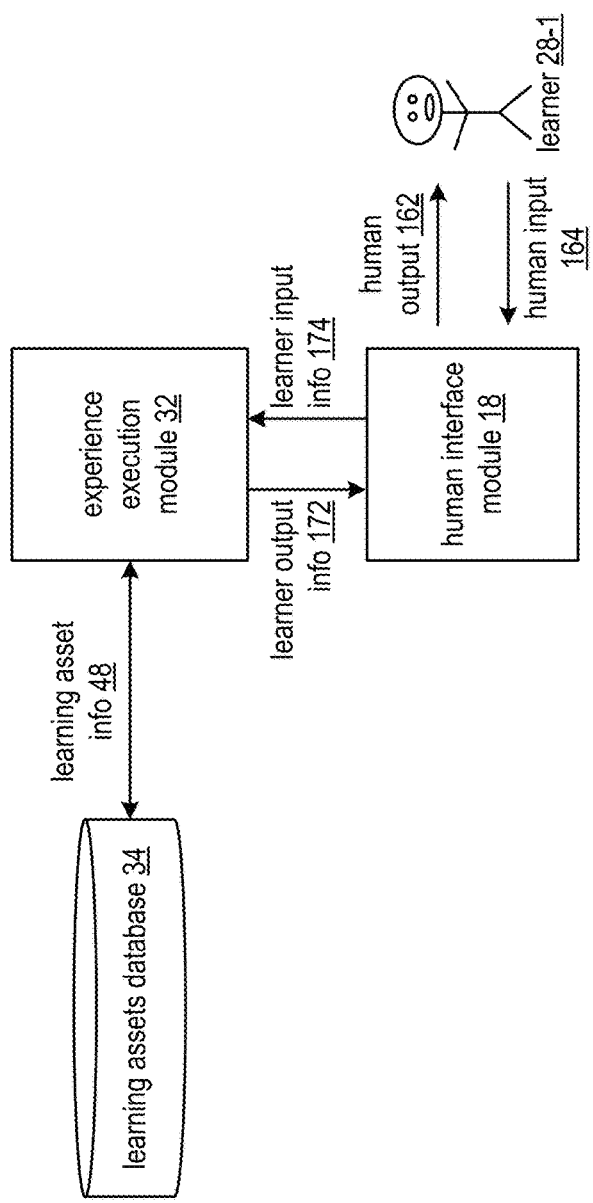
FIG. 7A is a schematic block diagram of another embodiment of a computing system in accordance with the present invention.

FIG. 7A is a schematic block diagram of another embodiment of a computing system that includes the learning assets database 34, the experience execution module 32, the human interface module 18, and the learner 28-1 of FIG. 1. In an example of operation, the experience execution module 32 recovers learning asset information 48 from the learning assets database 34 (e.g., in accordance with a selection by the learner 28-1). The experience execution module 32 renders a group of learning objectives associated with a common lesson within an environment utilizing objects associated with the lesson to produce learner output information 172. The learner output information 172 includes a representation of a virtual place and objects that includes instructor interactions and learner interactions from a perspective of the learner.

The human interface module 18 transforms the learner output information 172 into human output 162 for conveyance of the learner output information 172 to the learner 28-1. For example, the human interface module 18 facilitates displaying a 3-D image of the virtual environment to the learner 28-1.

The human interface module 18 transforms human input 164 from the learner 28-1 to produce learner input information 174. The learner input information 174 includes representations of learner interactions with objects within the virtual place (e.g., answering comprehension level evaluation questions).

The experience execution module 32 updates the representation of the virtual place by modifying the learner output information 172 based on the learner input information 174 so that the learner 28-1 enjoys representations of interactions caused by the learner within the virtual environment. The experience execution module 32 evaluates the learner input information 174 with regards to evaluation information of the learning objectives to evaluate a comprehension level by the learner 28-1 with regards to the set of learning objectives of the lesson.

Figure 7B:
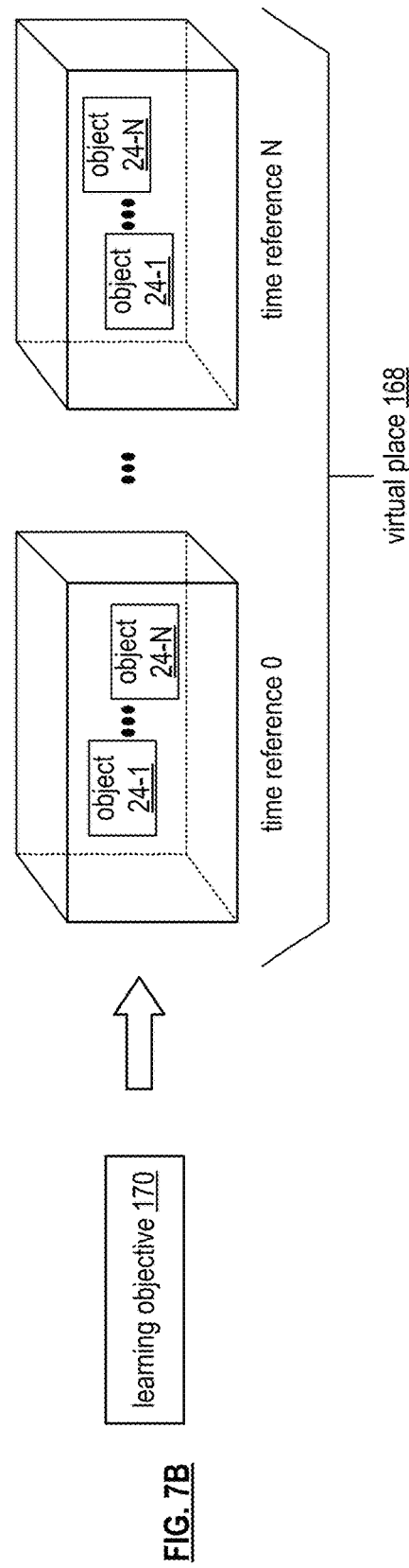
FIG. 7B is a schematic block diagram of another embodiment of a representation of a learning experience in accordance with the present invention.

FIG. 7B is a schematic block diagram of another embodiment of a representation of a learning experience that includes the learning objective 170 and the virtual place 168. In an example of operation, the learning objective 170 is recovered from the learning assets database 34 of FIG. 7A and rendered to create the virtual place 168 representations of objects 24-1 through 24-N in the environment from time references zero through N. For example, a first object is the instructor 26-1 of FIG. 5A, a second object is the learner 28-1 of FIG. 7A, and the remaining objects are associated with the learning objectives of the lesson, where the objects are manipulated in accordance with annotations of instructions provided by the instructor 26-1.

The learner 28-1 experiences a unique viewpoint of the environment and gains knowledge from accessing (e.g., playing) the learning experience. The learner 28-1 further manipulates objects within the environment to support learning and assessment of comprehension of objectives of the learning experience.

Figure 8A:
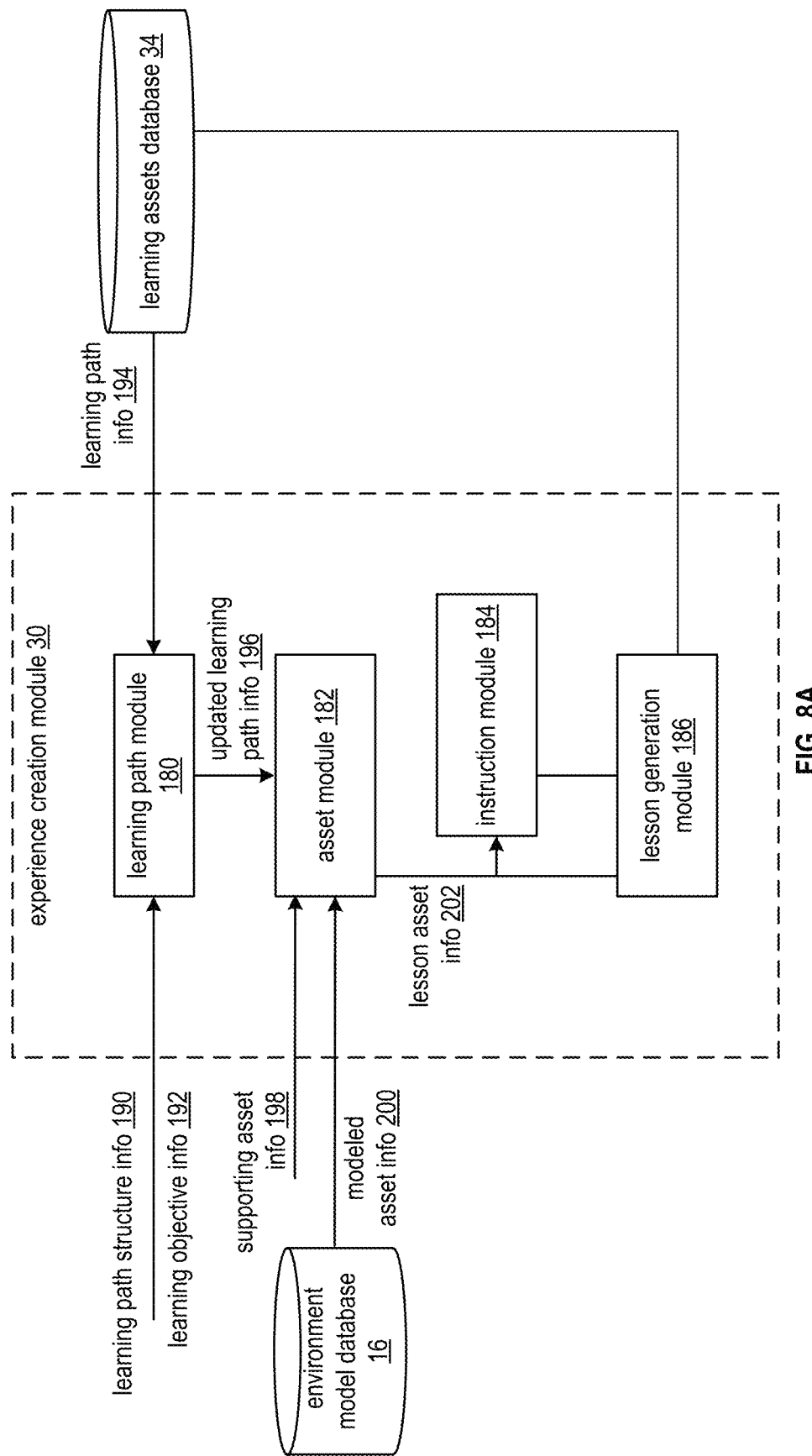
FIGS. 8A-8C are schematic block diagrams of another embodiment of a computing system illustrating an example of creating a learning experience in accordance with the present invention.
Figure 8B:
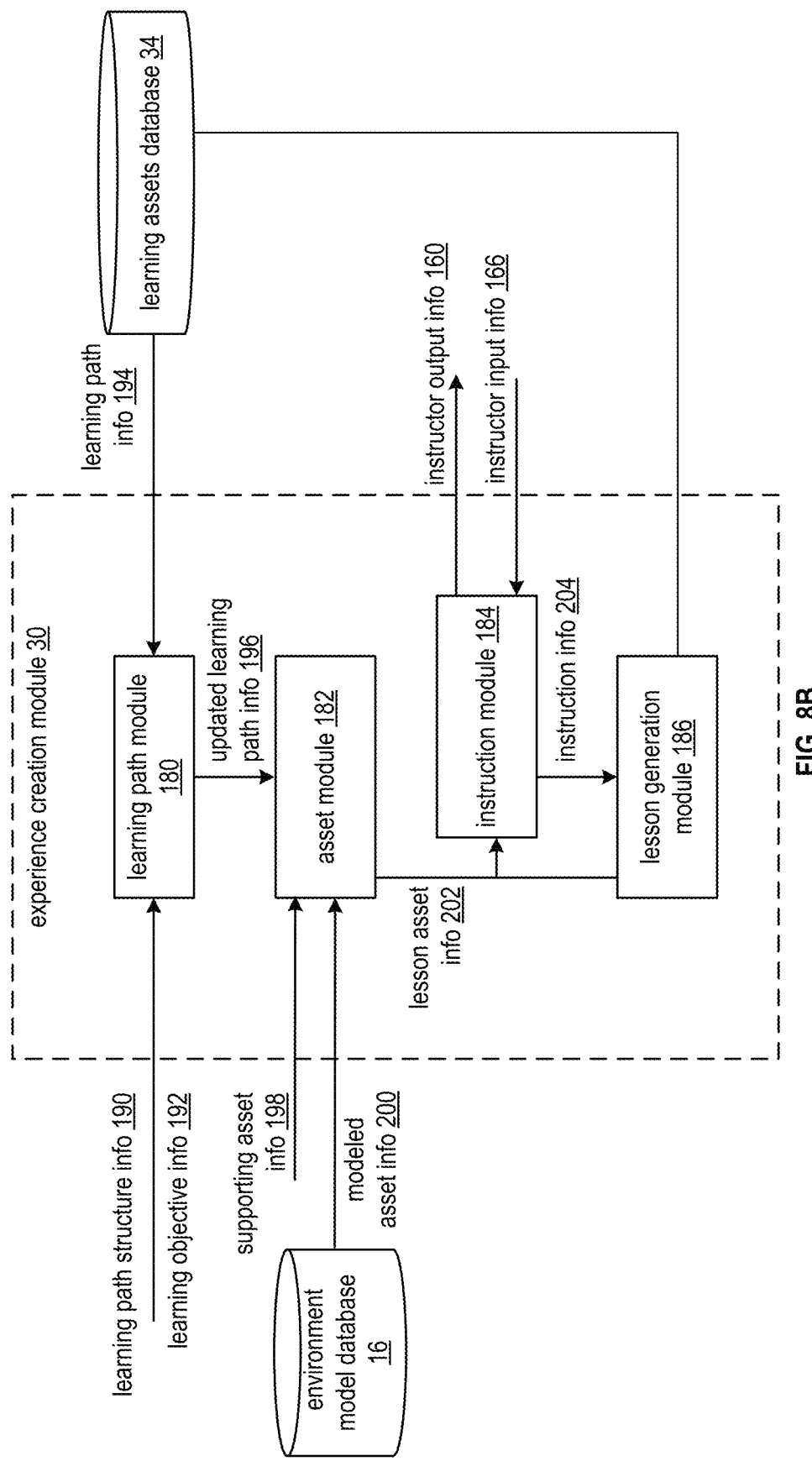
Figure 8C:
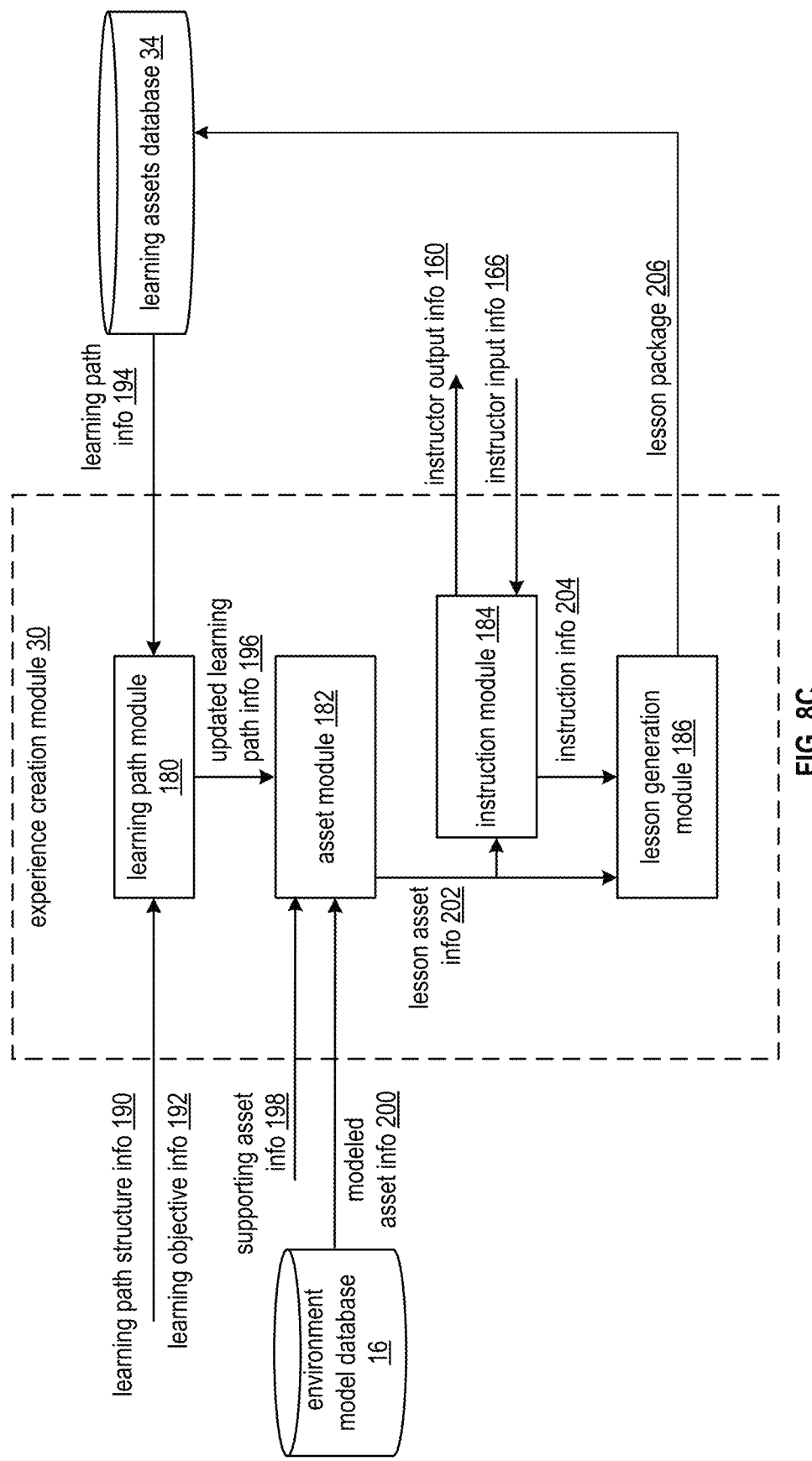

FIGS. 8A-8C are schematic block diagrams of another embodiment of a computing system illustrating an example of creating a learning experience. The computing system includes the environment model database 16, the experience creation module 30, and the learning assets database 34 of FIG. 1. The experience creation module 30 includes a learning path module 180, an asset module 182, an instruction module 184, and a lesson generation module 186.

In an example of operation, FIG. 8A illustrates the learning path module 180 determining a learning path (e.g., structure and ordering of learning objectives to complete towards a goal such as a certificate or degree) to include multiple modules and/or lessons. For example, the learning path module 180 obtains learning path information 194 from the learning assets database 34 and receives learning path structure information 190 and learning objective information 192 (e.g., from an instructor) to generate updated learning path information 196.

The learning path structure information 190 includes attributes of the learning path and the learning objective information 192 includes a summary of desired knowledge to impart. The updated learning path information 196 is generated to include modifications to the learning path information 194 in accordance with the learning path structure information 190 in the learning objective information 192.

The asset module 182 determines a collection of common assets for each lesson of the learning path. For example, the asset module 182 receives supporting asset information 198 (e.g., representation information of objects in the virtual space) and modeled asset information 200 from the environment model database 16 to produce lesson asset information 202. The modeled asset information 200 includes representations of an environment to support the updated learning path information 196 (e.g., modeled places and modeled objects) and the lesson asset information 202 includes a representation of the environment, learning path, the objectives, and the desired knowledge to impart.

FIG. 8B further illustrates the example of operation where the instruction module 184 outputs a representation of the lesson asset information 202 as instructor output information 160. The instructor output information 160 includes a representation of the environment and the asset so far to be experienced by an instructor who is about to input interactions with the environment to impart the desired knowledge.

The instruction module 184 receives instructor input information 166 from the instructor in response to the instructor output information 160. The instructor input information 166 includes interactions from the instructor to facilitate imparting of the knowledge (e.g., instructor annotations, pointer movements, highlighting, text notes, and speech) and testing of comprehension of the knowledge (e.g., valuation information such as questions and correct answers). The instruction module 184 obtains assessment information (e.g., comprehension test points, questions, correct answers to the questions) for each learning objective based on the lesson asset information 202 and produces instruction information 204 (e.g., representation of instructor interactions with objects within the virtual place, evaluation information).

FIG. 8C further illustrates the example of operation where the lesson generation module 186 renders (e.g., as a multi-dimensional representation) the objects associated with each lesson (e.g., assets of the environment) within the environment in accordance with the instructor interactions for the instruction portion and the assessment portion of the learning experience. Each object is assigned a relative position in XYZ world space within the environment to produce the lesson rendering.

The lesson generation module 186 outputs the rendering as a lesson package 206 for storage in the learning assets database 34. The lesson package 206 includes everything required to replay the lesson for a subsequent learner (e.g., representation of the environment, the objects, the interactions of the instructor during both the instruction and evaluation portions, questions to test comprehension, correct answers to the questions, a scoring approach for evaluating comprehension, all of the learning objective information associated with each learning objective of the lesson).

Figure 8D:
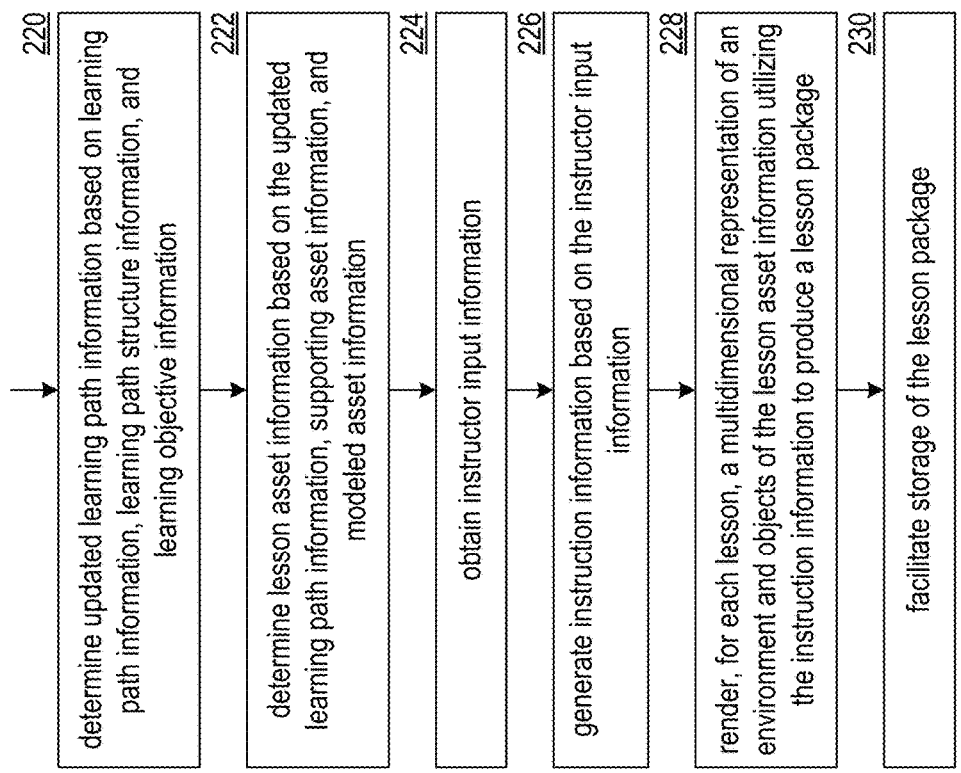
FIG. 8D is a logic diagram of an embodiment of a method for creating a learning experience within a computing system in accordance with the present invention.

FIG. 8D is a logic diagram of an embodiment of a method for creating a learning experience within a computing system (e.g., the computing system 10 of FIG. 1). In particular, a method is presented in conjunction with one or more functions and features described in conjunction with FIGS. 1-7B, and also FIGS. 8A-8C. The method includes step 220 where a processing module of one or more processing modules of one or more computing devices within the computing system determines updated learning path information based on learning path information, learning path structure information, and learning objective information. For example, the processing module combines a previous learning path with obtained learning path structure information in accordance with learning objective information to produce the updated learning path information (i.e., specifics for a series of learning objectives of a lesson).

The method continues at step 222 where the processing module determines lesson asset information based on the updated learning path information, supporting asset information, and modeled asset information. For example, the processing module combines assets of the supporting asset information (e.g., received from an instructor) with assets and a place of the modeled asset information in accordance with the updated learning path information to produce the lesson asset information. The processing module selects assets as appropriate for each learning objective (e.g., to facilitate the imparting of knowledge based on a predetermination and/or historical results).

The method continues at step 224 where the processing module obtains instructor input information. For example, the processing module outputs a representation of the lesson asset information as instructor output information and captures instructor input information for each lesson in response to the instructor output information. Further obtain asset information for each learning objective (e.g., extract from the instructor input information).

The method continues at step 226 where the processing module generates instruction information based on the instructor input information. For example, the processing module combines instructor gestures and further environment manipulations based on the assessment information to produce the instruction information.

The method continues at step 228 where the processing module renders, for each lesson, a multidimensional representation of environment and objects of the lesson asset information utilizing the instruction information to produce a lesson package. For example, the processing module generates the multidimensional representation of the environment that includes the objects and the instructor interactions of the instruction information to produce the lesson package. For instance, the processing module includes a 3-D rendering of a place, background objects, recorded objects, and the instructor in a relative position XYZ world space over time.

The method continues at step 230 where the processing module facilitates storage of the lesson package. For example, the processing module indexes the one or more lesson packages of the one or more lessons of the learning path to produce indexing information (e.g., title, author, instructor identifier, topic area, etc.). The processing module stores the indexed lesson package as learning asset information in a learning assets database.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 8E, 8F, 8G, 8H, 8J, and 8K are schematic block diagrams of another embodiment of a computing system illustrating another example of a method to create a learning experience. The embodiment includes creating a multi-disciplined learning tool regarding a topic. The multi-disciplined aspect of the learning tool includes both disciplines of learning and any form/format of presentation of content regarding the topic. For example, a first discipline includes mechanical systems, a second discipline includes electrical systems, and a third discipline includes fluid systems when the topic includes operation of a combustion based engine. The computing system includes the environment model database 16 of FIG. 1, the learning assets database 34 of FIG. 1, and the experience creation module 30 of FIG. 1.

Figure 8E:
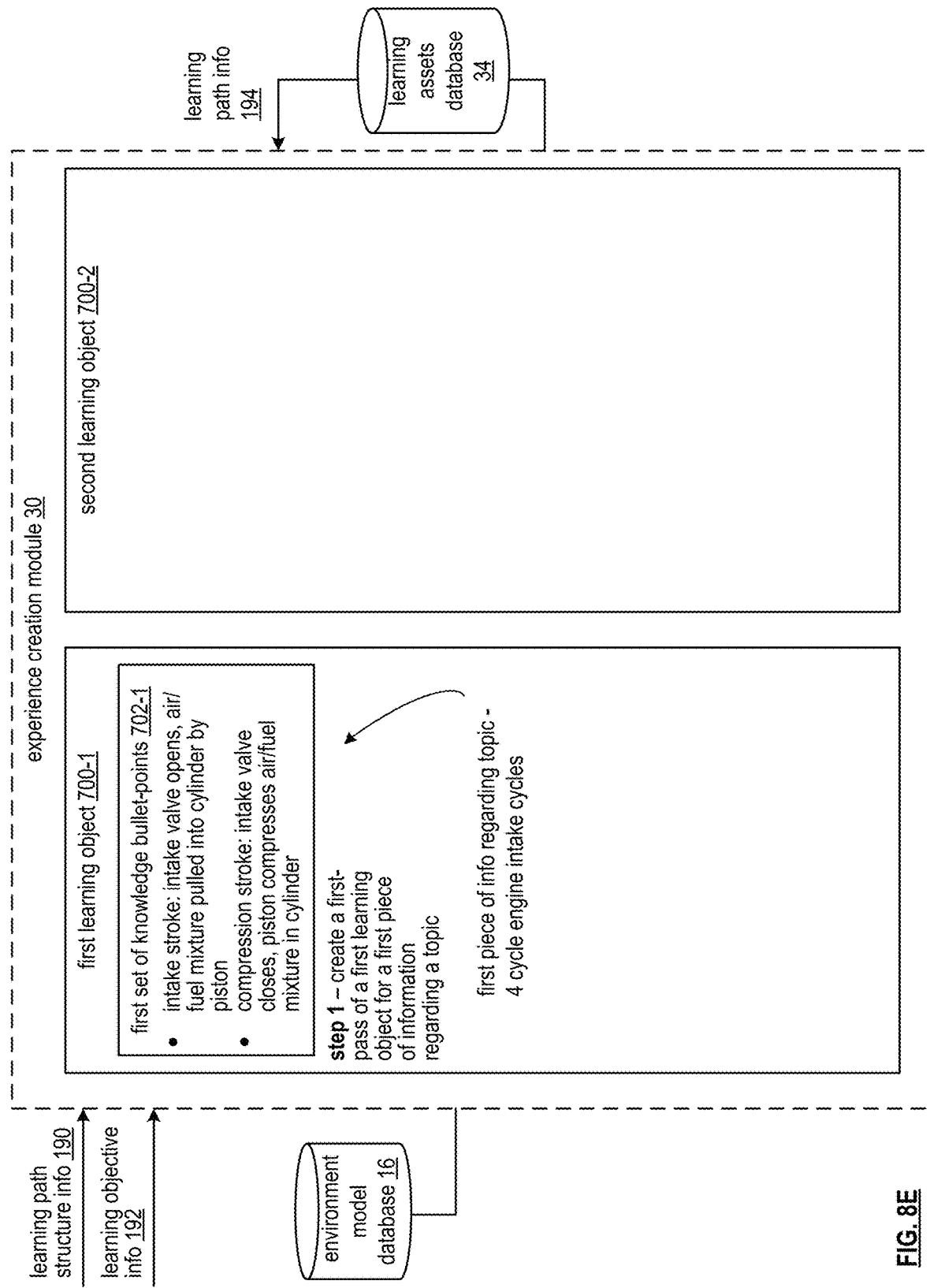

FIG. 8E illustrates the example of operation where the experience creation module 30 creates a first-pass of a first learning object 700-1 for a first piece of information regarding the topic to include a first set of knowledge bullet-points 702-1 regarding the first piece of information. The creating includes utilizing guidance from an instructor and/or reusing previous knowledge bullet-points for a related topic. For example, the experience creation module 30 extracts the bullet-points from one or more of learning path structure information 190 and learning objective information 192 when utilizing the guidance from the instructor. As another example, the experience creation module 30 extracts the bullet-points from learning path information 194 retrieved from the learning assets database 34 when utilizing previous knowledge bullet points for the related topic.

Each piece of information is to impart additional knowledge related to the topic. The additional knowledge of the piece of information includes a characterization of learnable material by most learners in just a few minutes. As a specific example, the first piece of information includes "4 cycle engine intake cycles" when the topic includes "how a 4 cycle engine works."

Each of the knowledge bullet-points are to impart knowledge associated with the associated piece of information in a logical (e.g., sequential) and knowledge building fashion. As a specific example, the experience creation module 30 creates the first set of knowledge bullet-points 702-1 based on instructor input to include a first bullet point "intake stroke: intake valve opens, air/fuel mixture pulled into cylinder by piston" and a second bullet point "compression stroke: intake valve closes, piston compresses air/fuel mixture in cylinder" when the first piece of information includes the "4 cycle engine intake cycles."

Figure 8F:
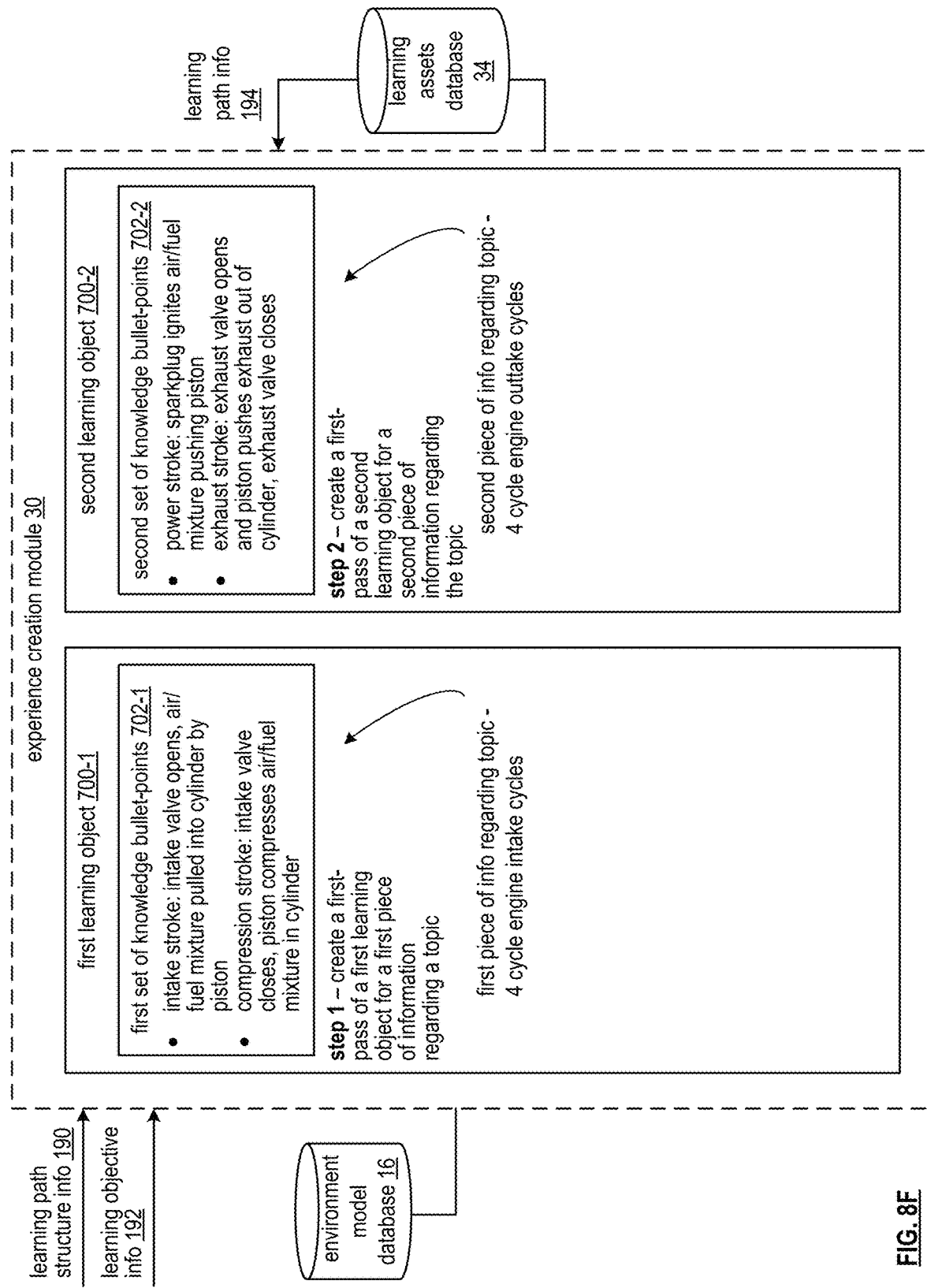

FIG. 8F further illustrates the example of operation where the experience creation module 30 creates a first-pass of a second learning object 700-2 for a second piece of information regarding the topic to include a second set of knowledge bullet-points 702-2 regarding the second piece of information. As a specific example, the experience creation module 30 creates the second set of knowledge bullet-points 702-2 based on the instructor input to include a first bullet point "power stroke: spark plug ignites air/fuel mixture pushing piston" and a second bullet point "exhaust stroke: exhaust valve opens and piston pushes exhaust out of cylinder, exhaust valve closes" when the second piece of information includes "4 cycle engine outtake cycles."

Figure 8G:
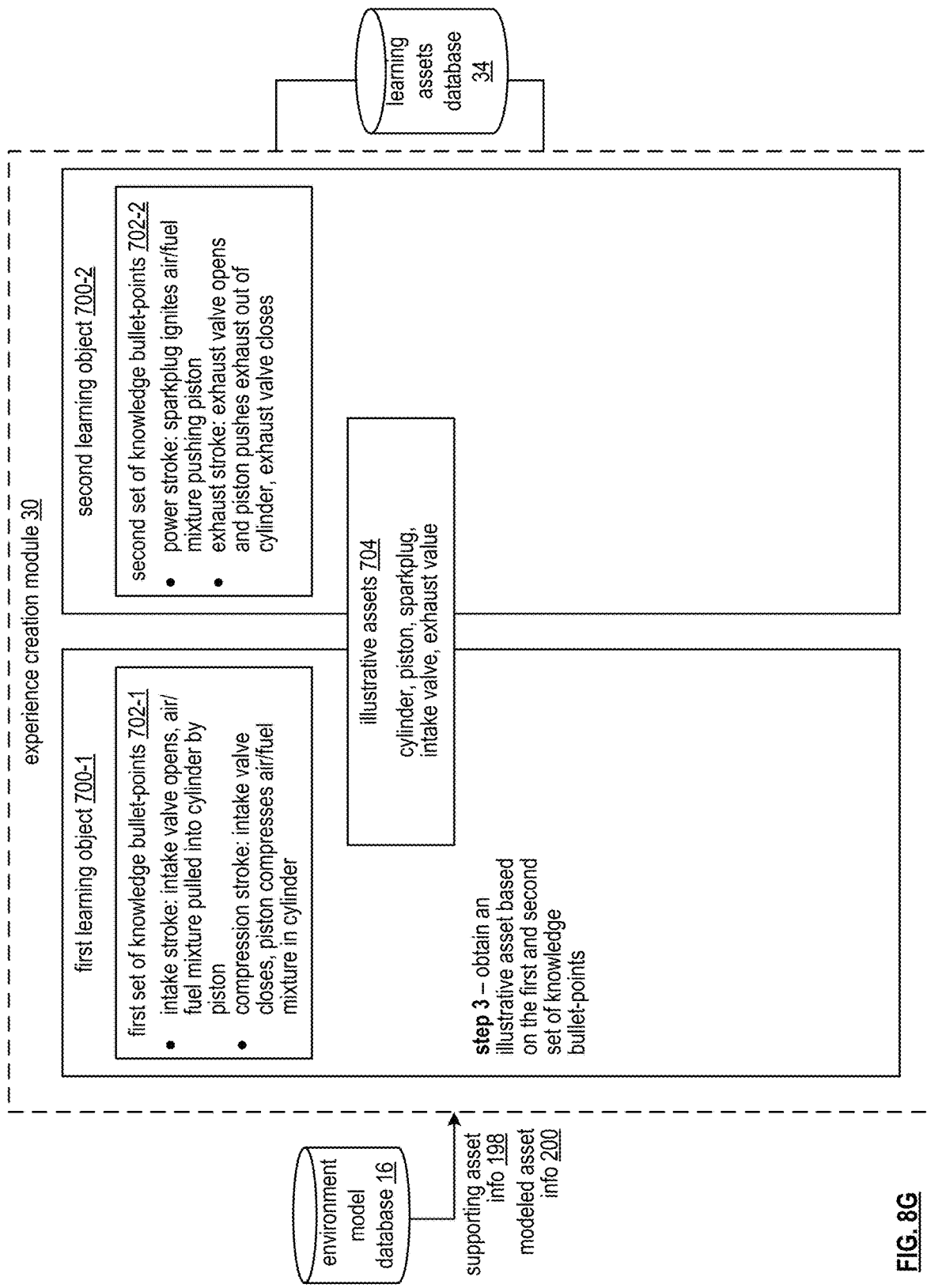

FIG. 8G further illustrates the example of operation where the experience creation module 30 obtains illustrative assets 704 based on the first and second set of knowledge bullet-points 702-1 and 702-2. The illustrative assets 704 depicts one or more aspects regarding the topic pertaining to the first and second pieces of information. Examples of illustrative assets includes background environments, objects within the environment (e.g., things, tools), where the objects and the environment are represented by multidimensional models (e.g., 3-D model) utilizing a variety of representation formats including video, scans, images, text, audio, graphics etc.

The obtaining of the illustrative assets 704 includes a variety of approaches. A first approach includes interpreting instructor input information to identify the illustrative asset. For example, the experience creation module 30 interprets instructor input information to identify a cylinder asset.

A second approach includes identifying a first object of the first and second set of knowledge bullet-points as an illustrative asset. For example, the experience creation module 30 identifies the piston object from both the first and second set of knowledge bullet-points.

A third approach includes determining the illustrative assets 704 based on the first object of the first and second set of knowledge bullet-points. For example, the experience creation module 30 accesses the environment model database 16 to extract information about an asset from one or more of supporting asset information 198 and modeled asset information 200 for a sparkplug when interpreting the first and second set of knowledge bullet-points.

Figure 8H:
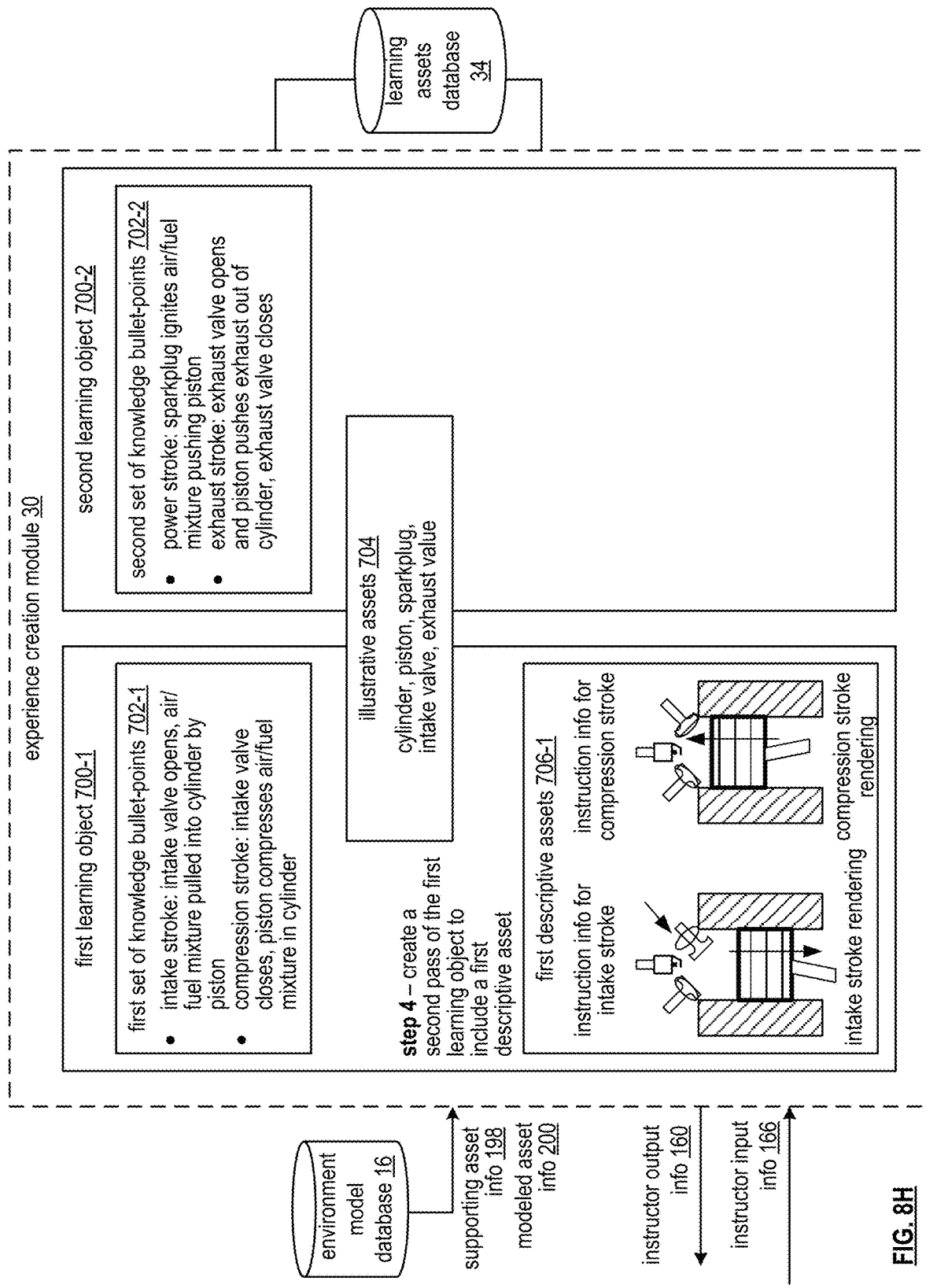

FIG. 8H further illustrates the example of operation where the experience creation module 30 creates a second-pass of the first learning object 700-1 to further include first descriptive assets 706-1 regarding the first piece of information based on the first set of knowledge bullet-points 702-1 and the illustrative assets 704. Descriptive assets include instruction information that utilizes the illustrative asset 704 to impart knowledge and subsequently test for knowledge retention. The embodiments of the descriptive assets includes multiple disciplines and multiple dimensions to provide improved learning by utilizing multiple senses of a learner. Examples of the instruction information includes annotations, actions, motions, gestures, expressions, recorded speech, speech inflection information, review information, speaker notes, and assessment information.

The creating the second-pass of the first learning object 700-1 includes generating a representation of the illustrative assets 704 based on a first knowledge bullet-point of the first set of knowledge bullet-points 702-1. For example, the experience creation module 30 renders 3-D frames of a 3-D model of the cylinder, the piston, the spark plug, the intake valve, and the exhaust valve in motion when performing the intake stroke where the intake valve opens and the air/fuel mixture is pulled into the cylinder by the piston.

The creating of the second-pass of the first learning object 700-1 further includes generating the first descriptive assets 706-1 utilizing the representation of the illustrative assets 704. For example, the experience creation module 30 renders 3-D frames of the 3-D models of the various engine parts without necessarily illustrating the first set of knowledge bullet-points 702-1.

In an embodiment where the experience creation module 30 generates the representation of the illustrative assets 704, the experience creation module 30 outputs the representation of the illustrative asset 704 as instructor output information 160 to an instructor. For example, the 3-D model of the cylinder and associated parts.

The experience creation module 30 receives instructor input information 166 in response to the instructor output information 160. For example, the instructor input information 166 includes instructor annotations to help explain the intake stroke (e.g., instructor speech, instructor pointer motions). The experience creation module 30 interprets the instructor input information 166 to produce the first descriptive assets 706-1. For example, the renderings of the engine parts include the intake stroke as annotated by the instructor.

Figure 8J:
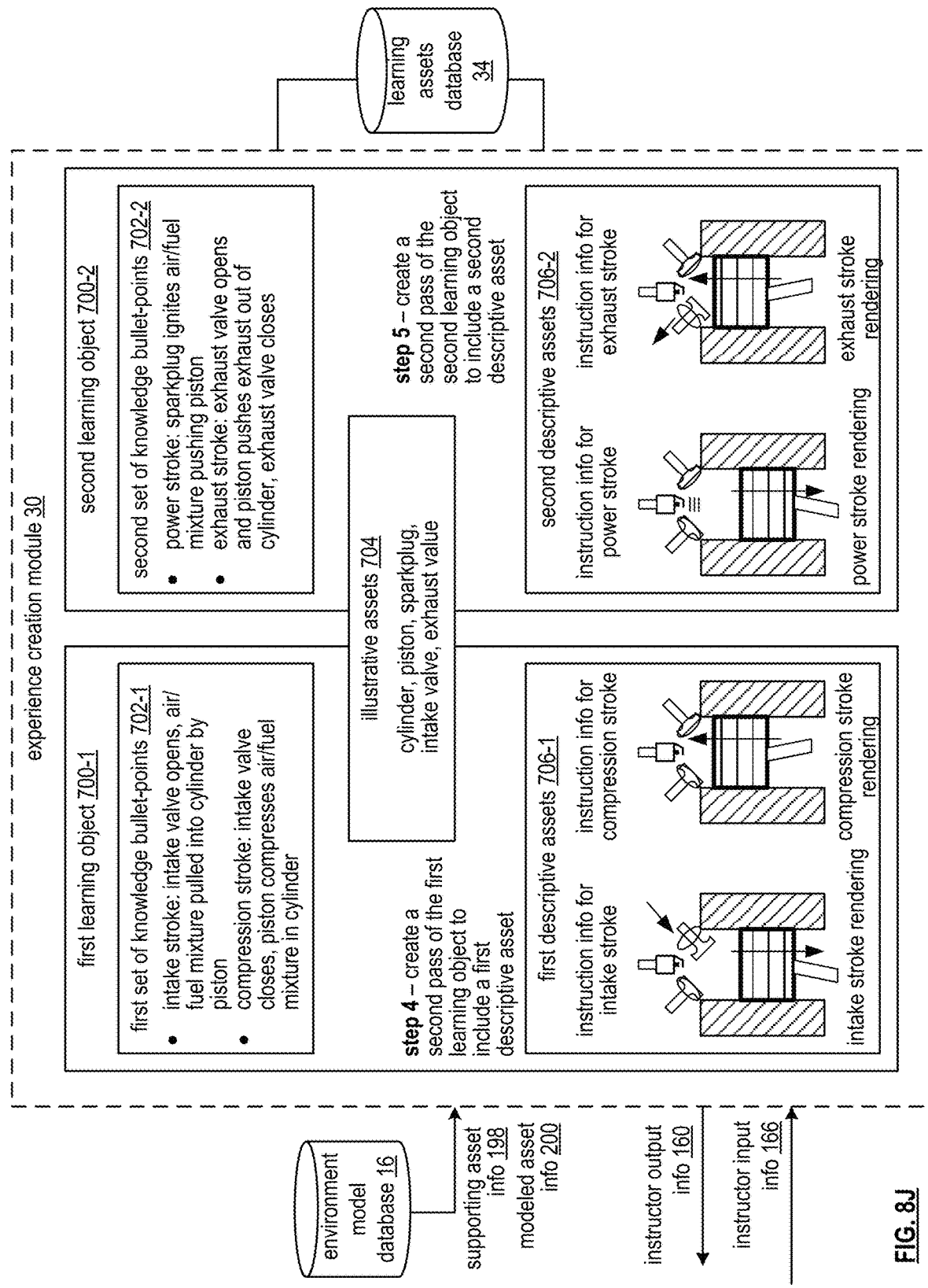

FIG. 8J further illustrates the example of operation where the experience creation module 30 creates a second-pass of the second learning object 700-2 to further include second descriptive assets 706-2 regarding the second piece of information based on the second set of knowledge bullet-points 702-2 and the illustrative assets 704. For example, the experience creation module 30 creates 3-D renderings of the power stroke and the exhaust stroke as annotated by the instructor based on further instructor input information 166.

Figure 8K:
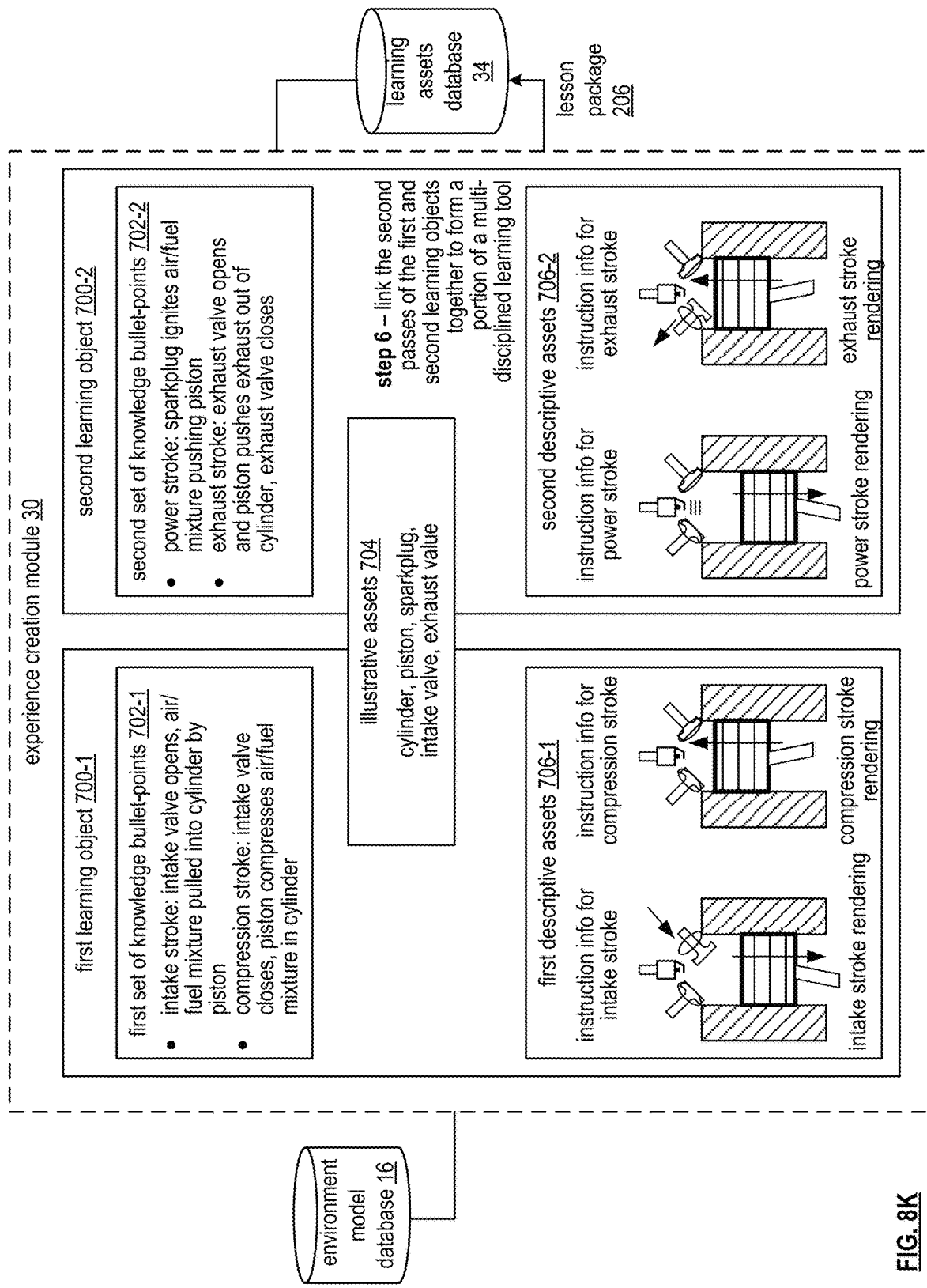

FIG. 8K further illustrates the example of operation where the experience creation module 30 links the second-passes of the first and second learning objects 700-1 and 700-2 together to form at least a portion of the multi-disciplined learning tool. For example, the experience creation module 30 aggregates the first learning object 700-1 and the second learning object 700-2 to produce a lesson package 206 for storage in the learning assets database 34.

In an embodiment, the linking of the second-passes of the first and second learning objects 700-1 and 700-2 together to form the at least the portion of the multi-disciplined learning tool includes generating index information for the second-passes of first and second learning objects to indicate sharing of the illustrative asset 704. For example, the experience creation module 30 generates the index information to identify the first learning object 700-1 and the second learning object 700-2 as related to the same topic.

The linking further includes facilitating storage of the index information and the first and second learning objects 700-1 and 700-2 in the learning assets database 34 to enable subsequent utilization of the multi-disciplined learning tool. For example, the experience creation module 30 aggregates the first learning object 700-1, the second learning object 700-2, and the index information to produce the lesson package 206 for storage in the learning assets database 34.

The method described above with reference to FIGS. 8E-8K in conjunction with the experience creation module 30 can alternatively be performed by other modules of the computing system 10 of FIG. 1 or by other devices including various embodiments of the computing entity 20 of FIG. 2A. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause boy one or more computing devices to perform any or all of the method steps described above.

FIGS. 9A, 9B, 9C, 9D, and 9E are schematic block diagrams of an embodiment of a computing system illustrating an example of updating a lesson package. The computing system includes the environment sensor module 14 of FIG. 1, the experience creation module 30 of FIG. 1, the learning assets database 34 of FIG. 1, and the experience execution module 32 of FIG. 1. In an embodiment, the environment sensor module 14 includes the motion sensor 126 of FIG. 4 and the position sensor 128 of FIG. 4. The experience creation module 30 includes the lesson generation module 186 of FIG. 8A. The experience execution module 32 includes an environment generation module 240, an instance experience module 290, and a learning assessment module 330.

Figure 9A:
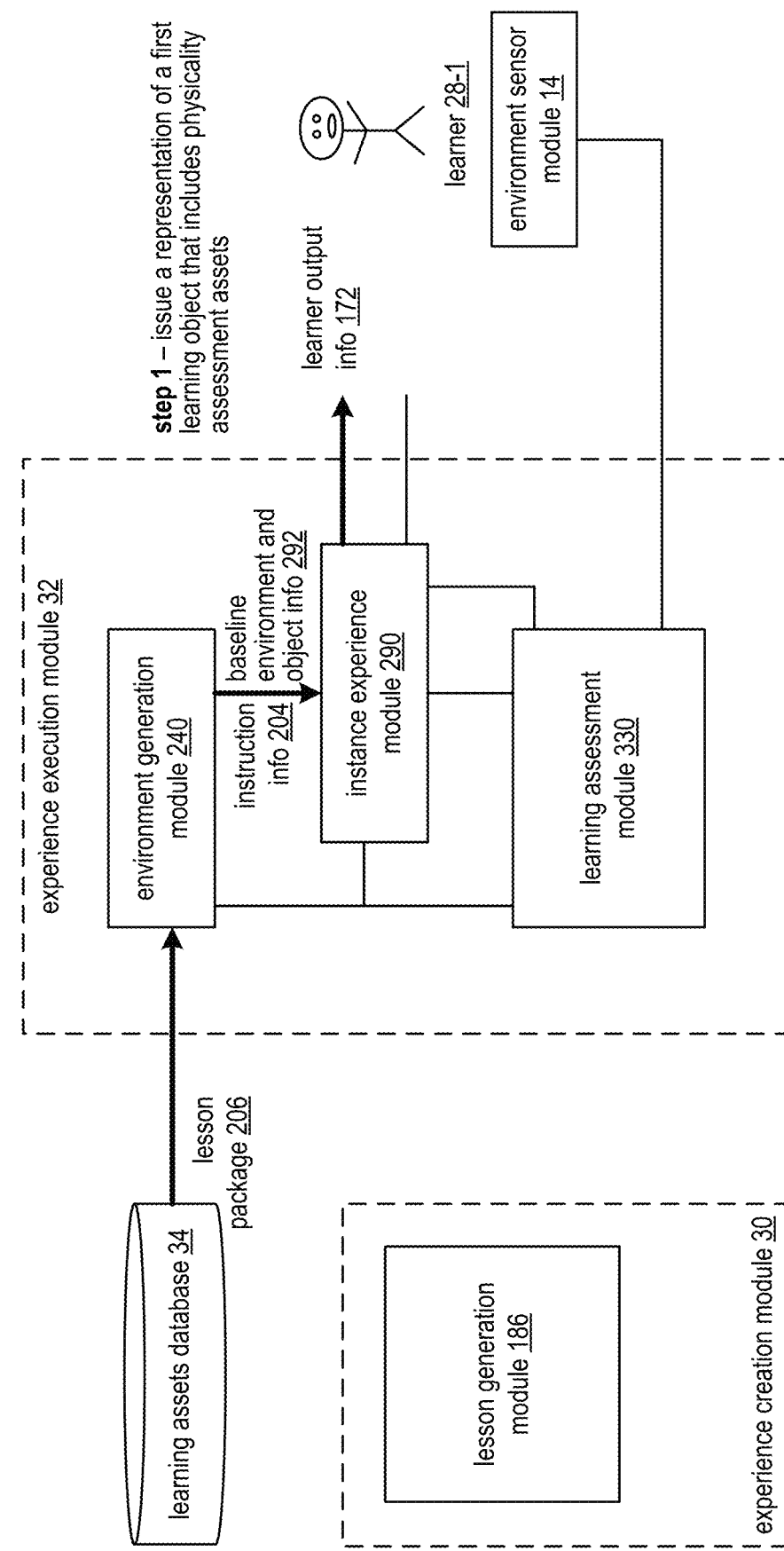

FIG. 9A illustrates an example of a method of operation to update the lesson package where, in a first step the experience execution module 32 issues a representation of a first set of physicality assessment assets of a first learning object of a plurality of learning objects to a second computing entity. For example, the environment generation module 240 generates instruction information 204 and baseline environment and object information 292 based on a lesson package 206 recovered from the learning assets database 34. The lesson package 206 includes the plurality of learning objects.

The instruction information 204 includes a representation of instructor interactions with objects within the virtual environment and evaluation information. The baseline environment and object information 292 includes XYZ positioning information of each object within the environment for the lesson package 206. The instance experience module 290 generates learner output information 172 for a first portion of the lesson package based on a learner profile, the instruction information 204 and the baseline environment and object information 292.

The plurality of learning objects includes the first learning object and a second learning object. The first learning object includes a first set of knowledge bullet-points for a first piece of information regarding a topic. The second learning object includes a second set of knowledge bullet-points for a second piece of information regarding the topic.

The first learning object and the second learning object further include an illustrative asset that depicts an aspect regarding the topic pertaining to the first and the second pieces of information. The first learning object further includes at least one first descriptive asset regarding the first piece of information based on the first set of knowledge bullet-points and the illustrative asset. The second learning object further includes at least one second descriptive asset regarding the second piece of information based on the second set of knowledge bullet-points and the illustrative asset.

The issuing of the representation of the first learning object further includes the instance experience module 290 generating the first descriptive asset for the first learning object utilizing the first set of knowledge bullet-points and the illustrative asset as previously discussed. The instance experience module 290 outputs a representation of the first descriptive asset to a computing entity associated with a learner 28-1. For example, the instance experience module 290 renders the first descriptive asset to produce a rendering and issues the rendering as learner output information 172 to a second computing entity (e.g., associated with the learner 28-1) as a representation of the first learning object.

The issuing of the representation of the first learning object further includes the instance experience module 290 issuing the representation of the first set of physicality assessment assets of the first learning object to the second computing entity (e.g., associated with the learner 28-1). The issuing of the representation of the first set of physicality assessment assets further includes a series of sub-steps.

A first sub-step includes deriving a first set of knowledge test-points for the first learning object regarding the topic based on the first set of knowledge bullet-points, where a first knowledge test-point of the first set of knowledge test-points includes a physicality aspect. The physicality aspect includes at least one of performance of a physical activity to demonstrate command of a knowledge test-point and answering a question during physical activity to demonstrate cognitive function during physical activity. For instance, the instance experience module 290 generates the first knowledge test-point to include performing cardiopulmonary resuscitation (CPR) when the first set of knowledge bullet-points pertain to aspects of successful CPR.

A second sub-step includes generating the first set of physicality assessment assets utilizing the first set of knowledge test-points, the illustrative asset, and the first descriptive asset of the first learning object. For instance, the instance experience module 290 generates the first set of physicality assessment assets to include a CPR test device and an instruction to perform CPR.

A third sub-step of the issuing of the representation of the first set of physicality assessment assets includes rendering the first set of physicality assessment assets to produce the representation of the first set of physicality assessment assets. For instance, the instance experience module 290 renders the first set of physicality assessment assets to produce a rendering as the representation.

A fourth sub-step includes outputting the representation of the first set of physicality assessment assets to the second computing entity associated with the learner 28-1. For instance, the instance experience module 290 outputs learner output information 172 that includes the rendering of the first set of physicality assessment assets.

Figure 9B:
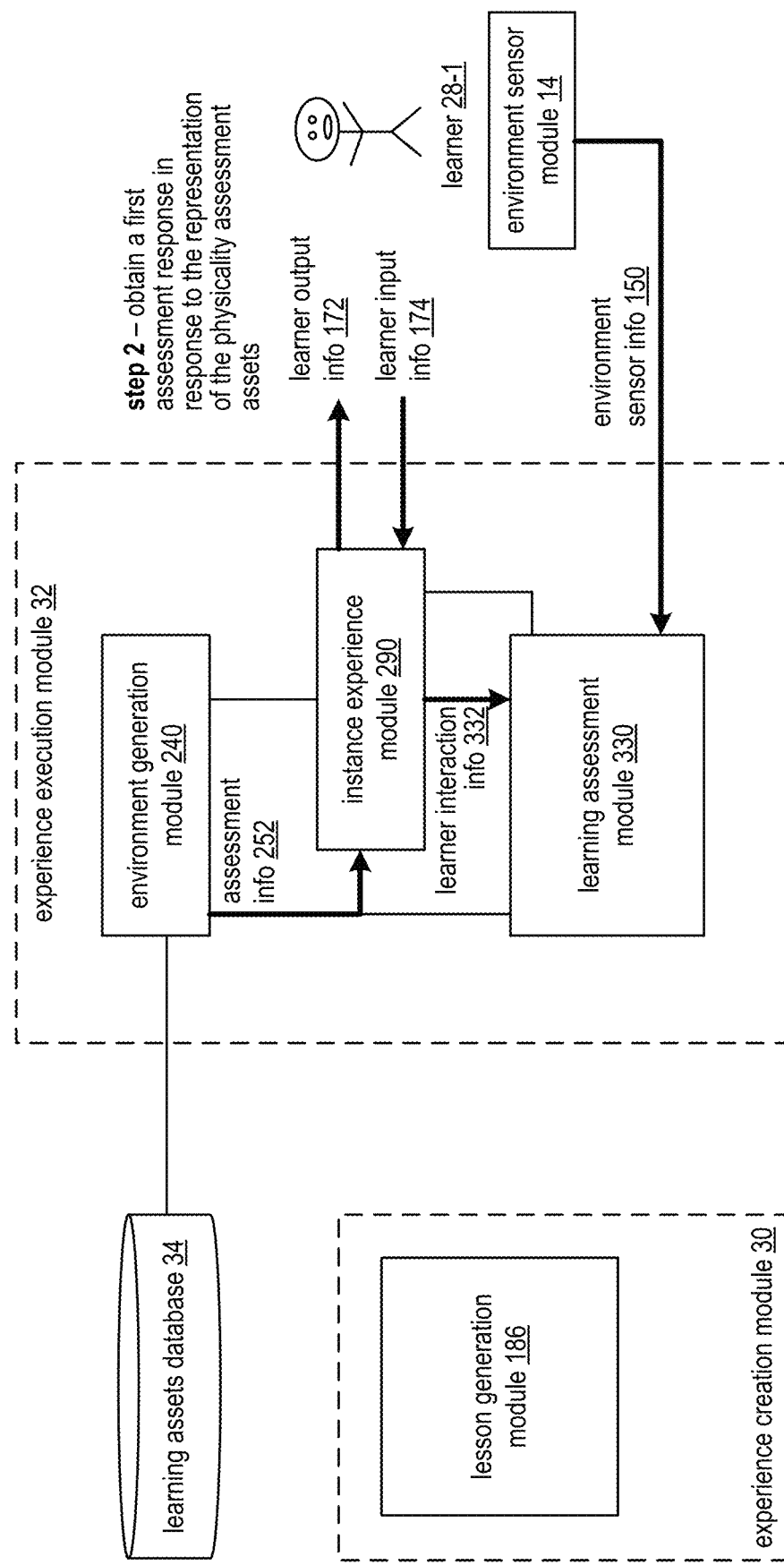

FIG. 9B further illustrates the example of operation of the method to update the lesson package, where, having issued the representation of the first set of physicality assessment assets, in a second step of the method the experience execution module 32 obtains a first assessment response in response to the representation of the first set of physicality assessment assets. The obtaining of the first assessment response includes a variety of approaches.

A first approach includes receiving the first assessment response from the second computing entity in response to the representation of the first set of physicality assessment assets. For example, the instance experience module 290 receives learner input information 174 and extracts the first assessment response from the received learner input information 174.

A second approach includes receiving the first assessment response from a third computing entity. For example, the instance experience module receives the first assessment response from a computing entity associated with monitoring physicality aspects of the learner 28-1.

A third approach includes interpreting learner interaction information 332 to produce the first assessment response. For example, the instance experience module 290 interprets the learner input information 174 based on assessment information 252 to produce the learner interaction information 332. For instance, the assessment information 252 includes how to assess the learner input information 174 to produce the learner interaction information 332. The learning assessment module 330 interprets the learning interaction information 332 based on the assessment information 252 to produce learning assessment results information 334 as the first assessment response.

A fourth approach includes interpreting environment sensor information 150 to produce the first assessment response. For example, the learning assessment module 330 interprets the environment sensor information 150 from the environment sensor module 14 with regards to detecting physical manipulations of the CPR test device (e.g., as detected by the motion sensor 126 and/or the position sensor 128) to produce the first assessment response.

Figure 9C:
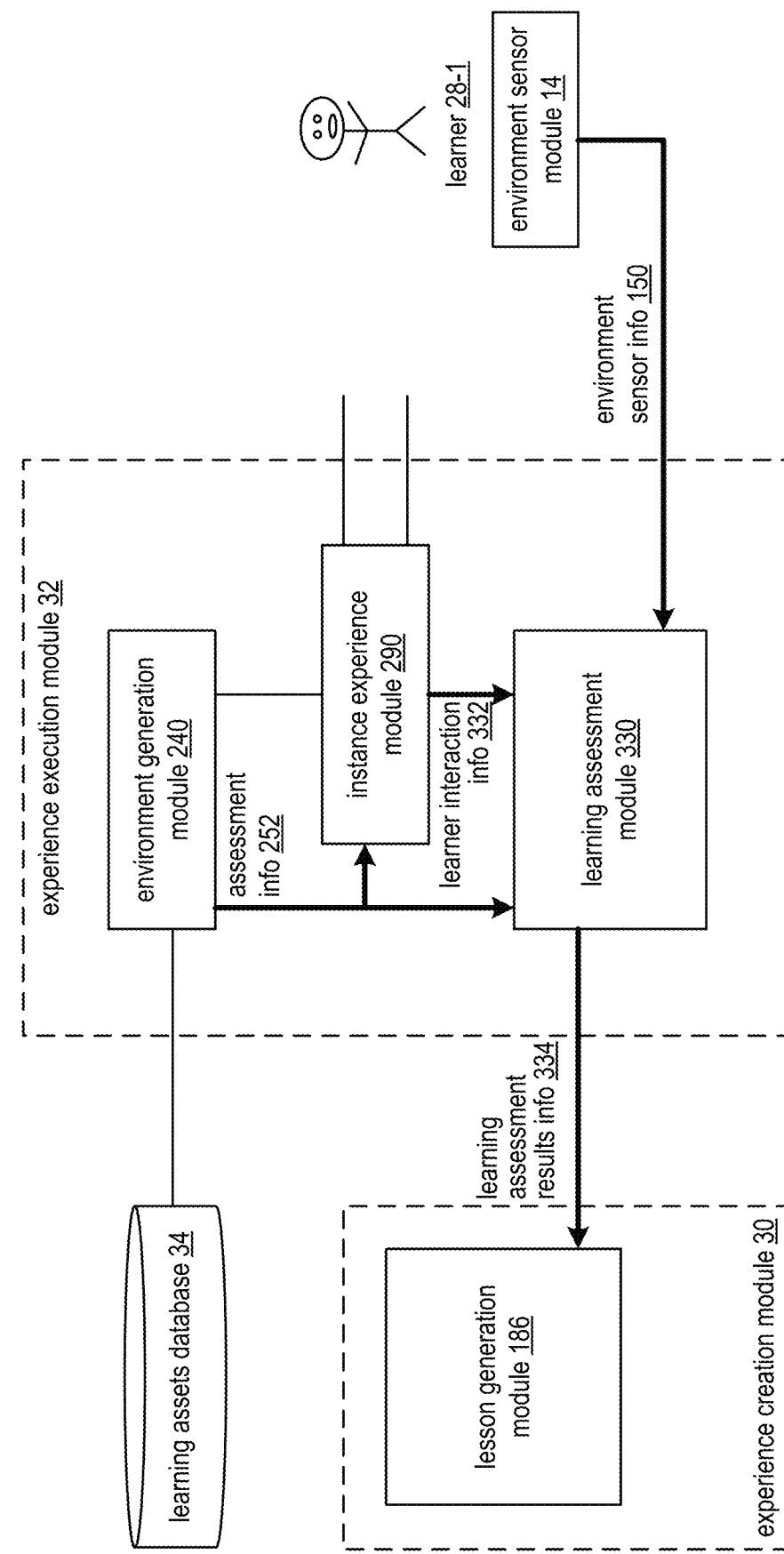

FIG. 9C further illustrates the example of operation of the method to update the lesson package where, having obtained the first assessment response, in a third step the experience execution module 32 determines an undesired performance aspect of the first assessment response. The determining the undesired performance aspect of the first assessment response includes a series of steps. A first step includes evaluating the first assessment response utilizing evaluation criteria of the assessment information 252 to produce a first assessment response evaluation. The evaluation criteria includes measures to assist in determining performance of the learner 28-1 (e.g., rate of performing CPR, compression depths of the CPR, etc.) The learning assessment module 330 evaluates the learner interaction information 332 and the environment sensor information 150 utilizing the evaluation criteria of the assessment information 252 to produce learning assessment results information 334. For example, the learning assessment module 330 analyzes the environment sensor information 150 to interpret physical actions of the learner 28-1 to determine the rate of performing the CPR and the compression depths of the CPR.

The learning assessment results information 334 includes one or more of a learner identity, a learning object identifier, a lesson identifier, and raw learner interaction information (e.g., a timestamp recording of all learner interactions like points, speech, input text, settings, viewpoints, etc.). The learning assessment results information 334 further includes summarized learner interaction information (e.g., average, mins, maxes of raw interaction information, time spent looking at each view of a learning object, how fast answers are provided, number of wrong answers, number of right answers, comparisons of measures to desired values of the evaluation criteria, etc.).

A second step includes identifying the undesired performance aspect of the first assessment response based on the first assessment response evaluation and evaluation criteria of the assessment information. The evaluation criteria includes desired ranges of the measures, e.g., greater than a minimum value, less than a maximum value, between the minimum and maximum values, etc. For example, the learning assessment module 330 compares the rate of performing the CPR to a desired CPR rate range measure and indicates that the CPR range is the undesired performance aspect when the rate of performing the CPR is outside of the desired CPR rate range.

Figure 9D:
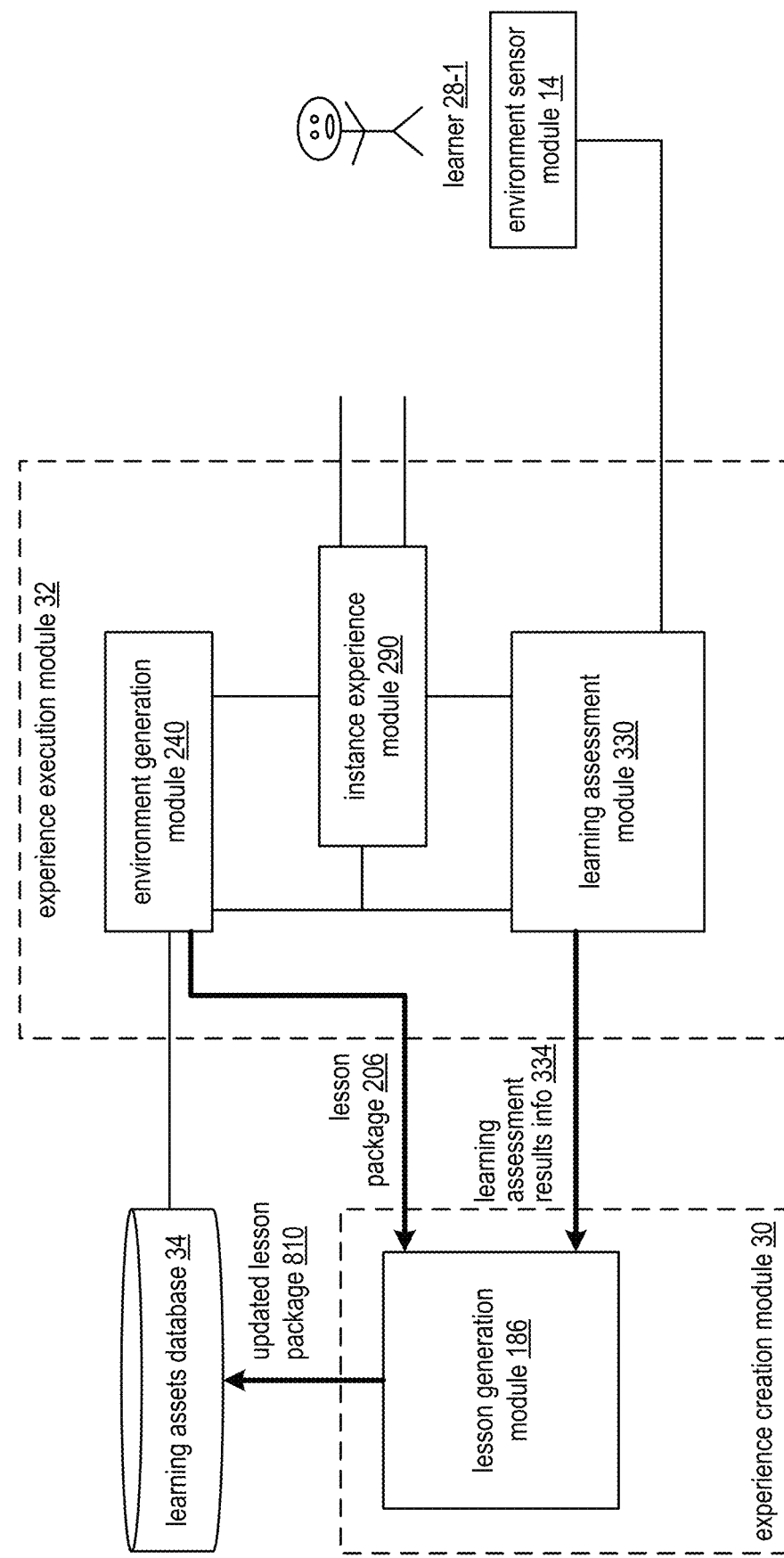

FIG. 9D further illustrates the example of operation of the method to update the lesson package where, having determined the undesired performance aspect of the first assessment response, in a fourth step, the experience creation module 30 updates at least one of the first learning object and the second learning object based on the undesired performance aspect to facilitate improved performance of a subsequent assessment response. The updating of the at least one of the first learning object and the second learning object includes a variety of approaches.

A first approach includes the lesson generation module 186 modifying the first descriptive asset regarding the first piece of information based on the undesired performance aspect, the first set of knowledge bullet-points, and the illustrative asset. For example, the lesson generation module 186 extracts the first descriptive asset from the lesson package 206, extracts the first set of knowledge bullet-points from the lesson package 206, extracts the illustrative asset from the lesson asset package 206, and extracts the undesired performance aspect from the learning asset results information 334.

The first approach further includes the lesson generation module 186 determining a modification approach based on the undesired performance aspect. For example, the lesson generation module 186 determines to modify the first descriptive asset when the undesired performance aspect is associated with potential performance improvement for the first learning object.

As an instance of the modification to the first learning object, when unfavorable motion of the learner 28-1 related to an object occurs more than a maximum unfavorable threshold level (e.g., too much underperforming), the lesson generation module 186 determines the modification to the first descriptive asset (e.g., new version, different view, take more time viewing the object, etc.). As another example, when favorable motion of the learner 28-1 related to the object occurs more than a maximum unfavorable threshold level (e.g., too much outperforming), the lesson generation module 186 determines to further modify the first descriptive asset (e.g., new simple version, different view, take less time viewing the object, etc.).

A second approach includes the lesson generation module 186 modifying the second descriptive asset regarding the second piece of information based on the undesired performance aspect, the second set of knowledge bullet-points, and the illustrative asset. For example, the lesson generation module 186 extracts the second descriptive asset from the lesson package 206, extracts the second set of knowledge bullet-points from the lesson package 206, extracts the illustrative asset from the lesson asset package 206, and extracts the undesired performance aspect from the learning asset results information 334.

The second approach further includes the lesson generation module 186 determining the modification approach based on the undesired performance aspect. For example, the lesson generation module 186 determines to modify the second descriptive asset when the undesired performance aspect is associated with potential performance improvement for the second learning object. For example, the lesson generation module 186 determines to modify the second descriptive asset when the undesired performance aspect is associated with potential performance improvement for the second learning object.

As an instance of the modification to the second learning object, when unfavorable motion of the learner 28-1 related to an object occurs more than a maximum unfavorable threshold level (e.g., too much underperforming), the lesson generation module 186 determines the modification to the second descriptive asset (e.g., new version, different view, take more time viewing the object, etc.). As another example, when favorable motion of the learner 28-1 related to the object occurs more than a maximum unfavorable threshold level (e.g., too much outperforming), the lesson generation module 186 determines to further modify the second descriptive asset (e.g., new simple version, different view, take less time viewing the object, etc.).

Alternatively, or in addition to, for each learning object of the lesson package 206, the experience creation module 30 identifies enhancements to descriptive assets and/or their use to produce updated descriptive assets of an updated lesson package 810 based on the corresponding learning assessment results information 334. Having produced the updated lesson package 810, the lesson generation module 186 facilitates storing the updated lesson package 810 in the learning assets database 34 to facilitate subsequent utilization of the updated lesson package 810 by another learner to produce more favorable learning results.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 10A, 10B, and 10C are schematic block diagrams of an embodiment of a computing system illustrating an example of selecting a lesson package. The computing system includes the environment sensor module 14 of FIG. 1, the experience execution module 32 of FIG. 1, and the learning assets database 34 of FIG. 1. In an embodiment, the environment sensor module 14 includes the motion sensor 126, the position sensor 128, the visual sensor 122, and the audio sensor 124, all of FIG. 4. The experience execution module 32 includes the environment generation module 240 of FIG. 9A and the instance experience module 290 of FIG. 9A.

FIG. 10A illustrates an example of a method of operation to select the lesson package where, in a first step the experience execution module 32 identifies an environmental object associated with a plurality of learning objects of the learning assets database 34. For example, the environment generation module 240 identifies object 24-1 from the environment sensor information 150 and compares the object 24-1 to the plurality of learning objects of the lesson package 206 from the learning assets database 34. The environment generation module 240 indicates the identification of the environmental object when the comparison is favorable.

Having identified the environmental object, in a second step of the method of operation to select the lesson package, the experience execution module 32 selects a group of learning objects based on the identified environmental object. For example, the environment generation module 240 compares the object 24-1 to objects of learning objects 880-1 through 880-N and of learning objects 882-1 through 882-N, etc. and selects the group of learning objects 880-1 through 880-N when the comparison is favorable.

FIG. 10B further illustrates the example of the method of operation to select the lesson package, where having selected the group of learning objects, in a third step the experience execution module 32 detects an impairment associated with the identified environmental object. The detecting includes determining that an environmental sensor information image compares favorably to an impairment image of a learning object, interpreting and alarm, receiving an error code, detecting a maintenance need, and receiving the request. For example, the environment generation module 240 interprets further environment sensor information 150 to identify an entigen error code associated with the object 24-1.

Having detected the impairment, in a fourth step of the method of operation to select the lesson package, the experience execution module 32 selects a learning object of the group of learning objects based on the detected impairment. The selecting includes finding a best match of a learning object to provide instructions to the learner 28-1 to address the detected impairment. For example, the environment generation module 240 selects the learning object 880-2 when the entigen error code compares favorably to an aspect of the learning object 880-2 (e.g., engine repair object training).

FIG. 10C further illustrates the example of the method of operation to select the lesson package, where having selected the learning object, in a fifth step the experience execution module 32 selects a set of learning objects based on the selected learning object and a learner attribute. The learner attribute includes identification of learning objects experienced by the learner 28-1, a skill level associated with the learner 28-1, and an area of learning identified for refresh for the learner 28-1, etc. The selecting includes matching a learner need with the detected impairment for the environmental object. The set of learning objects includes one or more learning objects. For example, the environment generation module 240 selects learning objects 880-2 and 880-3 when those learning objects are associated with refresh training on engine repair associated with the detected engine error code.

Having selected the set of learning objects, in a sixth step of the method of operation to select the lesson package, the experience execution module 32 issues learner output information 172 to the learner 28-1 based on the set of selected learning objects. For example, as previously discussed, the instance experience module 290 generates the learner output information 172 based on instruction information 204 and baseline environment and object information 292 associated with the learning objects 880-2 and 880-3. The generating includes obtaining the learning objects, generating the environment, generating the instructions, and rendering common objects for two or more learning objects for sending to the learner 28-1.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 11A, 11B, 11C, and 11D are schematic block diagrams of an embodiment of a computing system illustrating an example of utilizing a lesson package. The computing system includes the environment sensor module 14 of FIG. 1, the experience execution module 32 of FIG. 1, and the learning assets database 34 of FIG. 1. In an embodiment, the environment sensor module 14 includes the motion sensor 126 of FIG. 4 and the position sensor 128 of FIG. 4. The experience execution module 32 includes the environment generation module 240, the instance experience module 290, and the learning assessment module 330, all of FIG. 9A.

Figure 11A:
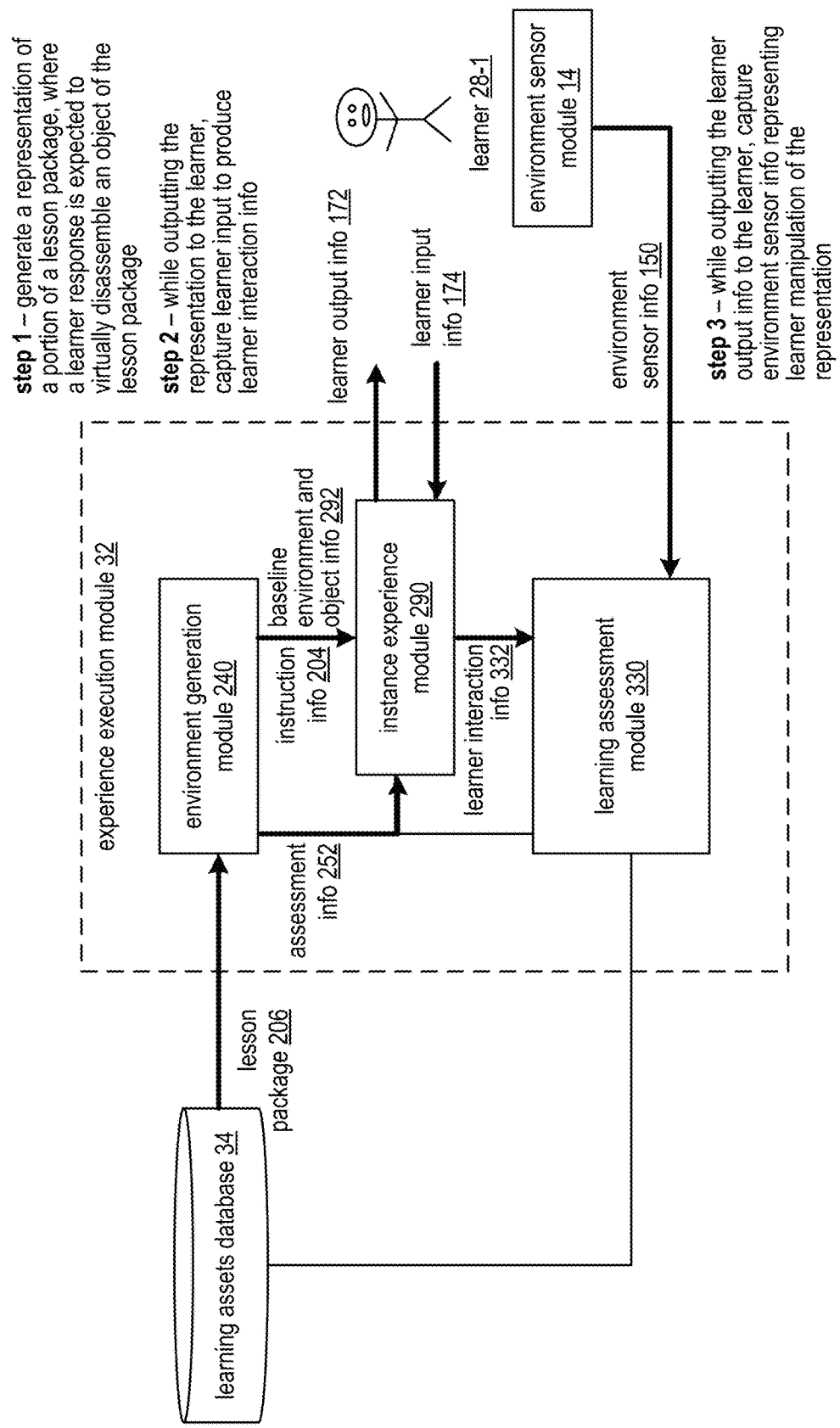

FIG. 11A illustrates an example of a method of operation to utilize the lesson package where, in a first step the experience execution module 32 generates a representation of a portion of a lesson package, where a learner response is expected to virtually disassemble an object of the lesson package. For example, the environment generation module 240 generates learner output information 172 as previously discussed based on instruction information 204, baseline environment and object information 292 and assessment information 252. The environment generation module 240 receives lesson package 206 from the learning assets database 34 and generates the assessment information 252, the instruction information 204, and the baseline environment and object information 292 based on the lesson package 206 as previously discussed.

Having generated the representation of the portion of the lesson package, while outputting the representation to the learner 28-1 as learner output information 172, the experience execution module 32 captures learner input information 174 from the learner 28-1 to produce learner interaction information 332 as previously discussed. For example, the instance experience module 290 outputs learner output information 172 to the learner 28-1 and receives learner input information 174 from the learner 28-1 in response. For instance, the instance experience module 290 renders frames of a sequence showing virtual disassembly of an engine by the learner 28-1 as further depicted in FIG. 11B.

Having captured the learner input information 174, while further outputting the representation to the learner 28-1 as the learner output information 172, the experience execution module 32 captures environment sensor information 150 representing further learner manipulation of the representation. For instance, the instance experience module 290 renders frames of another sequence showing virtual reassembly of the disassemble the engine by the learner 28-1 as further depicted in FIG. 11C.

Figure 11D:
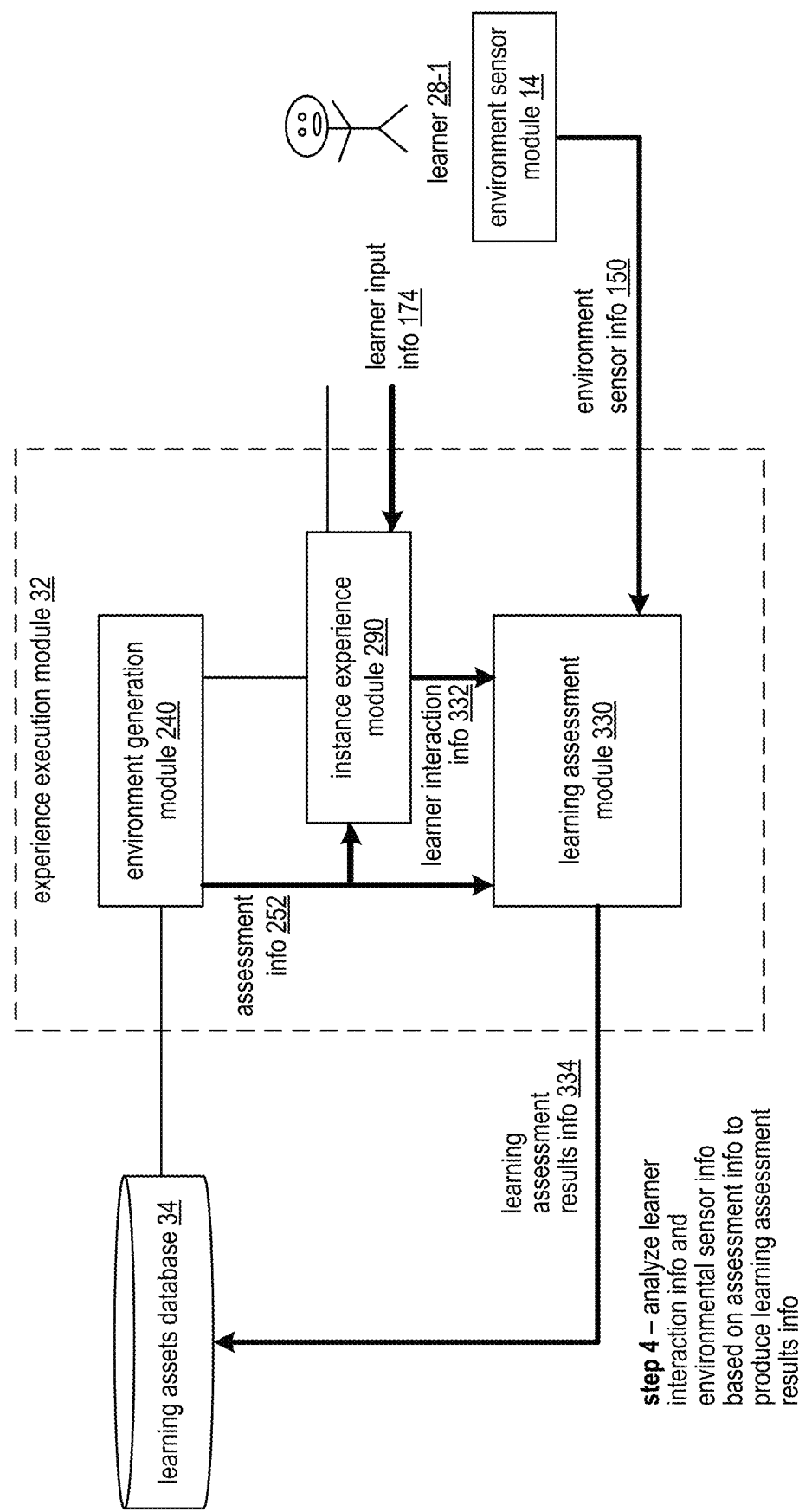

FIG. 11D further illustrates the example of the method of operation to utilize the lesson package where, in a fourth step the experience execution module 32 analyzes learner interaction information 332 and the environment sensor information 150 based on the assessment information 252 to produce learning assessment results information 334 as previously discussed. Having generated the learning assessment results 334, the learning assessment module 330 facilitates storing of the learning assessment results information 334 in the learning assets database 34 to facilitate subsequent further enhanced learning.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 12A, 12B, and 12C are schematic block diagrams of an embodiment of a computing system illustrating an example of modifying a lesson package. The computing system includes the experience execution module 32 of FIG. 1, the learning assets database 34 of FIG. 1, and the environment sensor module 14 of FIG. 1. The experience execution module 32 includes the environment generation module 240, the instance experience module 290, and the learning assessment module 330, all of FIG. 9A. In an embodiment, the environment sensor module 14 includes the motion sensor 126 of FIG. 4 and the position sensor 120 of FIG. 4.

FIG. 12A illustrates an example of operation of a method to modify a lesson package where in a first step the experience execution module 32 generates a representation of a portion of a lesson package 206, where a plurality of learning objects are associated with a plurality of augmenting multimedia content. For example, the environment generation module 240 generates learner output information 172 as previously discussed based on instruction information 204, baseline environment and object information 292 and assessment information 252. The environment generation module 240 receives lesson package 206 from the learning assets database 34 and generates the assessment information 252, the instruction information 204, and the baseline environment and object information 292 based on the lesson package 206 as previously discussed.

The augmenting multimedia content includes one or more of a video clip, an audio clip, a textual string, etc. The augmenting multimedia content is associated with one or more of the plurality of learning objects where the augmenting multimedia content embellishes the learning aspects of the plurality of learning objects by providing further content in one or more formats.

Having generated the representation, in a second step of the method to modify the lesson package, the experience execution module 32, while outputting the representation to the learner 28-1, captures learner input information 174 to produce learner interaction information 332 as previously discussed. For instance, the learner output information 172 illustrates an operational engine and the learner input information 174 includes interactions of the learner 28-1 with the representation of the operational engine.

Having produced the learner interaction information 332, in a third step of the method to modify the lesson package, the experience execution module 32, while outputting the learner output information 172 to the learner 28-1, captures environment sensor information 150 representing learner manipulation of the representation as previously discussed. For instance, the environment sensor information 150 captures the learner 28-1 identifying an area of interest of the operational engine.

FIG. 12B further illustrates the example of operation of the method to modify the lesson package, where having produced the learner interaction information 332 and captured the environment sensor information 150, in a fourth step the experience execution module 32 analyzes the learner interaction information 332 and the environment sensor information 150 based on the assessment information 252 to produce learning assessment results information 334 as previously discussed. For example, the learning assessment module 330 generates the learning assessment results information 334 to identify an area for improved learning associated with the representation.

Having produced the learning assessment results information 334, the experience execution module 32 selects and augmenting multimedia content based on the learning assessment results information 334. For example, the environment generation module 240 identifies the augmenting multimedia content associated with the area for improved learning. Having selected the augmenting multimedia content, in a sixth step the experience execution module 32 generates an updated representation of the portion of the lesson package to include the selected augmenting multimedia content. For example, the environment generation module 240 modifies the instruction information 204 and/or the baseline environment and object information 292 to include the selected augmenting multimedia content.

The instance experience module 290 regenerates the learner output information 172 utilizing the modified instruction information 204 and/or the modified baseline environment and object information 292 to include the selected augmenting multimedia content. For instance, as illustrated in FIG. 12C, the instance experience module 290 inserts a single explosion multimedia clip into the learner output rendering sequence 2 of an enhanced power stroke rendering to further enhance the experience of the learner 28-1 in understanding the operational engine.

Having generated the updated representation, in a seventh step of the method to modify the lesson package, the experience execution module outputs the updated representation to the learner 28-1 to enhance learning. For example, the instance experience module 290 outputs the modified learner output information 172 to the learner 28-1 where the enhanced power stroke rendering now includes the single explosion multimedia clip.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 13A, 13B, and 13C are schematic block diagrams of an embodiment of a computing system illustrating an example of modifying a lesson package. The computing system includes the experience execution module 32 of FIG. 1, the environment sensor module 14 of FIG. 1, and the learning assets database 34 of FIG. 1. The experience execution module 32 includes the environment generation module 240, the instance experience module 290, and the learning assessment module 330, all of FIG. 9A.

FIG. 13A illustrates an example of a method of operation to modify the lesson package, where, in a first step the experience execution module 32 generates a representation of a portion of a lesson package 206 for a set of learners 28-1 through 28-N. For example, the environment generation module 240 generates learner output information 172 as previously discussed based on instruction information 204, baseline environment and object information 292 and assessment information 252. The environment generation module 240 receives lesson package 206 from the learning assets database 34 and generates the assessment information 252, the instruction information 204, and the baseline environment and object information 292 based on the lesson package 206 as previously discussed.

Having generated the representation, in a second step of the method to modify the lesson package, while outputting the representation to the set of learners, the experience execution module 32 captures learner input information 174 to produce learner interaction information 332 as previously discussed but for the set of learners. Having produced the learner interaction information 332, the experience execution module 32, while outputting the representation, in a third step of the method to modify the lesson package, the experience execution module 32 captures environment sensor information 150 representing interaction of the set of learners with the representation.

FIG. 13B further illustrates the example of the method of operation to modify the lesson package, where, in a fourth step the experience execution module 32 analyzes the learner interaction information 332 and the environment sensor information 150 based on the assessment information 252 to produce learning assessment results information 334 as previously discussed. For example, the learning assessment module 330 produces the learning assessment results information 334 to indicate which parts of the portion of the lesson package that the set of learners are most affiliated with (e.g., interested in, spending time viewing, etc.).

Having produced the learning assessment results information 334, in a fifth step the experience execution module 32 selects insert branding content based on the learning assessment results information 334. The insert branding content includes one or more of a video clip, an image, text, etc. associated with a brand. The selecting is based on one or more of finding a brand that sells with the set of learners, demographics of the learners, past sell through history, and an assessment of understanding. For example, the environment generation module 240 selects a spark plug brand over a valve brand when the set of learners are more affiliated with replacing spark plugs than replacing valves of an engine and the representation is associated with the engine.

Having selected the insert branding content, in a 6 step of the method of operation to modify the lesson package, the experience execution module 32 generates an updated representation of the portion of the lesson package to include the selected insert branding content. For example, the environment generation module 240 provides updated instruction information 204 and/or baseline environment and object information 292 based on the selected insert branding extracted from lesson package 206 of the learning assets database 34.

The instance experience module 290 generates modified learner output information 172, as illustrated in FIG. 13C, utilizing the modified instruction information 204 and/or modified baseline environment and object information 292 that includes the selected insert branding content. For example, the instance experience module 290 produces the modified learner output information 172 to include an image of a spark plug and text that reads "legendary brand spark plugs from cool" next to the engine rendering for the enhanced power stroke of learner output rendering sequence 2.

Having produced the modified learner output information 172, in a seventh step of the method of operation to modify the lesson package, the experience execution module 32 outputs the updated representation of the portion of the lesson package to the set of learners 28-1 through 28-N. For example, the instance experience module 290 outputs the modified learner output information 172 that includes the spark plug brand content to the set of learners.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above FIGS. 14A and 14B are schematic block diagrams of an embodiment of a computing system illustrating an example of modifying a lesson package. The computing system includes the experience execution module 32 of FIG. 1, the environment sensor module 14 of FIG. 1, and the learning assets database 34 of FIG. 1. The experience execution module 32 includes the environment generation module 240, the instance experience module 290, and the learning assessment module 330, all of FIG. 9A.

FIG. 14A illustrates an example of a method of operation to modify the lesson package, where, in a first step the experience execution module 32 generates a set of representations of a portion of a lesson package 206 for a set of learners 28-1 through 28-N, where each representation is substantially unique for an associated learner (e.g., unique viewpoint). For example, the environment generation module 240 generates learner output information 172-1 through 172-N as previously discussed based on instruction information 204, baseline environment and object information 292 and assessment information 252. The environment generation module 240 receives lesson package 206 from the learning assets database 34 and generates the assessment information 252, the instruction information 204, and the baseline environment and object information 292 based on the lesson package 206 as previously discussed.

Having generated the set of representations, in a second step of the method to modify the lesson package, while outputting the set of representations to the set of learners, the experience execution module 32 captures learner input information 174-1 through 174-N to produce learner interaction information 332 as previously discussed but for the set of learners. Having produced the learner interaction information 332, the experience execution module 32, while outputting the set of representations, in a third step of the method to modify the lesson package, the experience execution module 32 captures environment sensor information 150 representing interaction of the set of learners with the set of representations.

FIG. 14B further illustrates the example of the method of operation to modify the lesson package, where, in a fourth step the experience execution module 32 analyzes the learner interaction information 332 and the environment sensor information 150 based on the assessment information 252 to produce learning assessment results information 334 as previously discussed, but for the set of learners. For example, the learning assessment module 330 produces the learning assessment results information 334 to indicate which parts of the portion of the lesson package that the set of learners struggle with and which parts they learn effectively.

Having produced the learning assessment results information 334, in a fifth step the experience execution module 32 identifies one or more representations of the set of representations that optimizes learning. For example, the learning assessment module 330 identifies a portion of the lesson package that the set of learners learn effectively from. In a sixth step, the experience execution module 32 updates the lesson package to include the identified one or more representations of the set of representations that optimizes learning. For example, the learning assessment module 330 facilitates updating of the lesson package 206 to produce an updated lesson package that includes the identified one or more representations of the set of representations that optimizes learning. Having produced the updated lesson package, the learning assessment module 330 stores the updated lesson package in the learning assets database 34 to facilitate utilization by even further learners to utilize the identified one or more representations to experience enhanced learning.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 15A, 15B, and 15C are schematic block diagrams of an embodiment of a computing system illustrating an example of modifying a lesson package. The computing system includes the experience execution module 32 of FIG. 1, the environment sensor module 14 of FIG. 1, and the learning assets database 34 of FIG. 1. The experience execution module 32 includes the environment generation module 240, the instance experience module 290, and the learning assessment module 330, all of FIG. 9A.

FIG. 15A illustrates an example of a method of operation to modify the lesson package, where, in a first step the experience execution module 32 generates a representation of a portion of a lesson package 206 that includes a set of objects. For example, the environment generation module 240 generates learner output information 172 as previously discussed based on instruction information 204, baseline environment and object information 292 and assessment information 252. The environment generation module 240 receives lesson package 206 from the learning assets database 34 and generates the assessment information 252, the instruction information 204, and the baseline environment and object information 292 based on the lesson package 206 as previously discussed.

Having generated the representation, in a second step of the method to modify the lesson package, while outputting the representation to the learner 28-1, the experience execution module 32 captures learner input information 174 to produce learner interaction information 332 as previously discussed. Having produced the learner interaction information 332, the experience execution module 32, while outputting the representation, in a third step of the method to modify the lesson package, the experience execution module 32 captures environment sensor information 150 representing learner manipulation of the representation.

FIG. 15B further illustrates the example of the method of operation to modify the lesson package, where, in a fourth step the experience execution module 32 analyzes the learner interaction information 332 and the environment sensor information 150 based on the assessment information 252 to produce learning assessment results information 334 as previously discussed, but to identify performance as a function of a representation attribute. The attribute includes one or more of size, scale relationship with another object representation, color, shading, flashing, playback speed, etc. For example, the learning assessment module 330 produces the learning assessment results information 334 to indicate which object of the set objects should be highlighted to enhance learning.

Having produced the learning assessment results information 334, in a fifth step the experience execution module 32 updates the representation of the portion of the lesson package based on the learning assessment results information 334, where the updated portion is generated utilizing an updated representation attribute. For example, the instance experience module 290 determines the updated representation attribute to include enlarging the bucket of a representation of a bulldozer when the learning assessment results information 334 indicates that enlarging the size of the bucket object relative to the rest of the bulldozer enhances the learning associated with the bucket object. Having determined the updated representation attribute, the instance experience module 290 updates the learner output information 172 utilizing the updated representation attribute as illustrated in FIG. 15C where in a learner output rendering sequence 2 the scale of the scoop of the bulldozer object is enlarged and the scale of the bulldozer object is reduced.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 16A, 16B, and 16C are schematic block diagrams of an embodiment of a computing system illustrating an example of modifying a lesson package. The computing system includes the experience execution module 32 of FIG. 1, the environment sensor module 14 of FIG. 1, and the learning assets database 34 of FIG. 1. The experience execution module 32 includes the environment generation module 240, the instance experience module 290, and the learning assessment module 330, all of FIG. 9A.

FIG. 16A illustrates an example of a method of operation to modify the lesson package, where, in a first step the experience execution module 32 generates a first representation of a portion of a lesson package 206 for a first learner book a set of learners 28-1 through 28-N, where each representation is substantially unique for an associated learner (e.g., unique viewpoint). For example, the environment generation module 240 generates learner output information 172-1 through 172-N as previously discussed based on instruction information 204, baseline environment and object information 292 and assessment information 252. The environment generation module 240 receives lesson package 206 from the learning assets database 34 and generates the assessment information 252, the instruction information 204, and the baseline environment and object information 292 based on the lesson package 206 as previously discussed.

Having generated the first representation, in a second step of the method to modify the lesson package, while outputting the first representation to the first learner, the experience execution module 32 captures first learner input information 174-1 to produce first learner interaction information 332-1 of learner interaction information 332-1 through 332-N as previously discussed but for the set of learners. Having produced the first learner interaction information 332-1 the experience execution module 32, while outputting the first learner representation to the first learner, in a third step of the method to modify the lesson package, the experience execution module 32 captures first environment sensor information 150-1 representing first learner manipulation of the first representation.

FIG. 16B further illustrates the example of the method of operation to modify the lesson package, where, in a fourth step the experience execution module 32 analyzes the first learner interaction information 332-1 and the first environment sensor information 150-1 based on the assessment information 252 to produce first learning assessment results information 334-1 that identifies performance as a function of a representation attribute. For example, the learning assessment module 330 produces the learning assessment results information 334 to indicate which parts of the portion of the lesson package that the first learner struggles with and which parts the first learner learns effectively.

Having produced the first learning assessment results information 334-1, in a fifth step the experience execution module 32 generates a second representation of the portion of the lesson package for a second learner of the set of learners based on the first learning assessment results, where the second representation is further generated utilizing an updated representation attribute. For example, the instance experience module 290 determines the updated representation attribute to be a slower playback speed to enhance learning of the portion of the lesson package for the second learner.

The instance experience module 290 generates learner output information 172-2 for the second learner utilizing the updated representation attribute. For example, as illustrated in FIG. 16 C, the instance experience module 290 generates the learner output information 172-2 to include second learner output rendering sequences 1 and 2 for just an intake stroke engine illustration when the first representation produced learner output information 172-1 where just a first learner output rendering sequence 1 was associated with the intake stroke.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 17A, 17B, and 17C are schematic block diagrams of an embodiment of a computing system illustrating an example of selecting a lesson package. The computing system includes the experience execution module 32 of FIG. 1, the environment sensor module 14 of FIG. 1, and the learning assets database 34 of FIG. 1. The experience execution module 32 includes the environment generation module 240, the instance experience module 290, and the learning assessment module 330, all of FIG. 9A.

FIG. 17A illustrates an example of a method of operation to select the lesson package, where, in a first step the experience execution module 32 generates a plurality of representations of a plurality of lesson packages 206-1 through 206-N for a plurality of learners 28-1 through 28-N, where, in an embodiment, the plurality of lesson packages are associated with a massive number of active virtual world environments. Each active virtual world environment includes a plurality of objects that interact with each other and a set of associated learners that interact with the plurality of objects in accordance with inputs from the set of associated learners and learning objects of associated lesson packages. The active virtual world includes several objectives such as providing training and education. The active virtual world further includes an objective of entertainment. The active virtual world further includes a combination of education and entertainment (e.g., edutainment).

As an example of the generating of the plurality of representations, the environment generation module 240 generates learner output information 172-1 through 172-N as previously discussed based on instruction information 204-1 through 204-N, baseline environment and object information 292-1 through 292-N, and assessment information 252-1 through 252-N. The environment generation module 240 receives lesson packages 206-1 through 206-N associated with the massive number of active virtual world environments from the learning assets database 34 and generates the assessment information 252-1 through 252-N, the instruction information 204-1 through 204-N, and the baseline environment and object information 292-1 through 292-N based on the lesson packages 206-1 through 206-N as previously discussed on an individual basis.

Having generated the plurality of representations, in a second step of the method to select the lesson package, while outputting the plurality of representations to the plurality of learners, the experience execution module 32 captures learner input information 174-1 through 174-N to produce learner interaction information 332-1 through 332-N as previously discussed. Having produced the learner interaction information 332-1 through 332-N, the experience execution module 32, while outputting the plurality of representations, in a third step of the method to select the lesson package, the experience execution module 32 captures environment sensor information 150-1 through 150-N representing manipulation of the plurality of representations by the plurality of learners.

Having produced the learner interaction information and obtained the environment sensor information, in a fourth step of the method of operation to select the lesson package, the experience execution module 32 analyzes the plurality of learner interaction information and the environment sensor information based on a plurality of assessment information 252-1 through 252-N to produce a plurality of learning assessment results information 334-1 through 334-N that identifies learning effectiveness. For example, the learning assessment module 330 produces the plurality of learning assessment results to indicate which active virtual worlds are most compatible with which category of learner (e.g., beginner, intermediate, advanced, interests, demographics, etc.).

FIG. 17B further illustrates the example of the method of operation to select the lesson package, where, having produced the plurality of learning assessment results, in a fifth step the experience execution module 32 selects one of the plurality of representations of the plurality of lesson packages for a new learner based on the plurality of learning assessment results information and a desired level of learning effectiveness associated with the new learner. For example, learner 28-X (e.g., the new learner) provides the desired level of learning effectiveness (e.g., explicitly, implicitly, via previous lesson package execution experiences, etc.). The selecting includes matching the one of the plurality of representations to one or more of interest, background, previous instructions, a timeline of virtual reality experiences of the new learner. For example, as illustrated in FIG. 17C, the new learner selects a representation associated with learner output information 172-2 when that representation compares favorably to the desired level of learning effectiveness.

Having selected the representation, in a sixth step of the method of operation to select the lesson package, the experience execution module 32 modifies the selected one of the plurality of representations for the new learner based on learner input from the new learner to produce a new representation. The learner input includes an indication of other objects to include, a starting viewpoint of the representation, an indication of further objects to exclude, and other attributes associated with the experience of the selected representation by the new learner. As an example of the modifying and as illustrated in FIG. 17C, the instance experience module 290 modifies the learner output information 172-2 based on the learner input to produce learner output information 172-X.

Having modified the representation, in a seventh step of the method of operation to select the lesson package, while outputting the new representation to the new learner, the experience execution module 32 captures further learner input from other learners associated with the selected one of the plurality of representations to further update the selected one of the plurality of representations. For example, the instance experience module 290 outputs the learner output information 172-X to the learner 28-X and further outputs one or more other representations associated with the learner output 172-2 to one or more of the other learners. The instance experience module 290 receives further learner input from the other learners and learner input information 174-X from the learner 28-X. The instance experience module 290 further updates the variations of the learner output 172-2 based on the learner input information received from any and all of the learners.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 18A, 18B, and 18C are schematic block diagrams of an embodiment of a computing system illustrating an example of representing a lesson package. The computing system includes the learning assets database 34 FIG. 1 and the experience execution module 32 of FIG. 1. The experience execution module 32 includes the environment generation module 240 and the instance experience module 290, both of FIG. 9A.

FIG. 18A illustrates an example of a method of operation to represent the lesson package, where, in a first step the experience execution module 32 determines a set of lesson package requirements for a learner. The determining includes interpreting a received input from the learner 28-1, accessing records for the learner 28-1 as part of lesson package 206 from the learning assets database 34, identifying an educational and/or training need of the learner 28-1 and identifying and entertainment needs of the learner 28-1. For example, the environment generation module 240 interprets learner input 174 from the learner 28-1 to produce the set of lesson package requirements that indicates bulldozer operation training is desired.

Having produced the set of lesson package requirements for the learner, in a second step of the method to represent the lesson package, the experience execution module 32 selects a lesson package 206 for the learner based on the set of lesson package requirements, where the lesson package 206 is associated with a baseline for dimensional model (e.g., 3 dimensions and time). For example, the environment generation module 240 accesses the learning assets database 34 to identify the lesson package 206 associated with bulldozer operation. The environment generation module 240 generates the assessment information 252, the instruction information 204, and the baseline environment and object information 292 based on the lesson package 206 as previously discussed. The instance experience module 290 extracts rendering frames of a portion of the selected lesson package. For example, a first frame illustrates the bulldozer in a starting position, and subsequent sequential frames illustrate the bulldozer raising the scoop to a fully raised position by frame 100.

FIG. 18B further illustrates the example of the method of operation to represent the lesson package, where, having selected the lesson package 206, in a third step the experience execution module 32 determines a perception requirement for the learner. The perception requirement indicates a ratio of perception of the fourth dimension of the baseline four dimensional model of the lesson package to a fourth dimension of a learner four dimensional model. For example, the learner 28-1 subsequently experiences and perceives the representation in a real-time fashion when a perception ratio of the two is 1:1. As another example, the learner 28-1 subsequently experiences and perceives the representation 10 times slower than the original real-time of the baseline when the perception ratio is 10:1. As yet another example, the learner 28-1 subsequently experiences and perceives the representation 10 times faster than the original real-time of the baseline when the perception ratio is 1:10. For instance, 10 minutes of baseline seems like one minute to the learner 28-1.

The determining of the perception requirement includes interpreting learner input information 174 from the learner 28-1, identifying a previous perception requirement associated with effective education, entertainment, and/or training. For instance, 100 frames of the baseline representation seems like 10 frames to the learner 28-1 when the instance experience module 290 determines the perception requirement for the learner to include the 1:10 perception ratio based on interpreting the learner input information 174.

Having determined the perception requirement, in a fourth step of the method of operation to represent the lesson package, the experience execution module 32 determines a perception approach for representing the selected lesson package to the learner based on the perception requirement, where the perception approach maps the baseline for dimensional model to the learner for dimensional model. The perception approach includes filling frames of a learner output information 172-X with replicated frames of the baseline when the learner establishes a perception requirement to be slower than the baseline (e.g., looks like slow-motion).

The perception approach further includes interpreting a set of frames of the baseline to produce an output frame for the learner output information 172-X when the learner establishes a perception requirement to be faster than the baseline (e.g., not to look like fast-forward but rather to represent a perception of multiple baseline frames with one learner output frame). When interpreting the set of frames of the baseline to produce one output frame for the learner output information 172-X, the perception approach further includes smoothing the set of baseline frames, averaging the set of baseline frames, random picking one of the set of baseline frames, selecting another one of the set of baseline frames that best represents the set of baseline frames, selecting a starting frame of the set of baseline frames, selecting a middle frame of the set of baseline frames, and selecting an ending frame of the set of baseline frames.

FIG. 18C further illustrates the example of the method of operation to represent the lesson package, where, having determined the perception approach, in a fifth step the experience execution module 32 generates a representation of the selected lesson package utilizing the perception approach, where the representation is in the learner for dimensional model. The generating includes the instance experience module 290 rendering frames for the learner output information 172-X from the frames of the baseline in accordance with the perception approach. The rendering includes rendering fewer frames than the original baseline when the time perception is to be faster than the original and rendering more frames than the original baseline when the time perception is to be slower than the original. As another example, one year of baseline frames may be represented as one second of learner time when the one second of frames for the learner output information 172-X captures the perception of the one year of baseline frames.

Having generated the representation as learner output information 172-X, the instance experience module 290 outputs the learner output information 172-X to the learner 28-1. The learner 28-1 perceives the learner output information 172-X in accordance with the perception requirement for the learner.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples.

What is claimed is:

1. A method for creating a learning tool regarding a topic, the method comprises:
issuing, by a computing entity, a representation of a first set of physicality assessment assets of a first learning object of a plurality of learning objects to a second computing entity, wherein the first learning object includes a first set of knowledge bullet-points for a first piece of information regarding the topic, wherein a second learning object of the plurality of learning objects includes a second set of knowledge bullet-points for a second piece of information regarding the topic, wherein the first learning object and the second learning object further include an illustrative asset that depicts an aspect regarding the topic pertaining to the first and the second pieces of information, wherein the first learning object further includes a first descriptive asset regarding the first piece of information based on the first set of knowledge bullet-points and the illustrative asset, wherein the second learning object further includes a second descriptive asset regarding the second piece of information based on the second set of knowledge bullet-points and the illustrative asset, wherein the issuing the representation of the first set of physicality assessment assets of the first learning object to the second computing entity includes:
deriving a first set of knowledge test-points for the first learning object regarding the topic based on the first set of knowledge bullet-points, wherein a first knowledge test-point of the first set of knowledge test-points includes a physicality aspect,
generating the first set of physicality assessment assets utilizing the first set of knowledge test-points, the illustrative asset, and the first descriptive asset of the first learning object,
rendering the first set of physicality assessment assets to produce 3-D video frames as the representation of the first set of physicality assessment assets, and outputting the 3-D video frames to the second computing entity;
obtaining, by the computing entity, a first assessment response in response to the representation of the first set of physicality assessment assets;
determining, by the computing entity, an undesired performance aspect of the first assessment response; and
updating, by the computing entity, at least one of the first learning object and the second learning object based on the undesired performance aspect to facilitate improved performance of a subsequent assessment response.

2. The method of claim 1 further comprises:
generating, by the computing entity, the first descriptive asset for the first learning object utilizing the first set of knowledge bullet-points and the illustrative asset; and
outputting, by the computing entity, a representation of the first descriptive asset to the second computing entity.

3. The method of claim 1, wherein the obtaining the first assessment response in response to the representation of the first set of physicality assessment assets comprises at least one of:
receiving the first assessment response from the second computing entity in response to the representation of the first set of physicality assessment assets;
receiving the first assessment response from a third computing entity;
interpreting learner interaction information to produce the first assessment response; and
interpreting environment sensor information to produce the first assessment response.

4. The method of claim 1, wherein the determining the undesired performance aspect of the first assessment response comprises:
evaluating the first assessment response utilizing evaluation criteria of assessment information to produce a first assessment response evaluation; and
identifying the undesired performance aspect of the first assessment response based on the first assessment response evaluation and evaluation criteria of the assessment information.

5. The method of claim 1, wherein the updating the at least one of the first learning object and the second learning object based on the undesired performance aspect comprises at least one of:
- modifying the first descriptive asset regarding the first piece of information based on the undesired performance aspect, the first set of knowledge bullet-points, and the illustrative asset; and
- modifying the second descriptive asset regarding the second piece of information based on the undesired performance aspect, the second set of knowledge bullet-points, and the illustrative asset.

6. A computing device comprises:
an interface;
a local memory; and
a processing module operably coupled to the interface and the local memory, wherein the processing module functions to:
- issue, via the interface, a representation of a first set of physicality assessment assets of a first learning object of a plurality of learning objects to a second computing device, wherein the first learning object includes a first set of knowledge bullet-points for a first piece of information regarding a topic, wherein a second learning object of the plurality of learning objects includes a second set of knowledge bullet-points for a second piece of information regarding the topic, wherein the first learning object and the second learning object further include an illustrative asset that depicts an aspect regarding the topic pertaining to the first and the second pieces of information, wherein the first learning object further includes a first descriptive asset regarding the first piece of information based on the first set of knowledge bullet-points and the illustrative asset, wherein the second learning object further includes a second descriptive asset regarding the second piece of information based on the second set of knowledge bullet-points and the illustrative asset, wherein processing module functions to issue the representation of the first set of physicality assessment assets of the first learning object to the second computing device by:
  - deriving a first set of knowledge test-points for the first learning object regarding the topic based on the first set of knowledge bullet-points, wherein a first knowledge test-point of the first set of knowledge test-points includes a physicality aspect,
  - generating the first set of physicality assessment assets utilizing the first set of knowledge test-points, the illustrative asset, and the first descriptive asset of the first learning object,
  - rendering the first set of physicality assessment assets to produce 3-D video frames as the representation of the first set of physicality assessment assets, and
  - outputting, via the interface, the 3-D video frames to the second computing device;
- obtain a first assessment response in response to the representation of the first set of physicality assessment assets;
- determine an undesired performance aspect of the first assessment response; and
- update at least one of the first learning object and the second learning object based on the undesired performance aspect to facilitate improved performance of a subsequent assessment response.

7. The computing device of claim 6, wherein the processing module further functions to:
- generate the first descriptive asset for the first learning object utilizing the first set of knowledge bullet-points and the illustrative asset; and
- output, via the interface, a representation of the first descriptive asset to the second computing device.

8. The computing device of claim 6, wherein the processing module functions to obtain the first assessment response in response to the representation of the first set of physicality assessment assets by at least one of:
- receiving, via the interface, the first assessment response from the second computing device in response to the representation of the first set of physicality assessment assets;
- receiving, via the interface, the first assessment response from a third computing device;
- interpreting learner interaction information to produce the first assessment response; and
- interpreting environment sensor information to produce the first assessment response.

9. The computing device of claim 6, wherein the processing module functions to determine the undesired performance aspect of the first assessment response by:
- evaluating the first assessment response utilizing evaluation criteria of assessment information to produce a first assessment response evaluation; and
- identifying the undesired performance aspect of the first assessment response based on the first assessment response evaluation and evaluation criteria of the assessment information.

10. The computing device of claim 6, wherein the processing module functions update the at least one of the first learning object and the second learning object based on the undesired performance aspect by at least one of:
- modifying the first descriptive asset regarding the first piece of information based on the undesired performance aspect, the first set of knowledge bullet-points, and the illustrative asset; and
- modifying the second descriptive asset regarding the second piece of information based on the undesired performance aspect, the second set of knowledge bullet-points, and the illustrative asset.

11. A non-transitory computer readable memory of a computing device comprises:
a first memory element that stores operational instructions that, when executed by a processing module, causes the processing module to:
- issue a representation of a first set of physicality assessment assets of a first learning object of a plurality of learning objects to a second computing device, wherein the first learning object includes a first set of knowledge bullet-points for a first piece of information regarding a topic, wherein a second learning object of the plurality of learning objects includes a second set of knowledge bullet-points for a second piece of information regarding the topic, wherein the first learning object and the second learning object further include an illustrative asset that depicts an aspect regarding the topic pertaining to the first and the second pieces of information, wherein the first learning object further includes a first descriptive asset regarding the first piece of information based on the first set of knowledge bullet-points and the illustrative asset, wherein the second learning object further includes a second descriptive asset regarding the second piece of information based on the second set of knowledge bullet-points and the illustrative asset, wherein the processing module functions to issue the representation of the first set of physicality assessment assets of the first learning object to the second computing device by:
   deriving a first set of knowledge test-points for the first learning object regarding the topic based on the first set of knowledge bullet-points, wherein a first knowledge test-point of the first set of knowledge test-points includes a physicality aspect,
   generating the first set of physicality assessment assets utilizing the first set of knowledge test-points, the illustrative asset, and the first descriptive asset of the first learning object,
   rendering the first set of physicality assessment assets to produce 3-D video frames as the representation of the first set of physicality assessment assets, and
   outputting the 3-D video frames to the second computing device;
a second memory element that stores operational instructions that, when executed by the processing module, causes the processing module to:
   obtain a first assessment response in response to the representation of the first set of physicality assessment assets;
a third memory element that stores operational instructions that, when executed by the processing module, causes the processing module to:
   determine an undesired performance aspect of the first assessment response; and
a fourth memory element that stores operational instructions that, when executed by the processing module, causes the processing module to:
   update at least one of the first learning object and the second learning object based on the undesired performance aspect to facilitate improved performance of a subsequent assessment response.

12. The non-transitory computer readable memory of claim 11 further comprises:
   a fifth memory element stores operational instructions that, when executed by the processing module, causes the processing module to:
      generate the first descriptive asset for the first learning object utilizing the first set of knowledge bullet-points and the illustrative asset; and
      output a representation of the first descriptive asset to the second computing device.

13. The non-transitory computer readable memory of claim 11, wherein the processing module functions to execute the operational instructions stored by the second memory element to cause the processing module to obtain the first assessment response in response to the representation of the first set of physicality assessment assets by at least one of:
   receiving the first assessment response from the second computing device in response to the representation of the first set of physicality assessment assets;
   receiving the first assessment response from a third computing device;
   interpreting learner interaction information to produce the first assessment response; and
   interpreting environment sensor information to produce the first assessment response.

14. The non-transitory computer readable memory of claim 11, wherein the processing module functions to execute the operational instructions stored by the third memory element to cause the processing module to determine the undesired performance aspect of the first assessment response by:
   evaluating the first assessment response utilizing evaluation criteria of assessment information to produce a first assessment response evaluation; and
   identifying the undesired performance aspect of the first assessment response based on the first assessment response evaluation and evaluation criteria of the assessment information.

15. The non-transitory computer readable memory of claim 11, wherein the processing module functions to execute the operational instructions stored by the fourth memory element to cause the processing module to update the at least one of the first learning object and the second learning object based on the undesired performance aspect by at least one of:
   modifying the first descriptive asset regarding the first piece of information based on the undesired performance aspect, the first set of knowledge bullet-points, and the illustrative asset; and
   modifying the second descriptive asset regarding the second piece of information based on the undesired performance aspect, the second set of knowledge bullet-points, and the illustrative asset.

* * * * *